US012643078B1

(12) United States Patent
Baig et al.

(10) Patent No.: US 12,643,078 B1
(45) Date of Patent: Jun. 2, 2026

(54) ALUMINA-SUPPORTED POLYPYRROLE MODIFIED OXIDIZED GRAPHITIC CARBON NITRIDE MEMBRANE

(71) Applicant: King Fahd University of Petroleum and Minerals, Dhahran (SA)

(72) Inventors: Nadeem Baig, Dhahran (SA); Isam H. Aljundi, Dhahran (SA); Wail Falath, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/399,967

(22) Filed: Nov. 25, 2025

(51) Int. Cl.
| | |
|---|---|
| *B01D 71/62* | (2006.01) |
| *B01D 17/00* | (2006.01) |
| *B01D 17/02* | (2006.01) |
| *B01D 65/02* | (2006.01) |
| *B01D 69/02* | (2006.01) |
| *B01J 27/24* | (2006.01) |
| *B01J 35/39* | (2024.01) |

(Continued)

(52) U.S. Cl.
CPC ............ *B01D 71/62* (2013.01); *B01D 17/02* (2013.01); *B01D 17/085* (2013.01); *B01D 65/02* (2013.01); *B01D 69/02* (2013.01); *B01J 27/24* (2013.01); *B01J 35/39* (2024.01); *C02F 1/32* (2013.01); *C02F 1/40* (2013.01); *C02F 1/44* (2013.01); *C02F 1/722* (2013.01); *C02F 1/725* (2013.01); *B01D 2321/343* (2013.01); *B01D 2325/04* (2013.01); *C02F 2101/308* (2013.01); *C02F 2101/32* (2013.01); *C02F 2303/16* (2013.01); *C02F 2305/10* (2013.01)

(58) Field of Classification Search
CPC .. B01J 35/39; B01J 27/24; B01J 35/45; C02F 2305/10; C02F 1/30; C02F 1/40; C02F 1/44; C02F 1/32; C02F 1/722; C02F 1/725; B01D 17/02; B01D 17/085; B01D 65/08; B01D 65/02; B01D 69/02; B01D 69/1213

USPC ........................................................ 210/636
See application file for complete search history.

(56) References Cited

U.S. PATENT DOCUMENTS

| | | | |
|---|---|---|---|
| 2023/0330644 A1 | 10/2023 | Faisal et al. | |
| 2025/0099921 A1 | 3/2025 | Baig et al. | |

FOREIGN PATENT DOCUMENTS

| | | |
|---|---|---|
| CN | 113019867 A | 6/2021 |
| CN | 113716764 A | 11/2021 |

(Continued)

OTHER PUBLICATIONS

Nikolaevna et al, RU 2848629 C1, English machine translation, pp. 1-7 (Year: 2025).*

(Continued)

*Primary Examiner* — Claire A Norris
(74) *Attorney, Agent, or Firm* — Oblon, McClelland, Maier & Neustadt, L.L.P.

(57) ABSTRACT

An aluminum oxide-supported polypyrrole-modified oxidized graphitic carbon nitride ($\alpha$-Al$_2$O$_3$@PPy/O-g-C$_3$N$_4$) membrane includes two layers: a first layer including alumina and a second layer including an oxidized graphitic carbon nitride and a polymerized pyrrole. The carboxylic groups and hydroxyl groups of the oxidized carbon nitride interact via electrostatic interactions with polar groups in the polymerized pyrrole. The second layer is a nanofibrous mass including entangled nanofibers. The second layer has a thickness in of 1 to 3 μm.

20 Claims, 35 Drawing Sheets

(51) Int. Cl.

| | |
|---|---|
| *C02F 1/32* | (2023.01) |
| *C02F 1/40* | (2023.01) |
| *C02F 1/44* | (2023.01) |
| *C02F 1/72* | (2023.01) |
| *C02F 101/30* | (2006.01) |
| *C02F 101/32* | (2006.01) |

(56) References Cited

FOREIGN PATENT DOCUMENTS

| | | | | | |
|---|---|---|---|---|---|
| CN | 117504611 A | * | 2/2024 | ............. | B01D 69/02 |
| MY | 200407 A | * | 12/2023 | | |
| RU | 2848629 C1 | * | 10/2025 | | |

OTHER PUBLICATIONS

Zhang et al, CN 117405611 A, English machine translation, pp. 1-10 (Year: 2025).*

Zhang et al, the article "Free-standing hybrid film for separation of dye pollutant with self-cleaning ability under visible light", Chemosphere 291, pp. 1-11 (Year: 2021).*

Tianmeng Zhang, et al., "Free-standing hybrid film for separation of dye pollutant with self-cleaning ability under visible light", Chemosphere, vol. 291, Part 1, Mar. 2022, 132725, 5 pages (excerpts only).

Mengni Ge et al., "In situ assembly of graphitic carbon nitride/ polypyrrole in a thin-film nanocomposite membrane with highly enhanced permeability and durability", Desalination, vol. 555, Jun. 1, 2023, 116566, 5 pages (excerpts only).

* cited by examiner

M1

M2

M3

M1

M2

M3

M3

| Elements | Wt.% |
|----------|-------|
| C | 41.07 |
| N | 20.36 |
| O | 34.71 |
| Al | 3.87 |

M1

M2

M3

◌ Oil Droplet

◌ Water

Allow Filtration of Water and
Responsible for Rejection of the Oil

α-Al$_2$O$_3$ Support

α-Al$_2$O$_3$ @PPy/A-g-C$_3$N$_4$

◌ Oil Droplet

◌ Water

α-Al$_2$O$_3$ @PPy/A-g-C$_3$N$_4$

ALUMINA-SUPPORTED POLYPYRROLE MODIFIED OXIDIZED GRAPHITIC CARBON NITRIDE MEMBRANE

STATEMENT REGARDING PRIOR DISCLOSURE BY THE INVENTORS

Aspects of the present disclosure are described in Khan, I. A. et al., "Photo-stimulated self-cleaning oxidized g-C₃N₄-polypyrrole composite membrane for fractionating EBT dyes from salts and separating oil-in-water emulsions" published in Volume 359, Part 3, Separation and Purification Technology, which is incorporated herein by reference in its entirety.

STATEMENT OF ACKNOWLEDGEMENT

Support provided by the Interdisciplinary Research Center for Membranes and Water Security, King Fahd University of Petroleum and Minerals, Saudi Arabia, is gratefully acknowledged.

BACKGROUND

Technical Field

The present disclosure is directed to a membrane, and more preferably, a membrane including two layers containing a first layer including alumina and a second layer including an oxidized graphitic carbon nitride and a polymerized pyrrole.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Rapid industrial growth has driven scientific and technological progress but has also led to severe environmental challenges. Wastewater generated from industries such as textiles, oil extraction, and metallurgy contains synthetic dyes and oils that contaminate water bodies, threatening aquatic ecosystems and public health [Zhu, X. et al., Effective and low fouling oil/water separation by hollow fiber membrane with both hydrophilic and oleophobic surface properties, *Journal of Membrane Science*, 466, 2014, 36-44; and Afridi, M. N. et al., Advances in MXene-based technologies for the remediation of toxic phenols: A comprehensive review, *Advances in Colloid and Interface Science*, 332, 2024, 103250]. Among these pollutants, eriochrome black T (EBT) is widely used and particularly persistent due to its complex molecular structure and resistance to degradation by heat, chemicals, and microorganisms [Abdi, J. et al., Synthesis of metal-organic framework hybrid nanocomposites based on GO and CNT with high adsorption capacity for dye removal, *Chemical Engineering Journal*, 326, 2017, 1145-1158; and Baig, N. et al., Thin polyamide layer cross-linked graphene oxide-based ceramic membranes for efficient separation of surfactant-stabilized oil-in-water emulsions, *Chemical Engineering Research and Design*, 208, 2024, 52-61]. Additionally, emulsified oils stabilized by surfactants present in industrial effluents are difficult to separate using traditional techniques.

To address these challenges, membrane-based technologies, especially ultrafiltration, have gained attention as effective solutions due to their high separation efficiency, low energy demand, compactness, and operational simplicity [Zarghami, S. et al., Superhydrophilic and underwater superoleophobic membranes-A review of synthesis methods, *Progress in Polymer Science*, 98, 2019, 101166; and Venkatesh, K. et al., Hydrophilic hierarchical carbon with TiO₂ nanofiber membrane for high separation efficiency of dye and oil-water emulsion, *Separation and Purification Technology*, 241, 2020, 116709]. Ultrafiltration is recognized among membrane-based technologies for high separation efficiency, continuous processing capabilities, energy efficiency, compact design, and adaptability for integration with other separation techniques. Membrane fouling is a persistent challenge that impairs permeability and separation efficiency, impeding widespread adoption. Mitigation of membrane fouling contributes to longevity and effectiveness of membrane processes. Efficient and eco-friendly methods for removing or breaking down pollutants into smaller and safer constituents have been a focus of progression efforts. In particular, photocatalytic self-cleaning membranes have emerged as an advanced approach capable of degrading organic foulants under light irradiation, restoring permeability after fouling, and extending membrane lifespan. Several photocatalytic materials such as TiO₂, metal-organic frameworks (MOFs), and graphitic carbon nitride (g-C₃N₄) have demonstrated anti-fouling and degradation properties for treating oily and dye-laden wastewater [Li, N. et al., Catalytic membrane-based oxidation-filtration systems for organic wastewater purification: A review, *Journal of Membrane Science*, 414, 2021, 125478; Zhang, M. et al., A critical review of g-C₃N₄-based photocatalytic membranes for water purification, *Chemical Engineering Journal*, 412, 2021, 128663; Zhang, M. et al., Graphitic-like carbon nitride improved thermal stability and photocatalytic anti-fouling performance of polyether sulfone membranes, *Applied Surface Science*, 103, 2018, 40-48; and Li, F. et al., A mussel-inspired method to fabricate reduced graphene oxide/g-C₃N₄ composite membranes for catalytic decomposition and oil-in-water emulsion separation, *Chemical Engineering Journal*, 322, 2017, 33-45]. A drawback of current polymer-based photocatalytic membranes including polyvinylidene fluoride, polyethersulfone, and cellulose aetate is their poor chemical and ultravoilet stability, which leads to degradation and performance loss under prolonged exposure. Although inorganic membranes including Al₂O₃ and SiO₂ offers increased thermal and chemical resistance, achieving a stable and efficient photocatalytic layer. Developing durable and highly active photocatalytic membranes is needed to advance sustainable and long-term wastewater treatment solutions.

Accordingly, an object of the present disclosure to provide a photocatalytic active membrane that may circumvent drawbacks and limitations of membranes and methods known in the art.

SUMMARY

In an exemplary embodiment, a membrane including a first layer including alumina and a second layer including an oxidized carbon nitride and a polymerized pyrrole (also referred to as α-Al₂O₃@PPy/O-g-C₃N₄ membrane) is described. Carboxylic groups and hydroxyl groups in the oxidized carbon nitride interact via electrostatic interactions with polar groups in the polymerized pyrrole. The second layer is a nanofibrous mass including entangled nanofibers. The second layer has a thickness of 1 to 3 μm.

In some embodiments, the nanofibers have a length of 50 to 500 nm and a width of 2 to 20 nm.

In some embodiments, the membrane includes carbon in an amount of 30 to 50 percent by weight (wt. %), nitrogen in an amount of 10 to 30 wt. %, oxygen in an amount of 30 to 40 wt. %, and aluminum in an amount of 3 to 5 wt. % based on a total weight of the membrane.

In some embodiments, the oxidized graphitic carbon nitride and the polymerized pyrrole interact via π-π interactions.

In some embodiments, the first layer and the second layer interact through electrostatic interactions.

In some embodiments, the membrane has a water contact angle of 10° to 15°.

In some embodiments, the membrane has an underwater oil contact angle of 145° to 160°.

In some embodiments, the membrane has a pure water flux of 20 to 30 liters per square meter per hour (LMH) at a pressure of 1 bar.

In some embodiments, a method of oil and water separation includes contacting an emulsion including oil and water with the membrane and collecting a permeate. The permeate has a lesser amount of oil than the emulsion.

In some embodiments, the membrane has an oil rejection efficiency of 99% based on an initial concentration of the oil in the emulsion.

In some embodiments, the water forms a hydration layer on a surface of the membrane via hydrogen bonding with oxygen-containing groups and nitrogen-containing groups of the membrane to reject the oil.

In some embodiments, the membrane has an emulsion flux of 20 to 30 LMH at a pressure of 1 bar.

In some embodiments, the oil is selected from the group consisting of vegetable oil, diesel oil, and petroleum ether oil.

In some embodiments, a method of degrading pollutants includes contacting the membrane with a solution including one or more pollutants and hydrogen peroxide in a reactor and irradiating the reactor with light to degrade the pollutants.

In some embodiments, the method further includes irradiating the membrane with ultraviolet light for at least 20 minutes to clean the membrane. After the irradiation, the membrane has a flux rate of at least 85% of the initial flux rate of the membrane.

In some embodiments, the membrane has an Eriochrome Black T (EBT) rejection efficiency of at least 95% based on an initial amount of the EBT.

In some embodiments, the membrane has a magnesium chloride salt permeability rate of at least 80% based on an initial amount of the magnesium chloride.

In some embodiments, the membrane has a magnesium sulfate salt permeability rate of at least 75% based on an initial amount of the magnesium sulfate.

In some embodiments, the membrane has a sodium chloride salt permeability rate of at least 90% based on an initial amount of the sodium chloride.

In some embodiments, the membrane has a sodium sulfate salt permeability rate of at least 95% based on an initial amount of the sodium sulfate.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

5

6

Figure 8A:
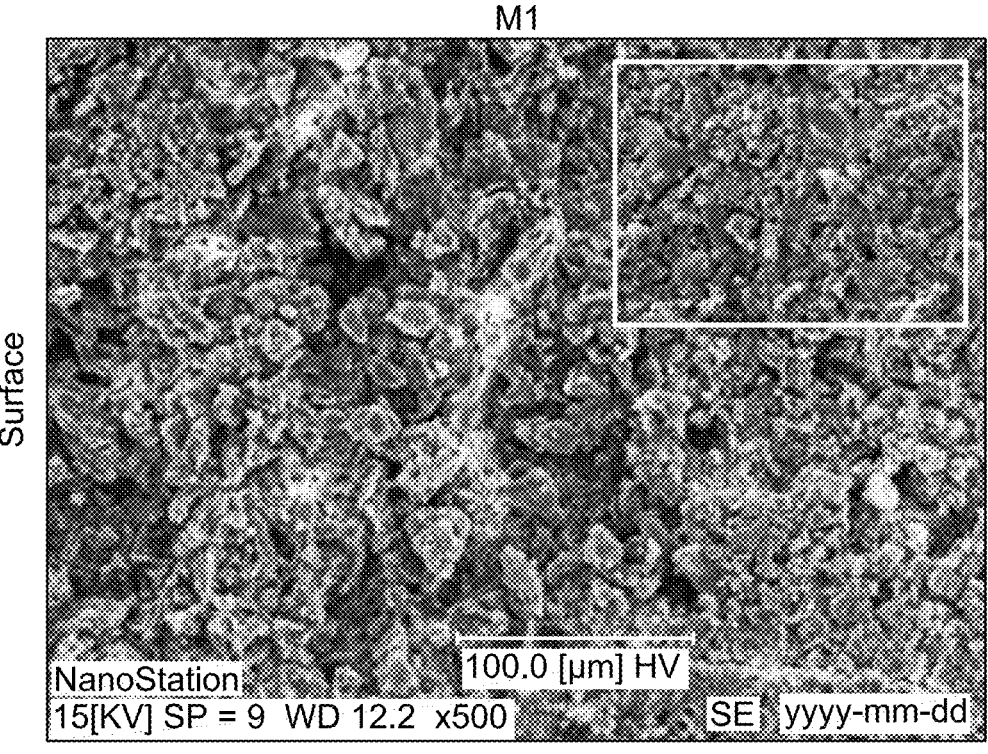
FIG. 8A is a scanning electron microscopy (SEM) image of an $\alpha$-$Al_2O_3$ membrane (M1), according to certain embodiments.
Figure 8B:
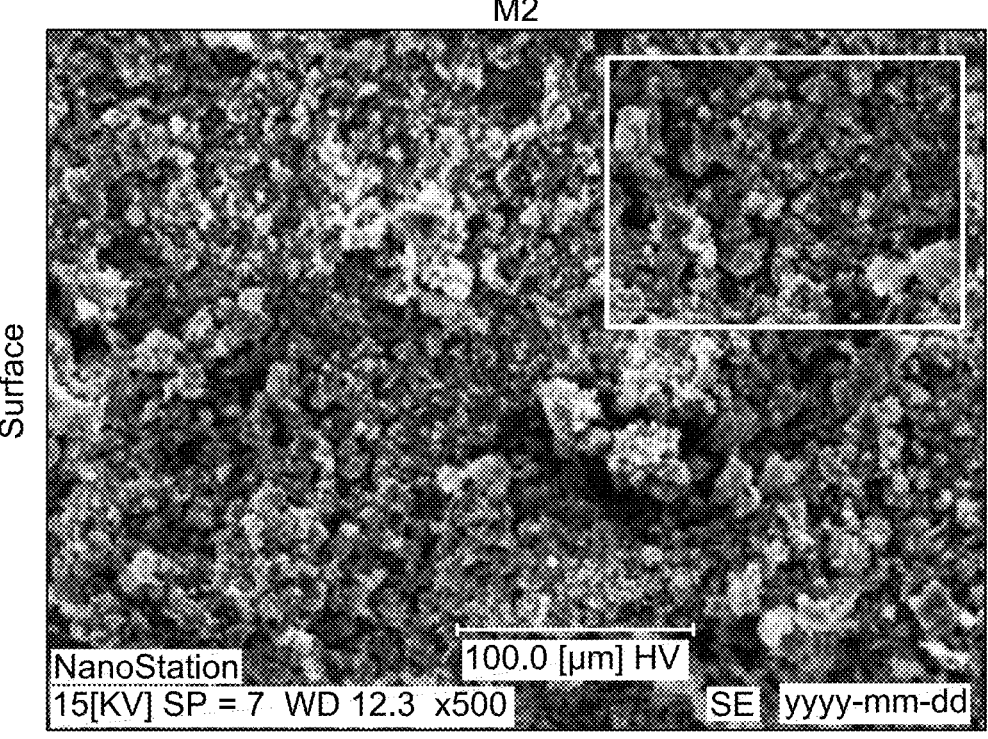

FIG. 8B is an SEM image of an α-aluminum oxide supported polypyrrole modified graphitic carbon modified (α-Al₂O₃@PPy/g-C₃N₄) membrane (M2), according to certain embodiments.

Figure 8C:
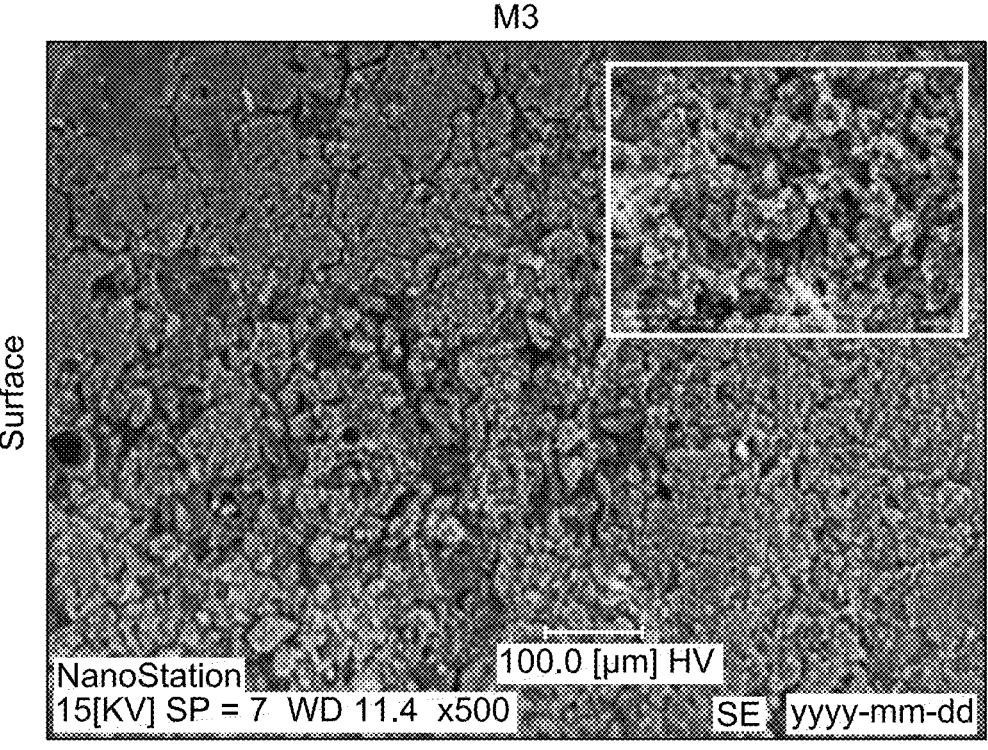

FIG. 8C is an SEM image of an α-aluminum oxide supported polypyrrole modified oxidized graphitic carbon modified (α-Al₂O₃@PPy/O-g-C₃N₄) membrane (M3), according to certain embodiments.

Figure 8D:
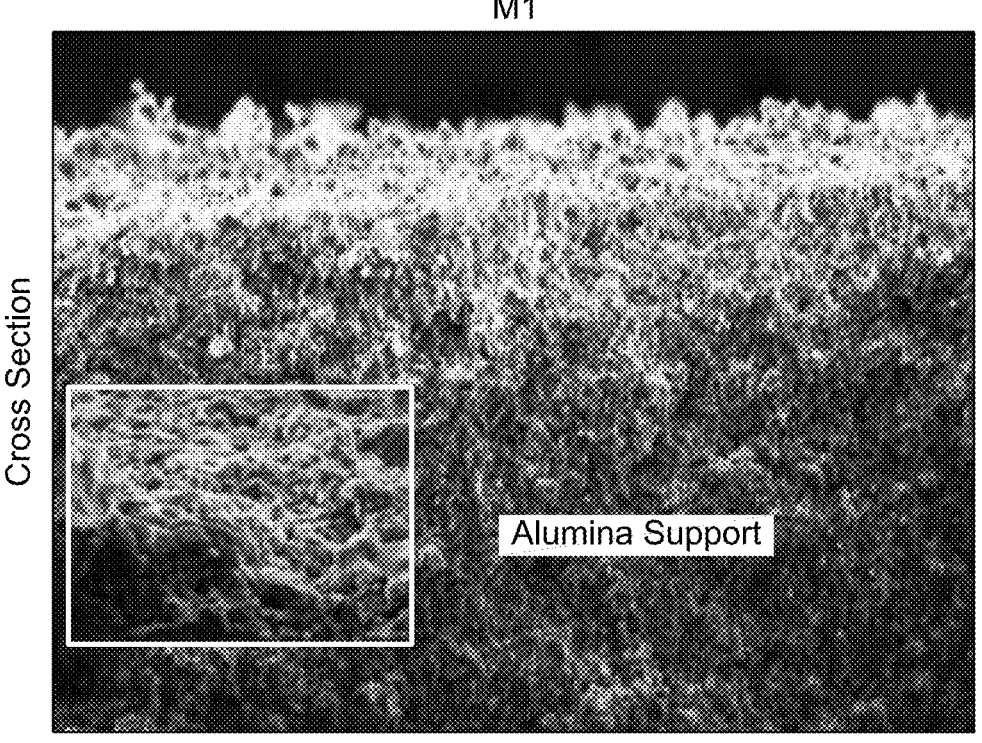

FIG. 8D depicts a cross-sectional view of M1, according to certain embodiments.

Figure 8E:
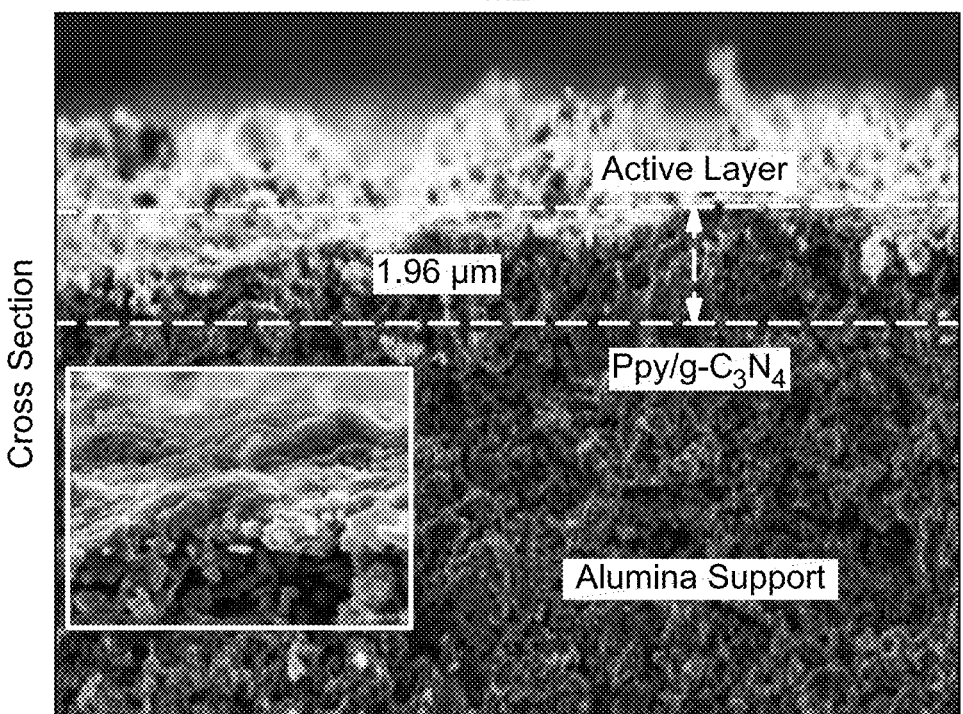

FIG. 8E depicts a cross-sectional view of M2, according to certain embodiments.

Figure 8F:
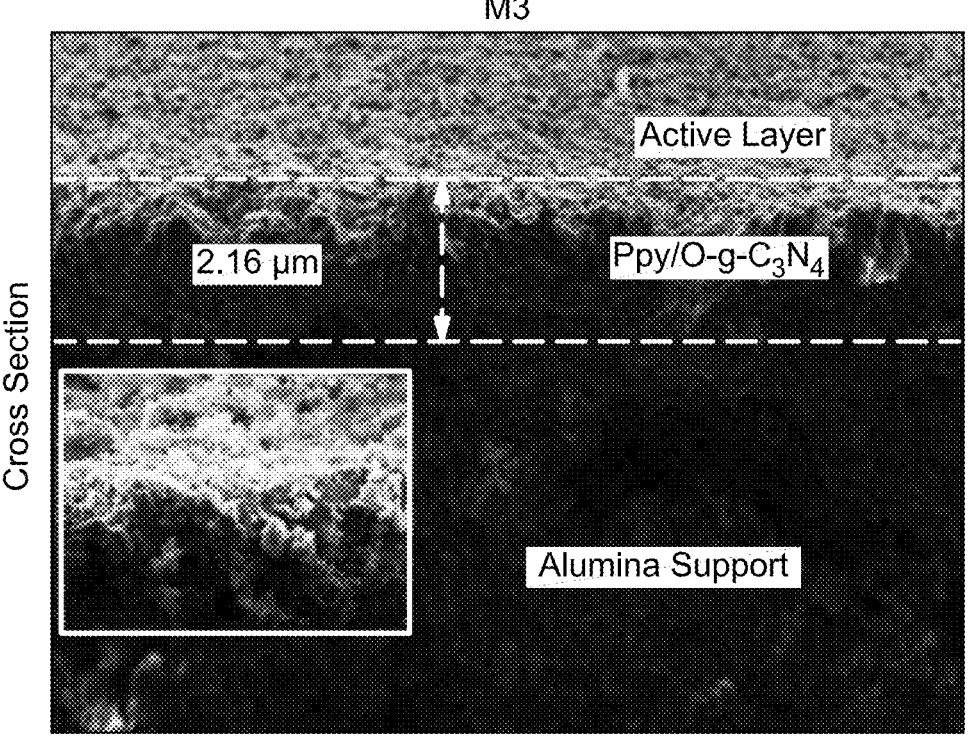

FIG. 8F depicts a cross-sectional view of M3, according to certain embodiments.

Figure 8G:
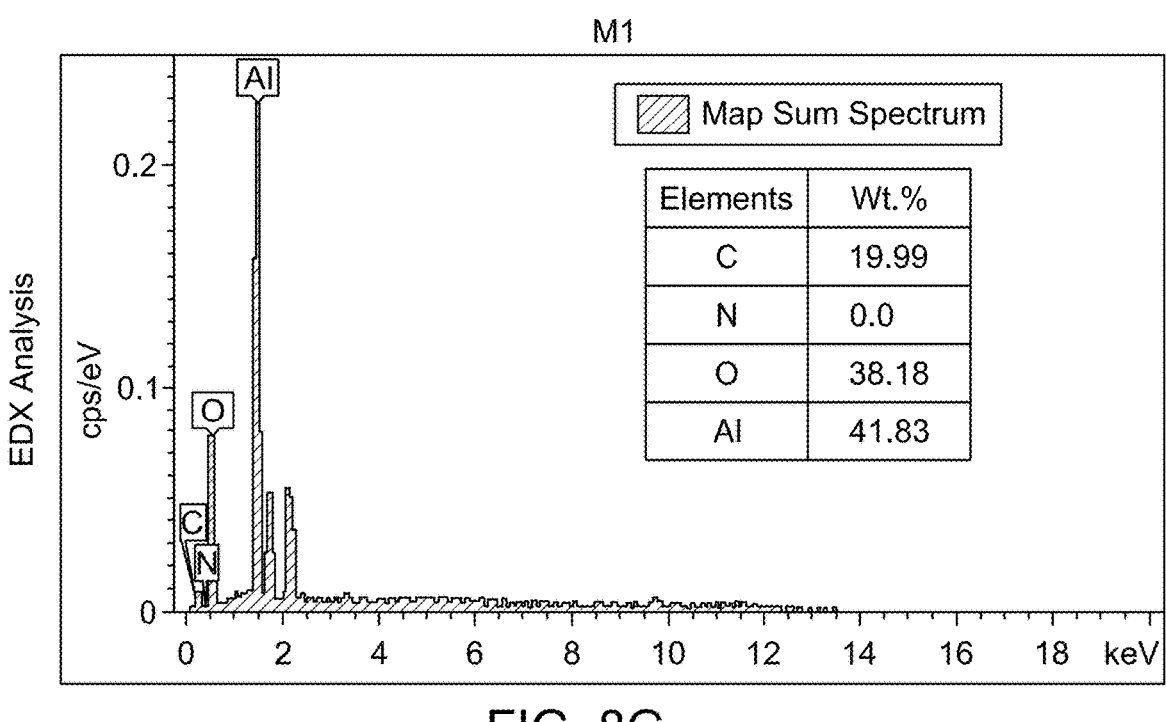

FIG. 8G is an energy dispersive X-ray diffraction (EDX) spectrum of M1, according to certain embodiments.

Figure 8H:
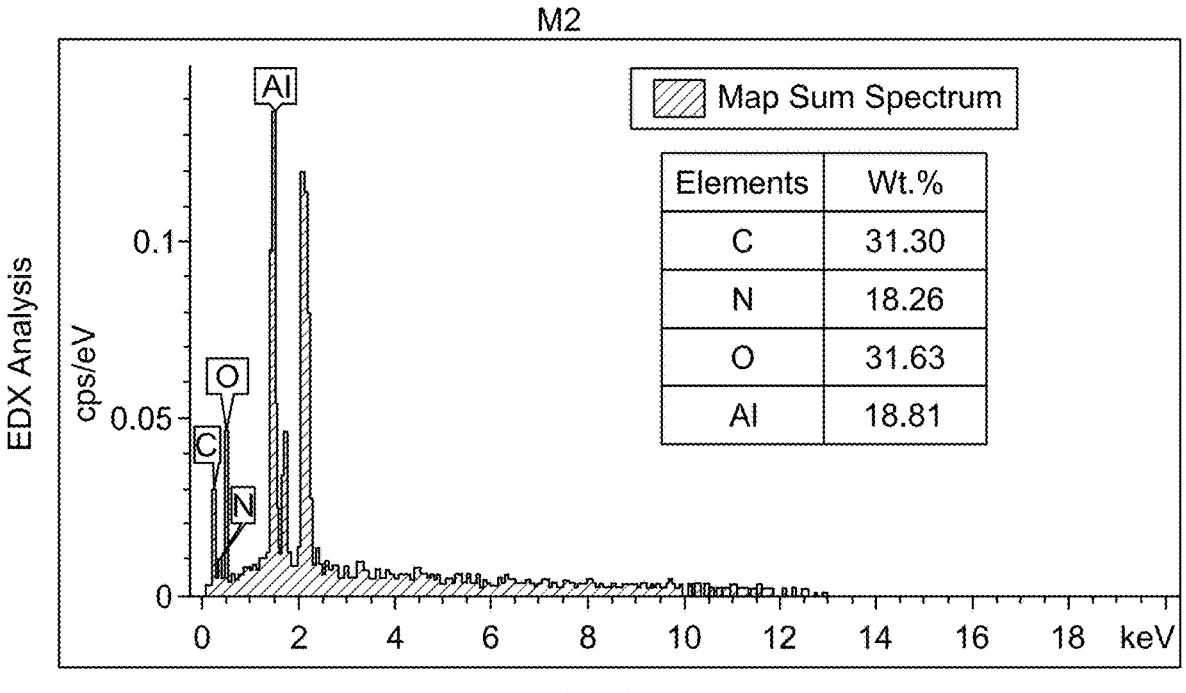

FIG. 8H is an EDX spectrum of M2, according to certain embodiments.

Figure 8I:
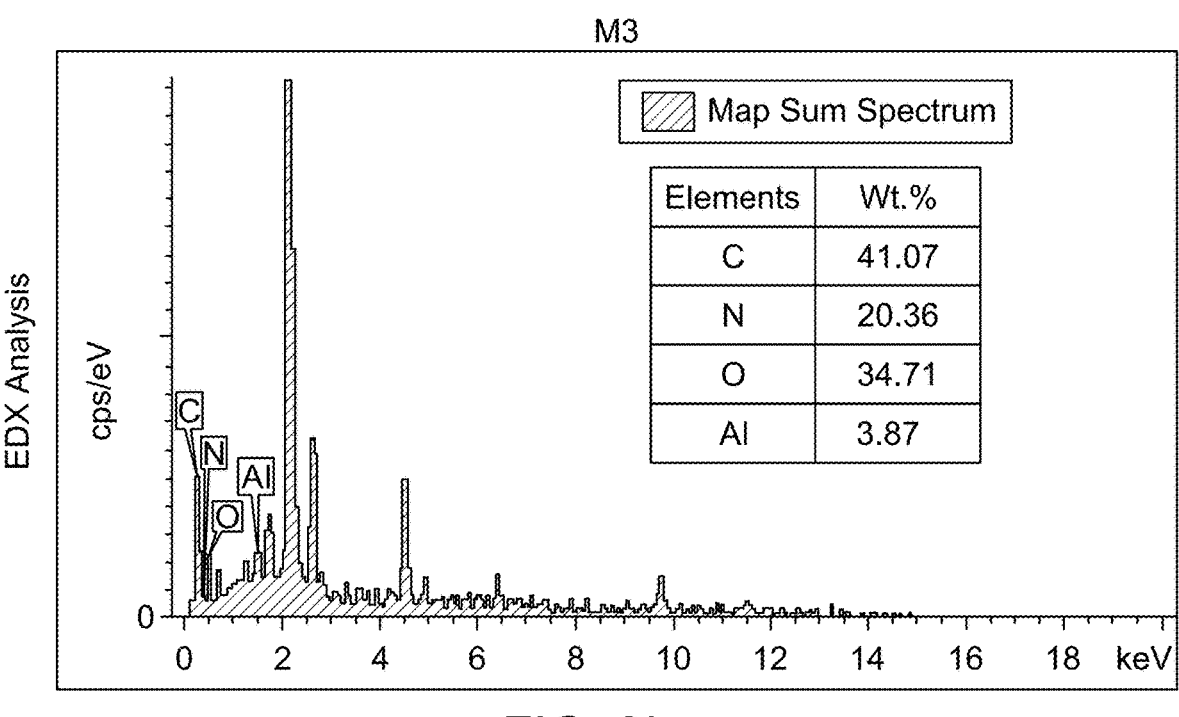

FIG. 8I is an EDX spectrum of M3, according to certain embodiments.

Figure 8J:
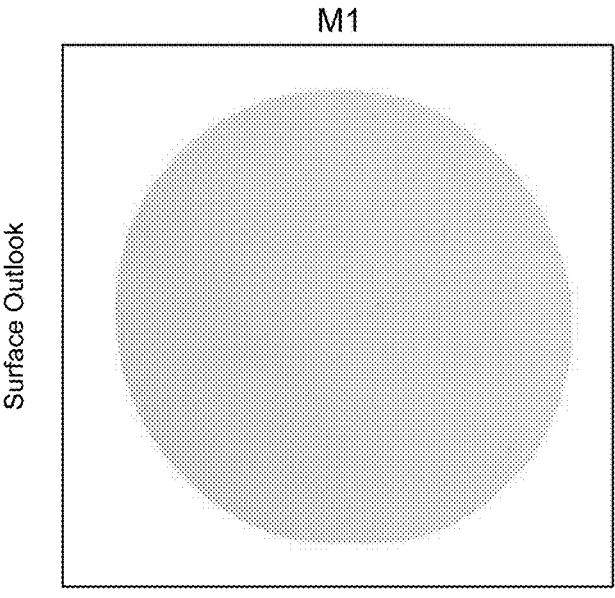

FIG. 8J depicts a surface outlook of M1 after modification, according to certain embodiments.

Figure 8K:
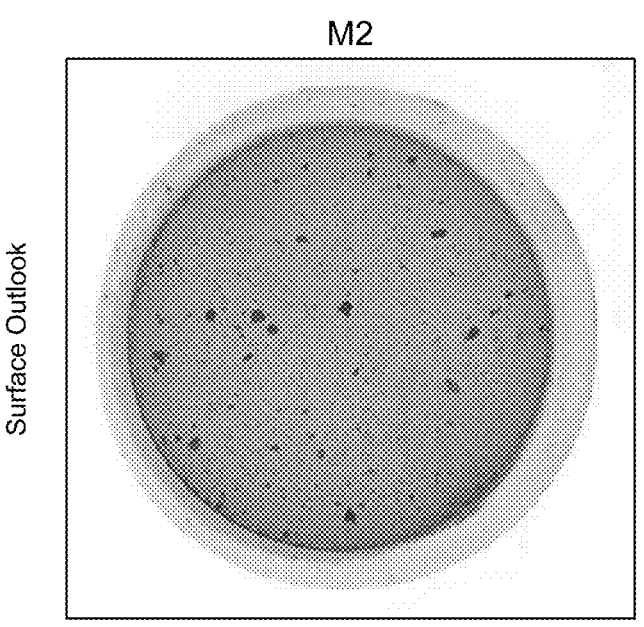

FIG. 8K depicts a surface outlook of M2 after modification, according to certain embodiments.

Figure 8L:
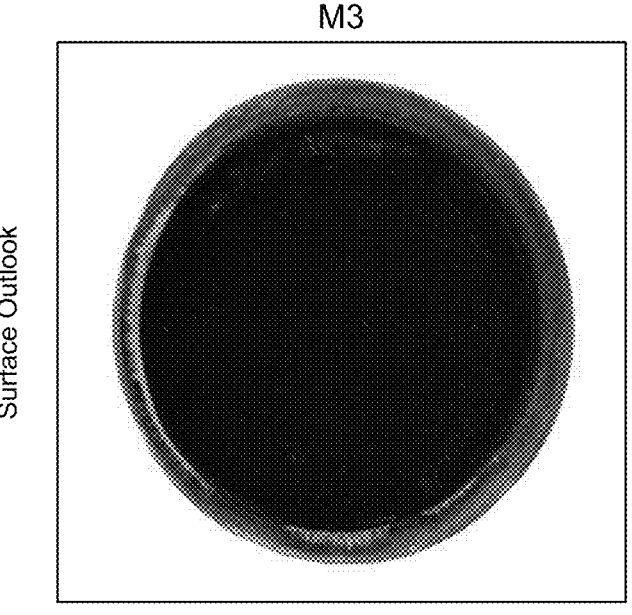

FIG. 8L depicts a surface outlook of M3 after modification, according to certain embodiments.

Figure 9A:
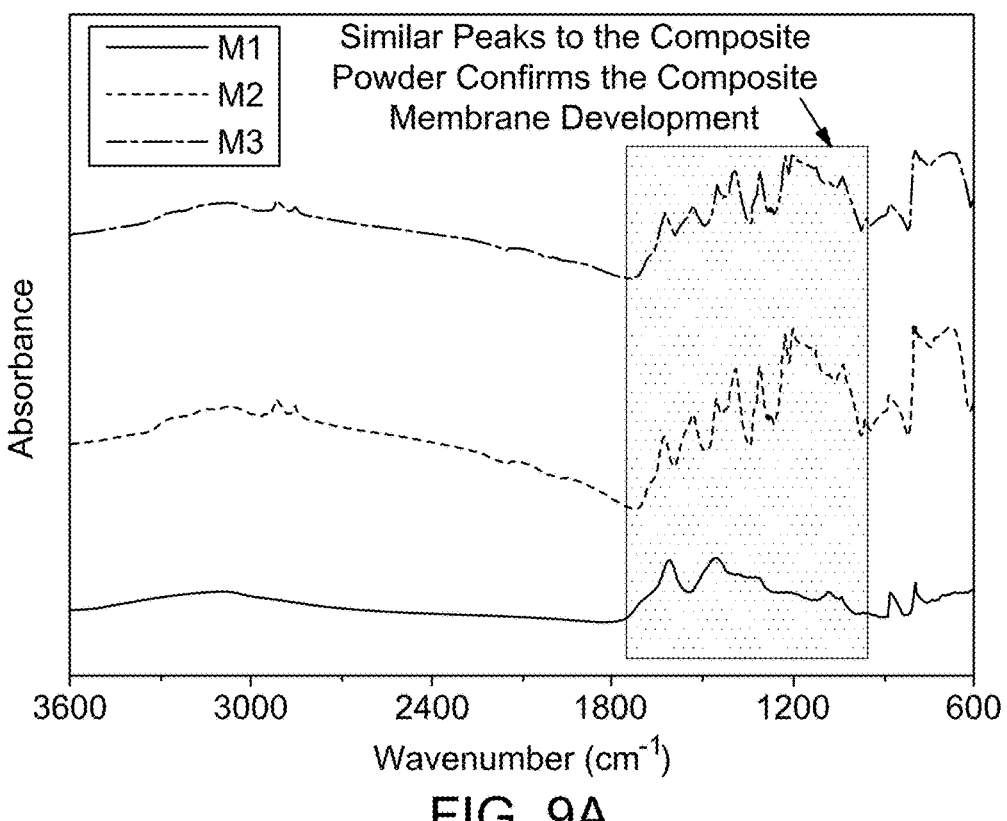

FIG. 9A depicts FTIR spectra of M1, M2, and M3, according to certain embodiments.

Figure 9B:
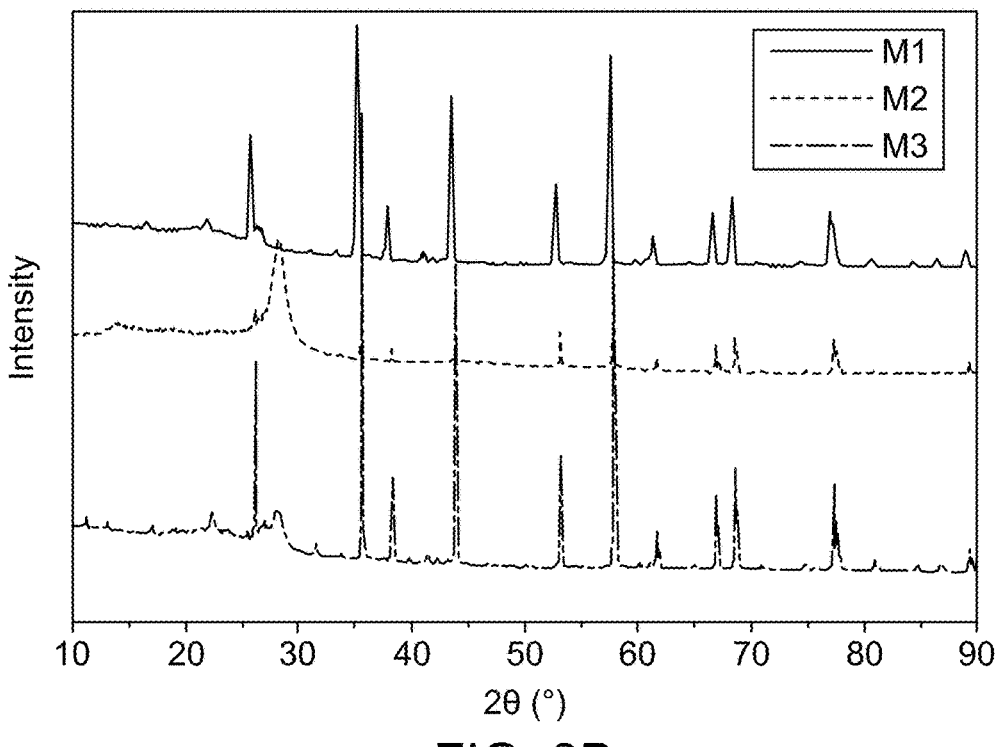

FIG. 9B depicts XRD spectra of M1, M2, and M3, according to certain embodiments.

Figure 10A:
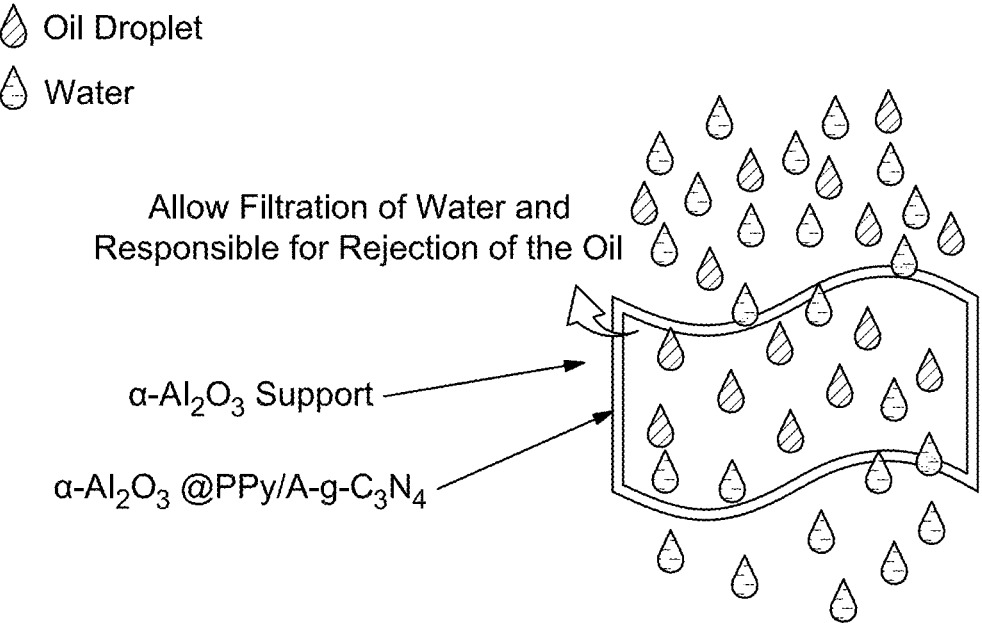

FIG. 10A depicts a wettability mechanism of M3 under water and oil, according to certain embodiments.

Figure 10B:
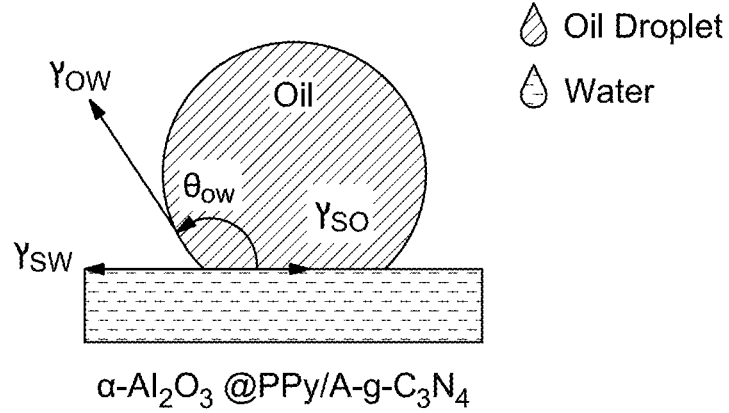

FIG. 10B depicts a wettability mechanism of M3 under water and oil, according to certain embodiments.

Figure 10C:
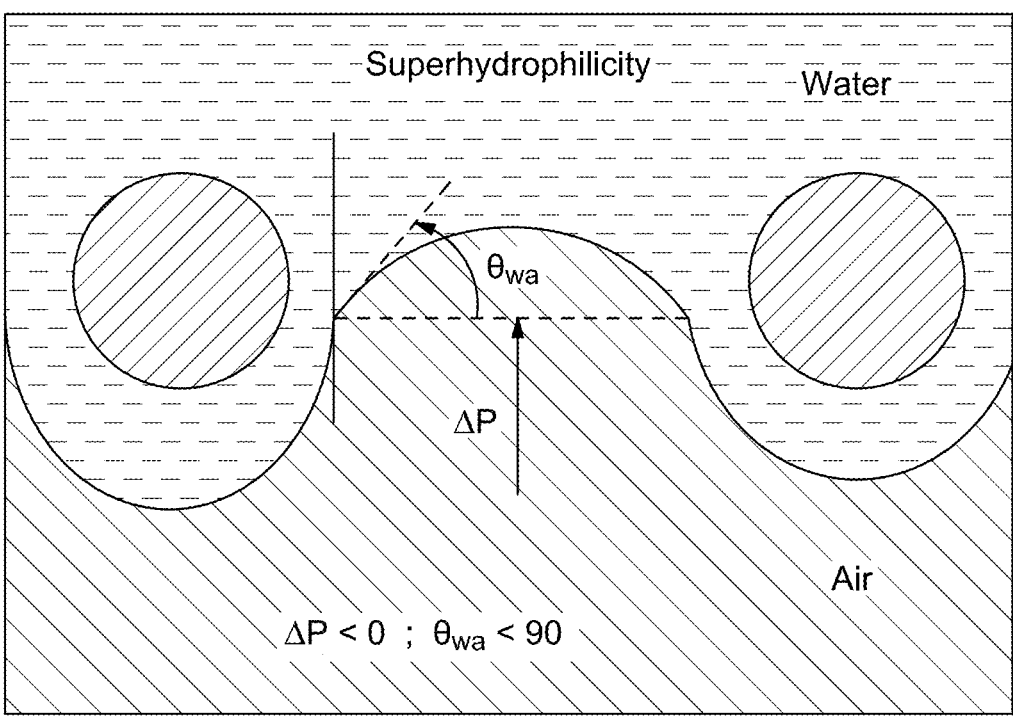

FIG. 10C depicts a superhydrophilicity mechanism of M3, according to certain embodiments.

Figure 10D:
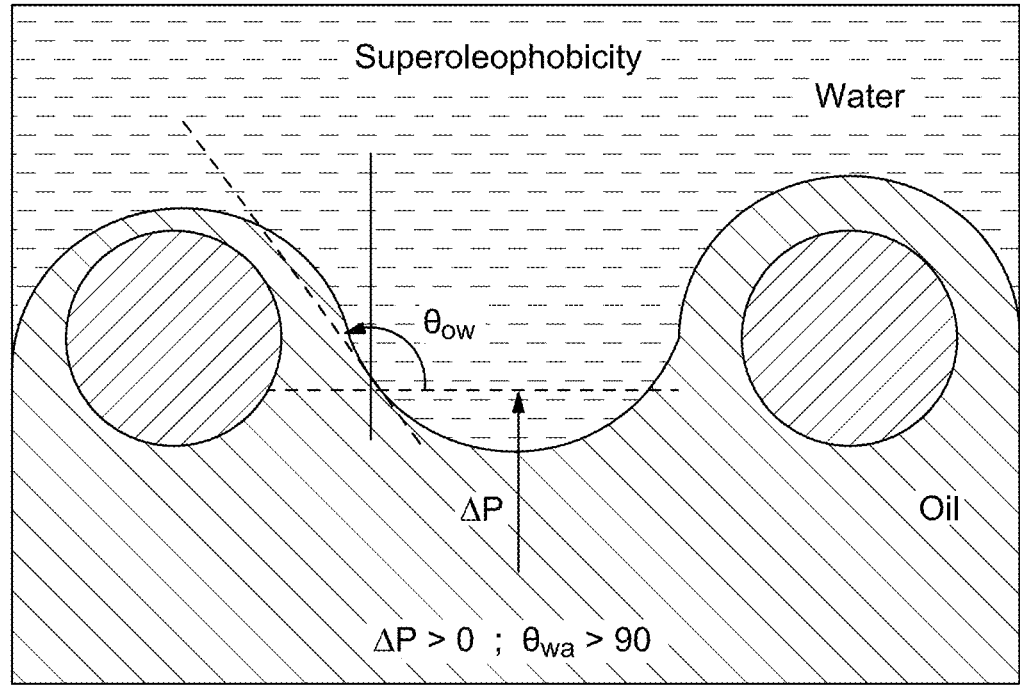

FIG. 10D depicts a superoleophobicity mechanism of M3, according to certain embodiments.

Figure 10E:
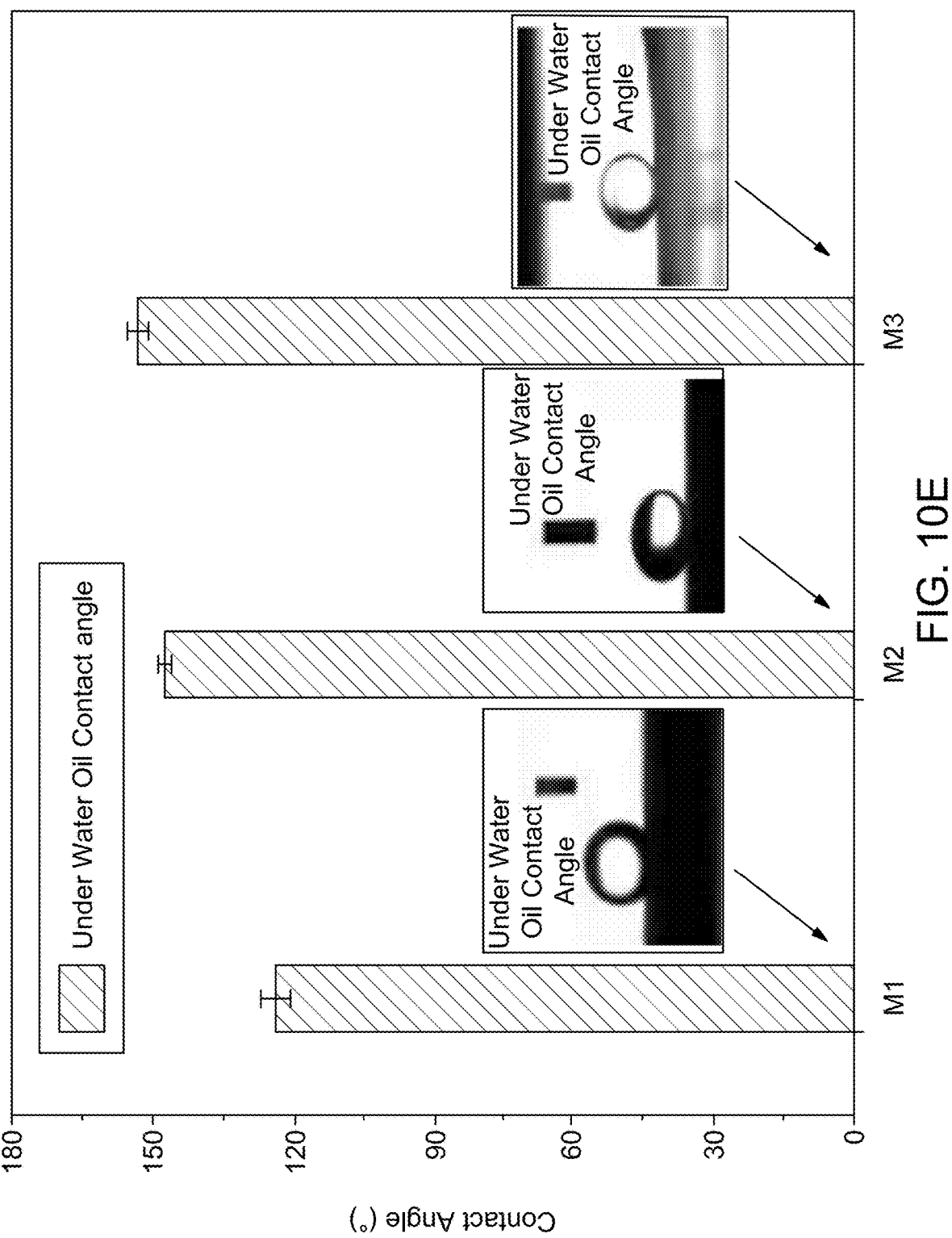

FIG. 10E is a bar graph depicting a wettability analysis of M1, M2, and M3, according to certain embodiments.

Figure 11A:
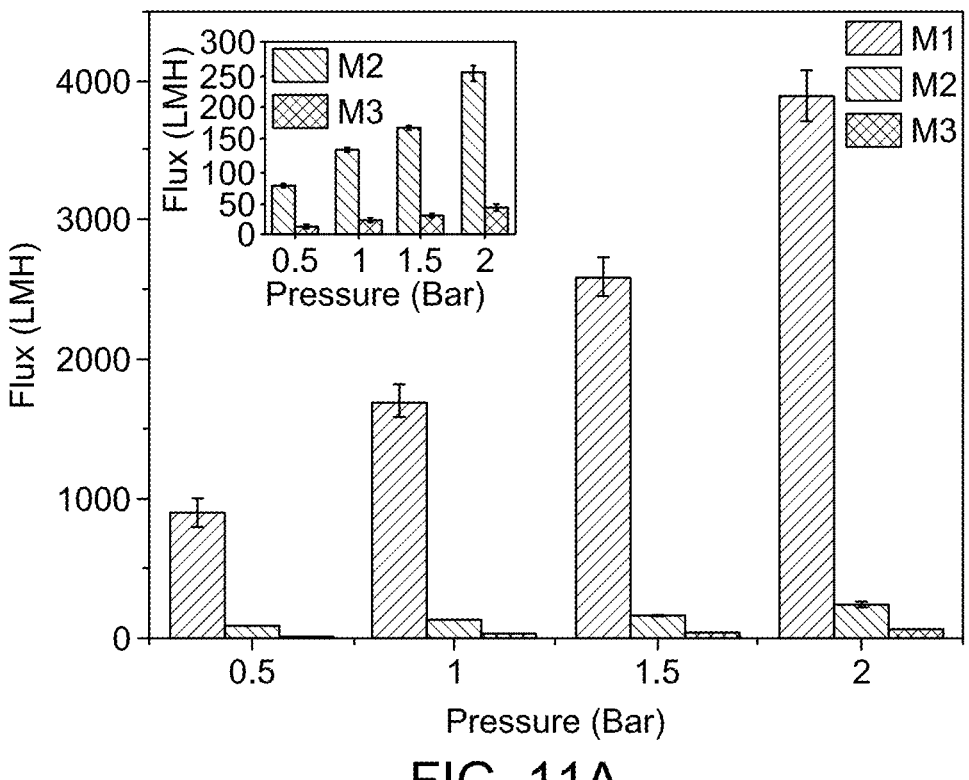

FIG. 11A is a bar graph depicting pure water flux variation of M1, M2, and M3 at different pressures, according to certain embodiments.

Figure 11B:
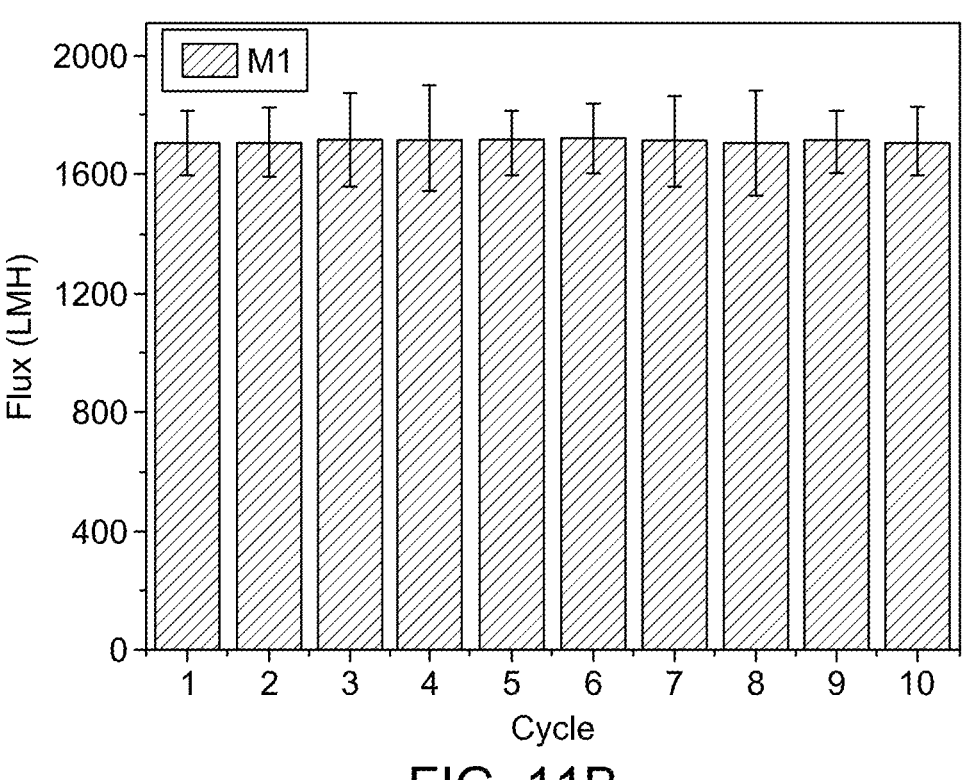

FIG. 11B is a bar graph depicting pure water flux variation of M1 at 1 bar, according to certain embodiments.

Figure 11C:
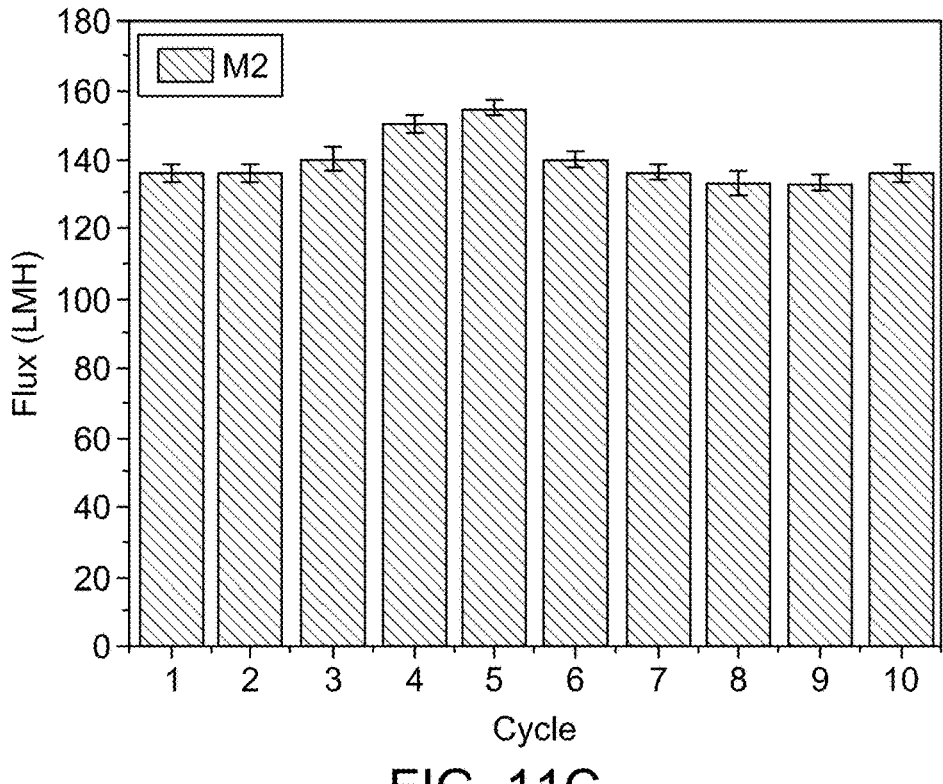

FIG. 11C is a bar graph depicting pure water flux variation of M2 at 1 bar, according to certain embodiments.

Figure 11D:
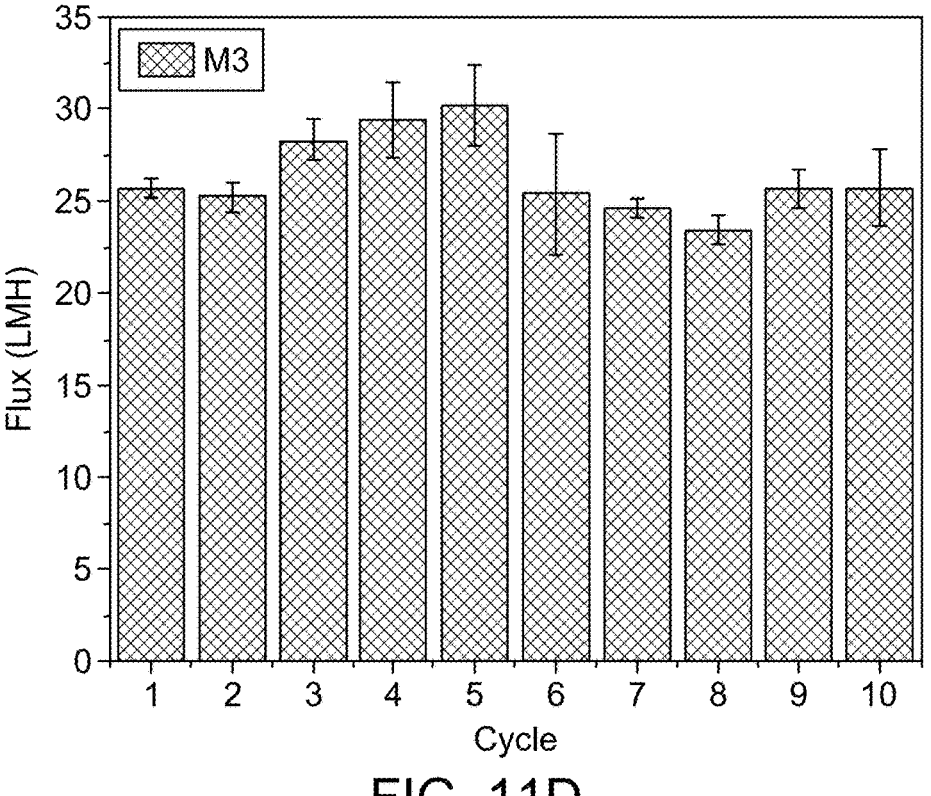

FIG. 11D is a bar graph depicting pure water flux variation of M3 at 1 bar, according to certain embodiments.

Figure 12A:
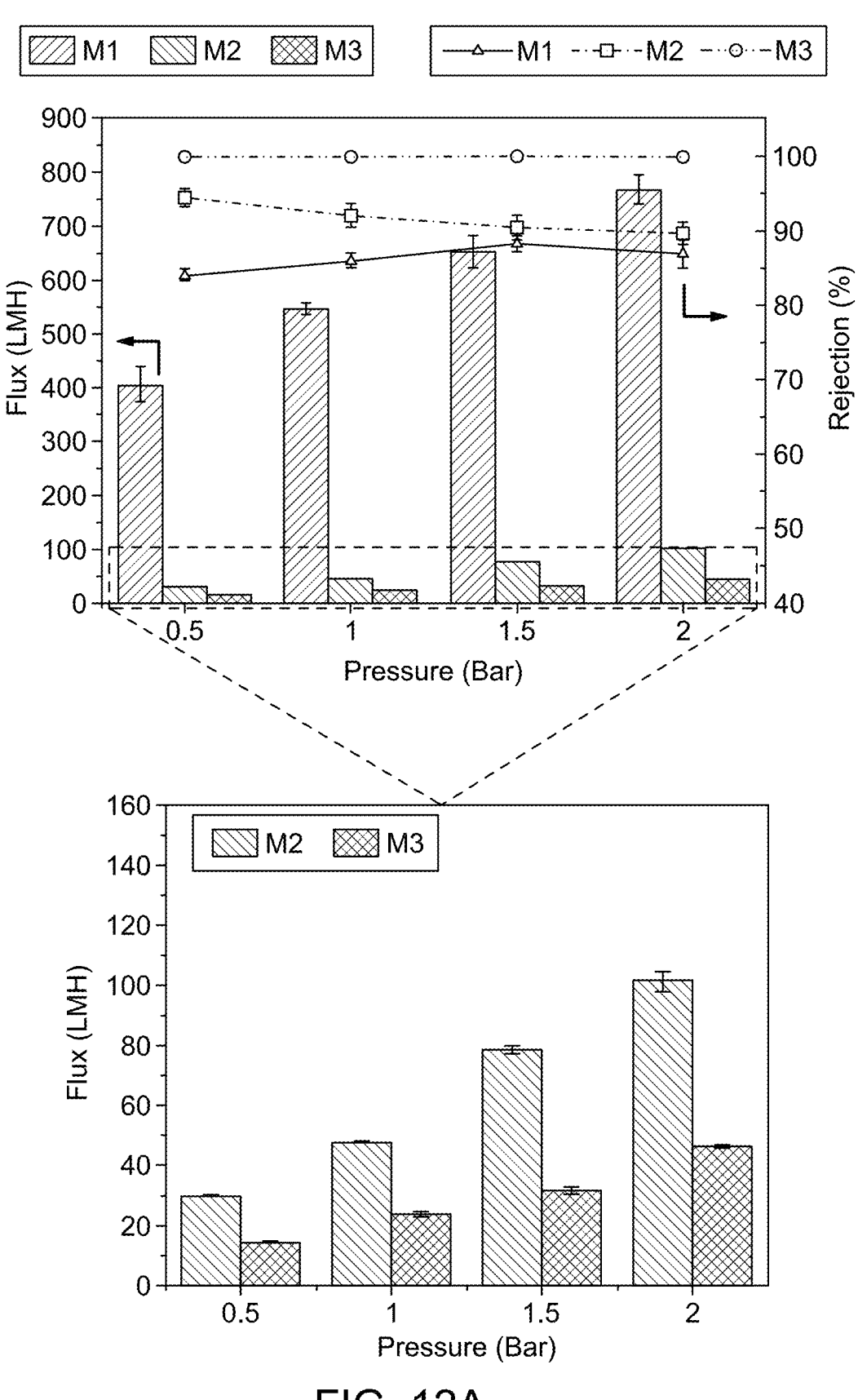

FIG. 12A is a bar graph depicting flux values for M1, M2, and M3 at different pressures using vegetable oil, according to certain embodiments.

Figure 12B:
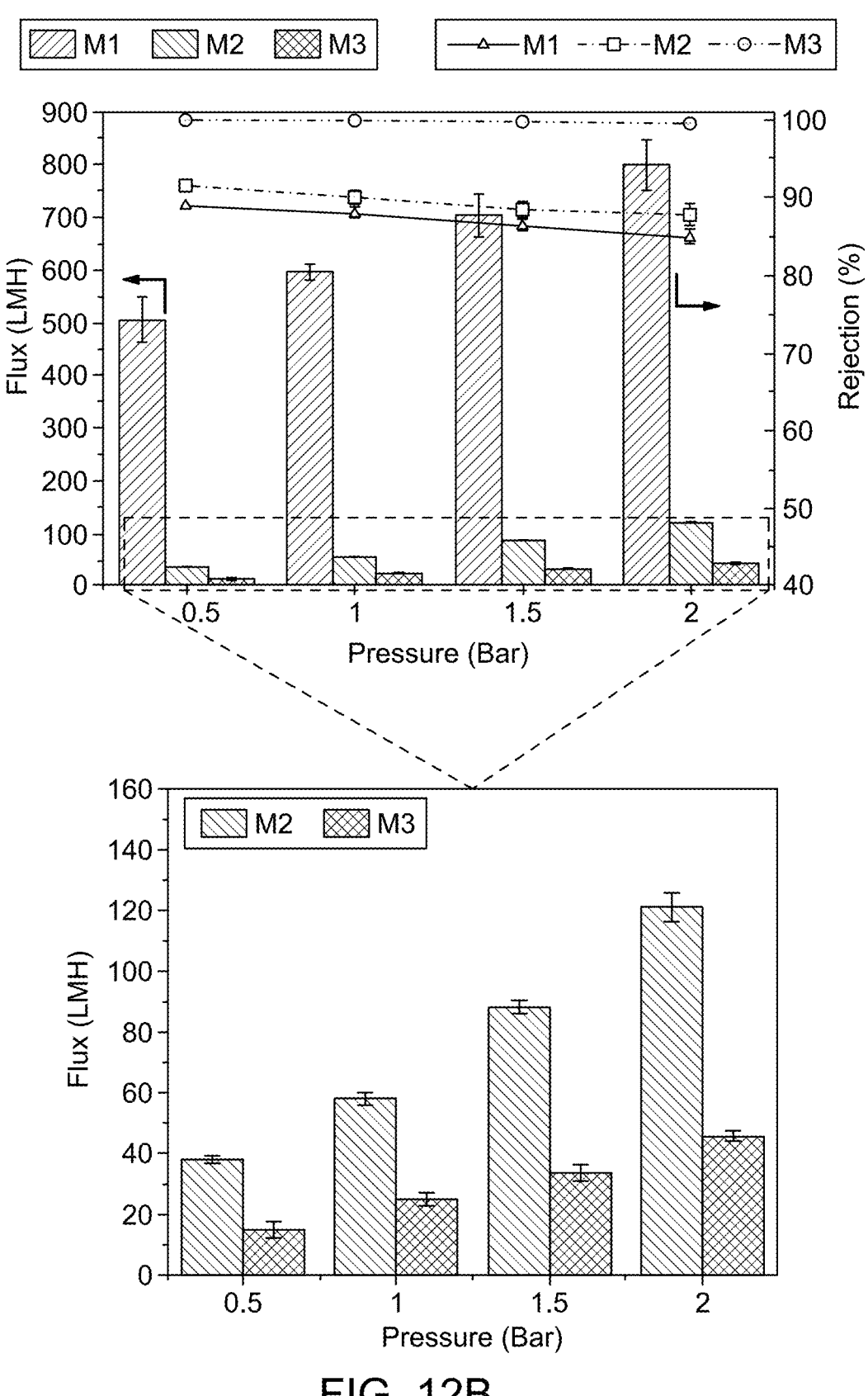

FIG. 12B is a bar graph depicting flux values for M1, M2, and M3 at different pressures using diesel, according to certain embodiments.

Figure 12C:
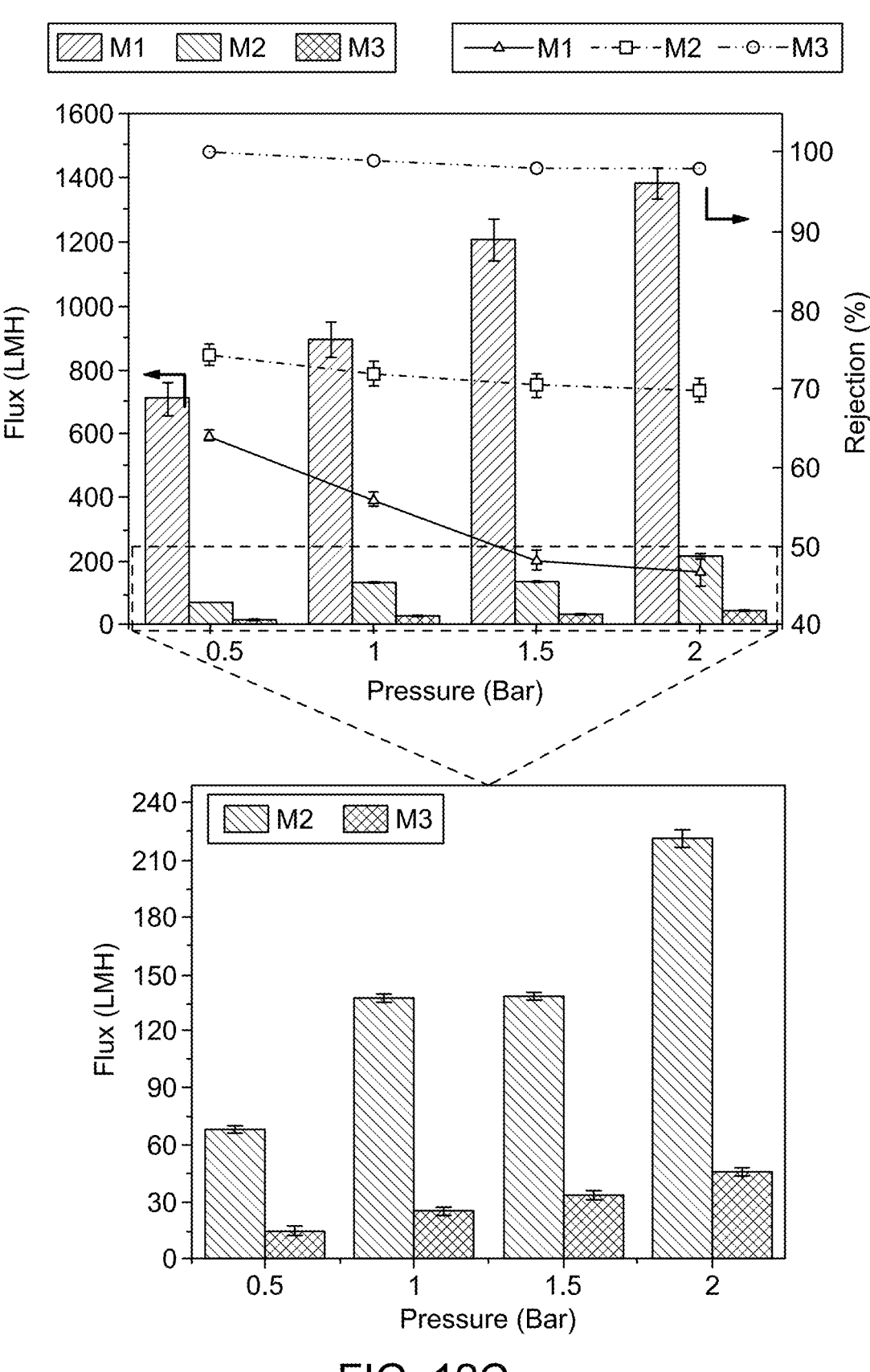

FIG. 12C is a bar graph depicting flux values for M1, M2, and M3 at different pressures using petroleum ether oil, according to certain embodiments.

Figure 13A:
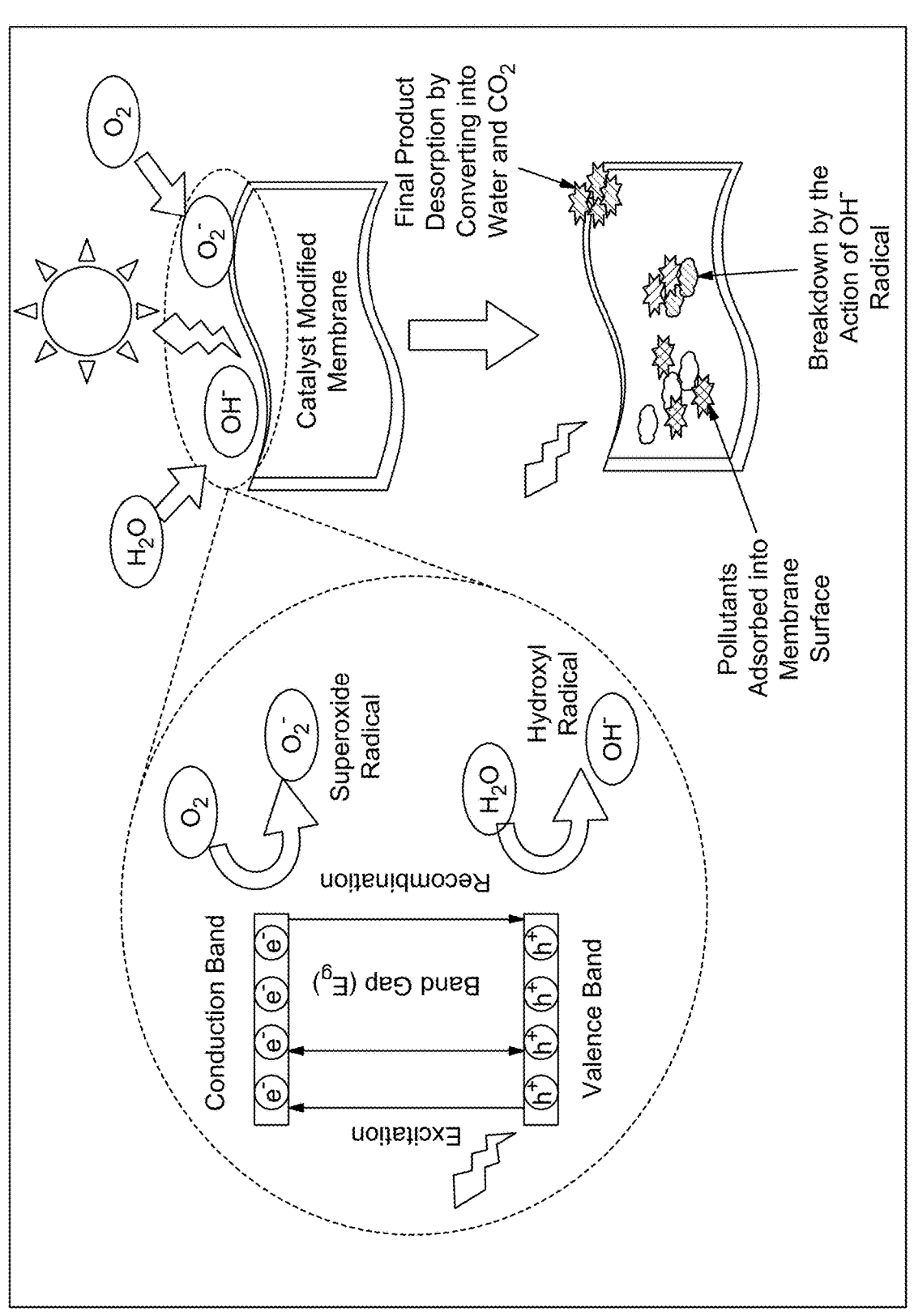

FIG. 13A is a schematic depicting photocatalytic self-cleaning of PPy/O-g-C₃N₄, according to certain embodiments.

Figure 13B:
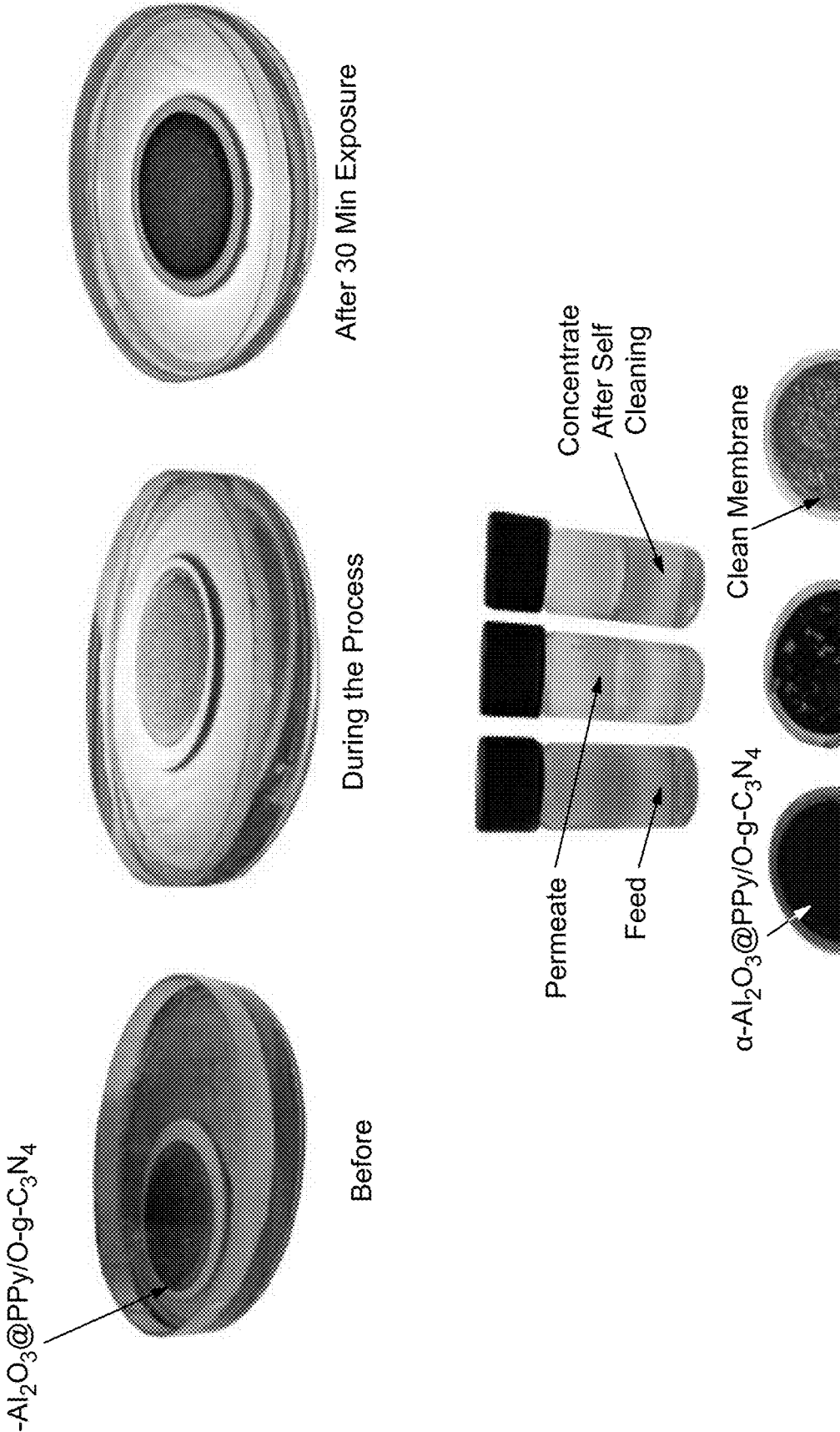

FIG. 13B depicts solar light simulated degradation of an Eriochrome Black T (EBT) dye by M3 and images of changes in a fouled membrane after self-cleaning, according to certain embodiments.

Figure 13C:
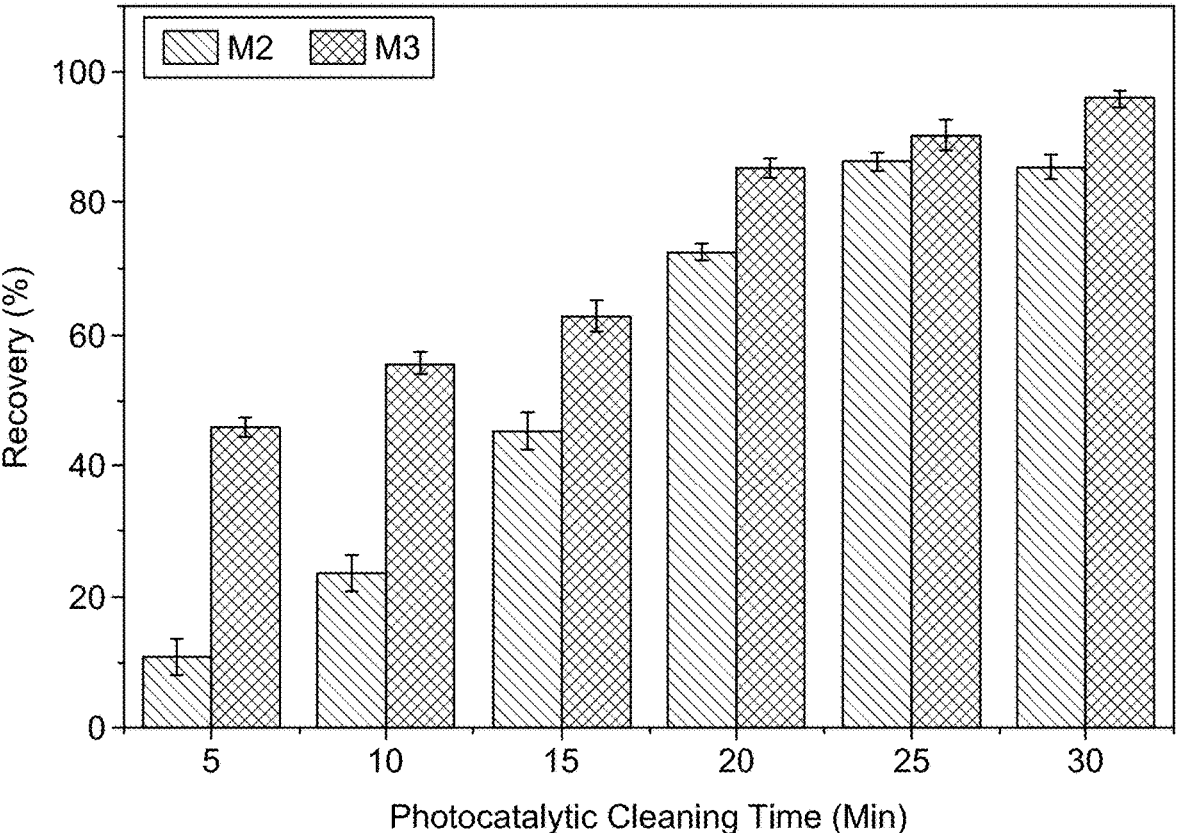

FIG. 13C is a bar graph depicting recovery percentage for M2 and M3 by exposing them to ultraviolet (UV) light for 30 minutes, according to certain embodiments.

Figure 14A:
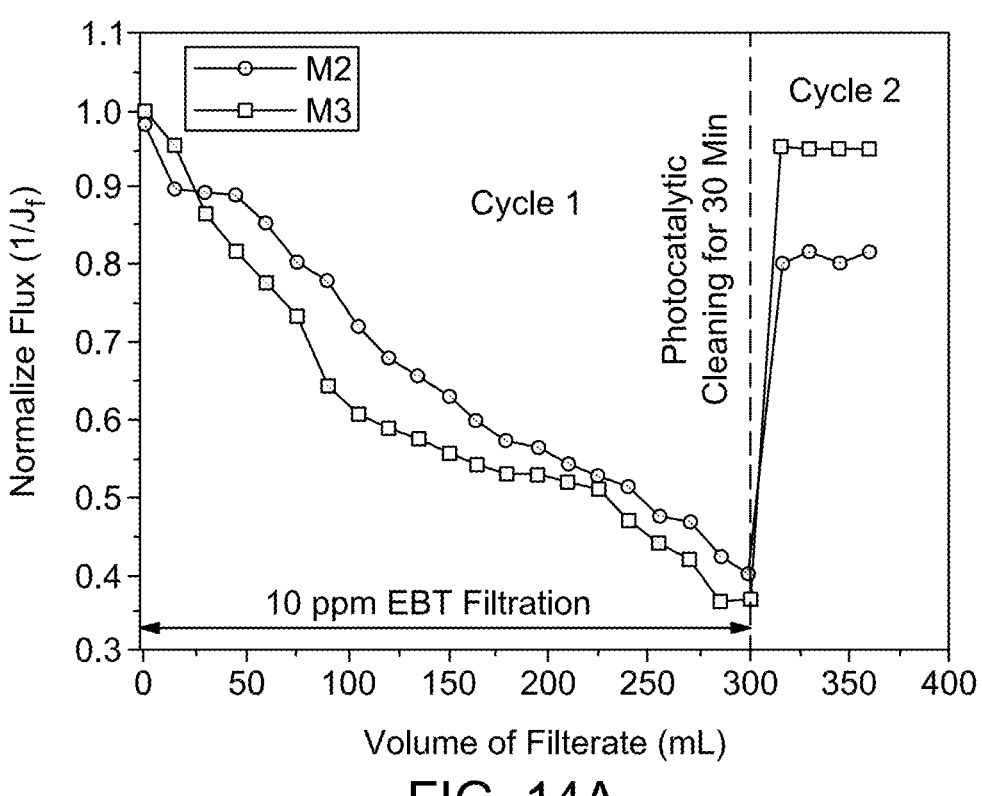

FIG. 14A is graph depicting a flux decline and flux recovery analysis of M2 and M3 with 10 ppm EBT exposure, according to certain embodiments.

Figure 14B:
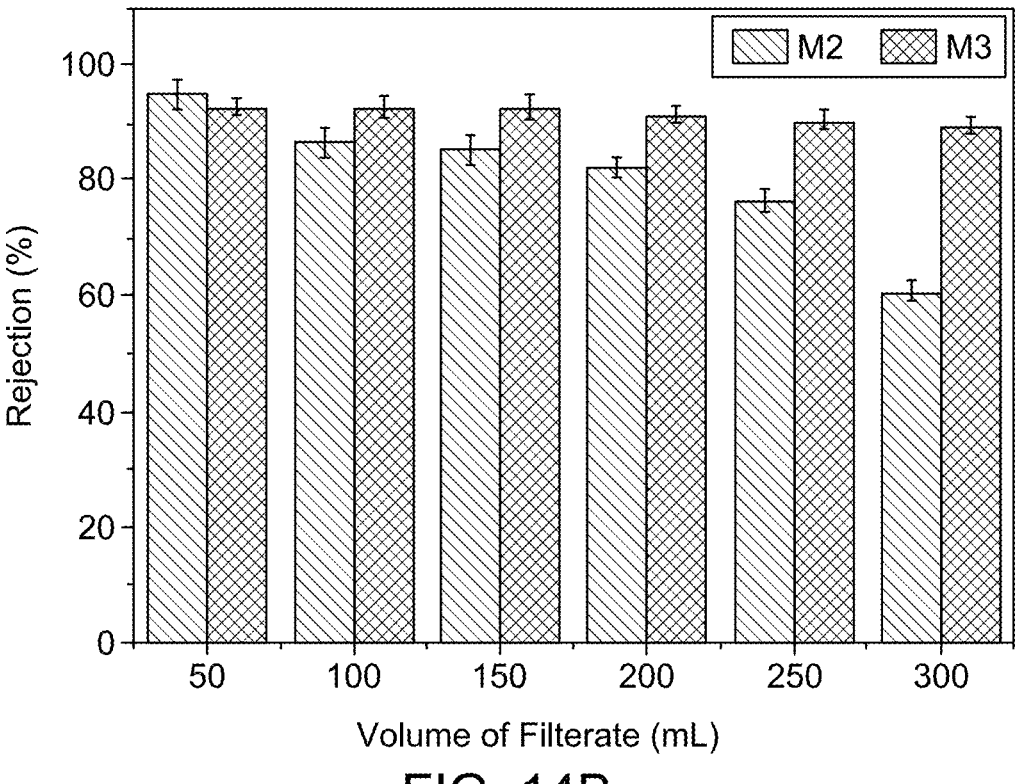

FIG. 14B is a bar graph depicting rejection efficiency of EBT by M2 and M3, according to certain embodiments.

Figure 14C:
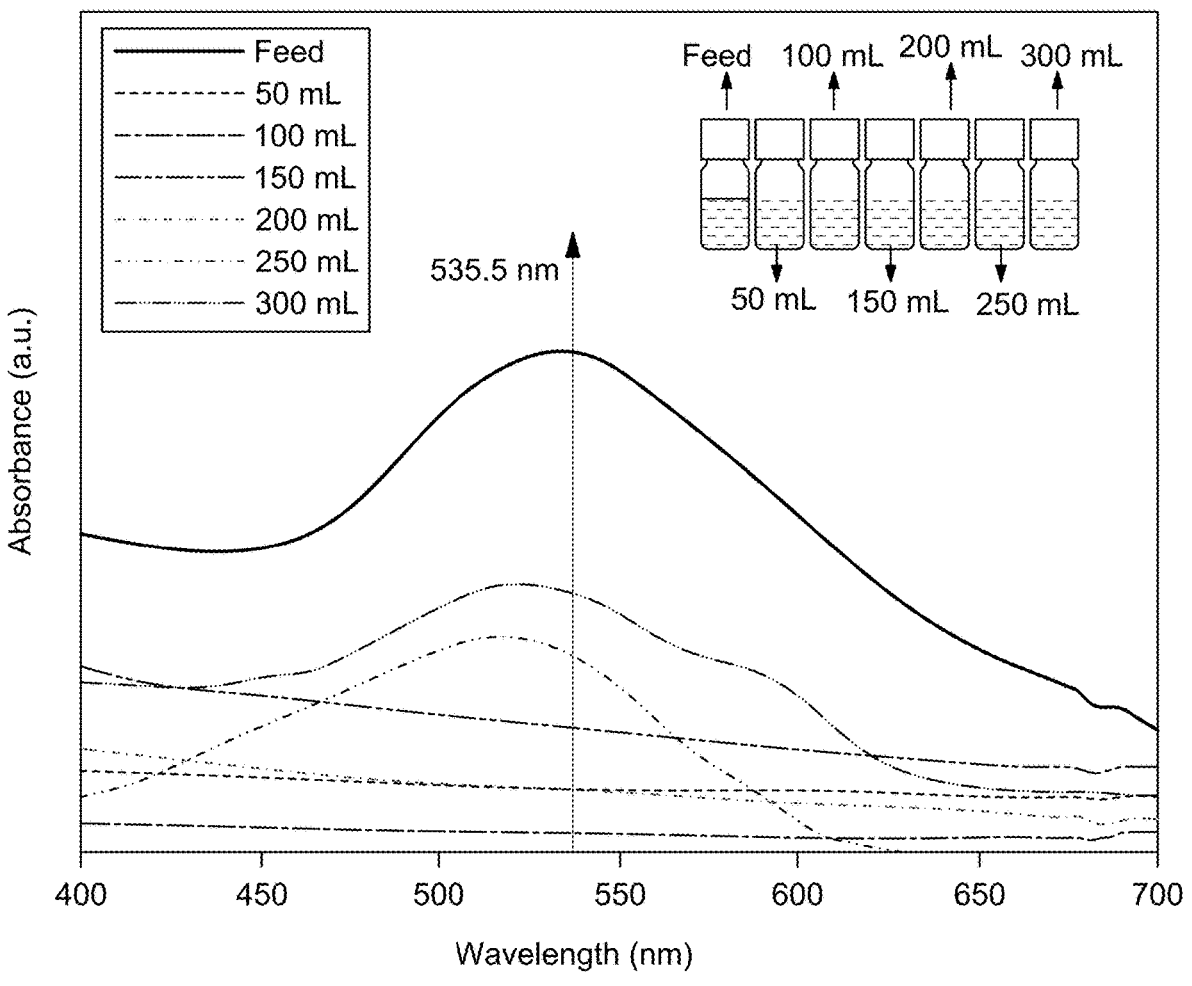

FIG. 14C is a graph depicting UV-vis spectra of EBT rejections from M2, according to certain embodiments.

Figure 14D:
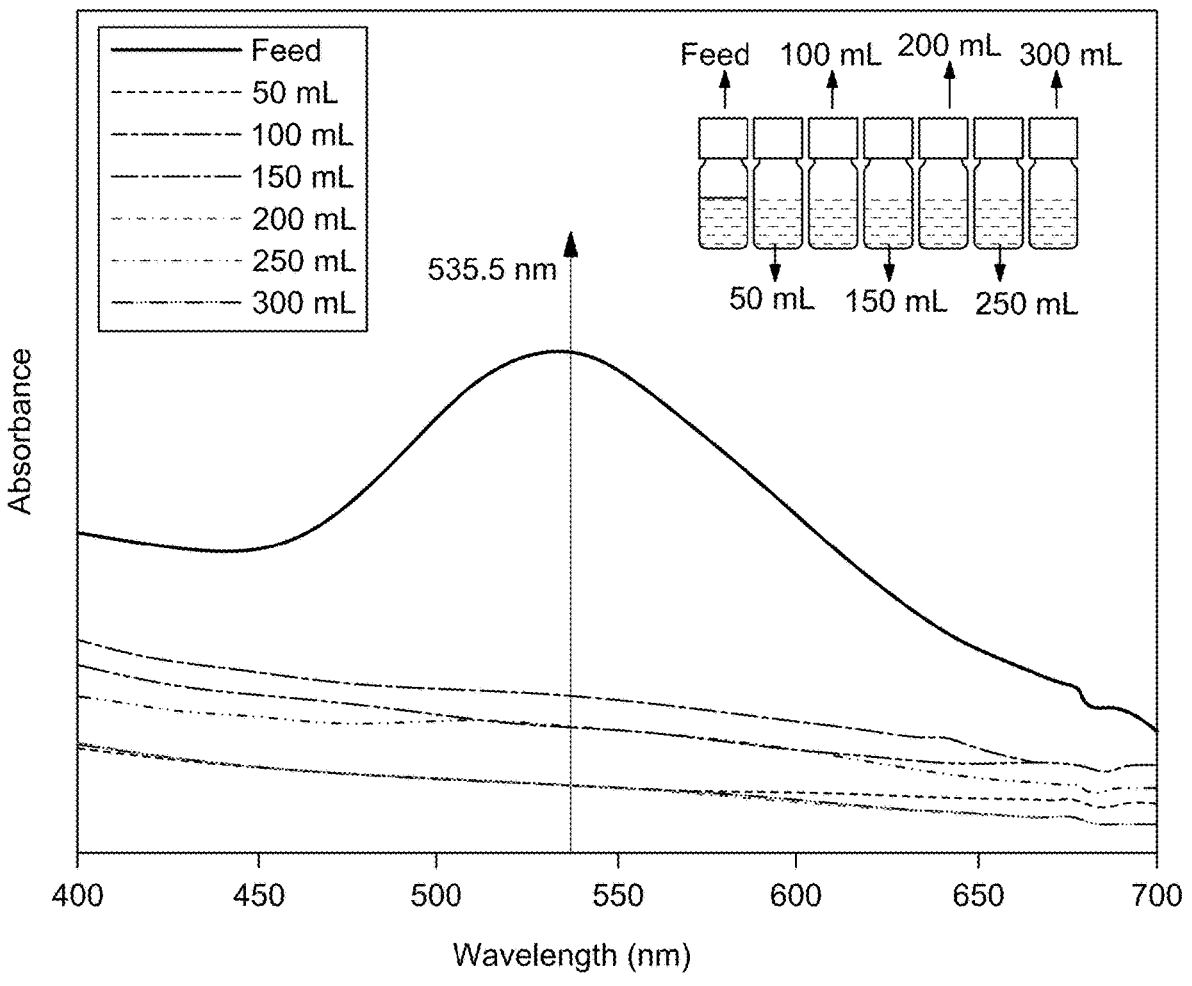

FIG. 14D is a graph depicting UV-vis spectra of EBT rejections from M3, according to certain embodiments.

Figure 14E:
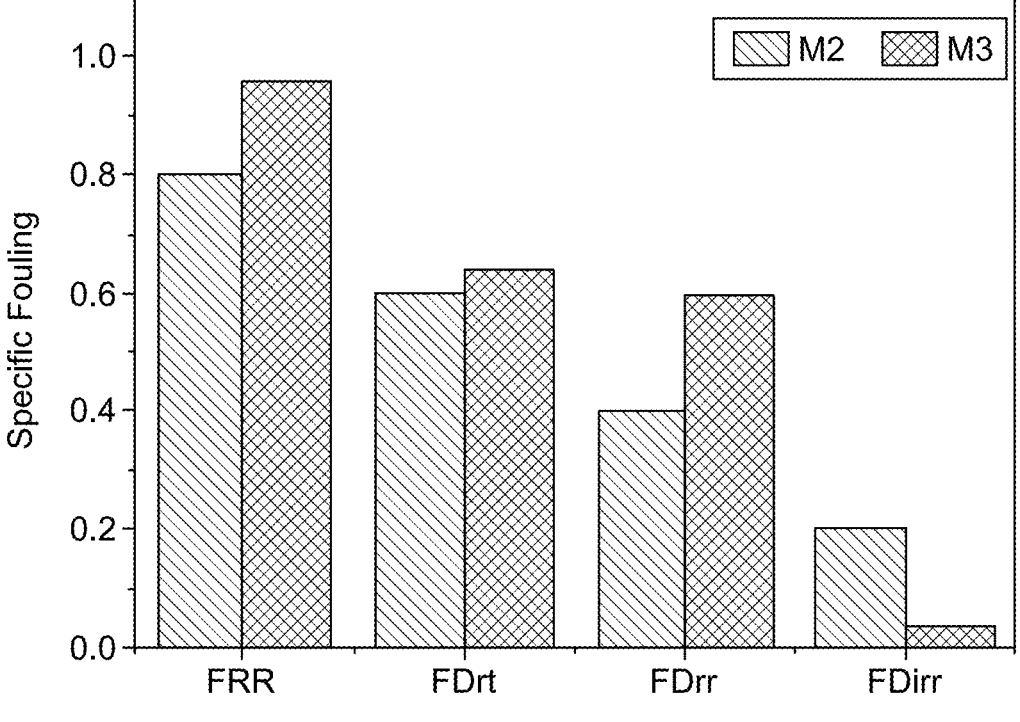

FIG. 14E is a bar graph depicting specific fouling of M2 and M3, according to certain embodiments.

Figure 15A:
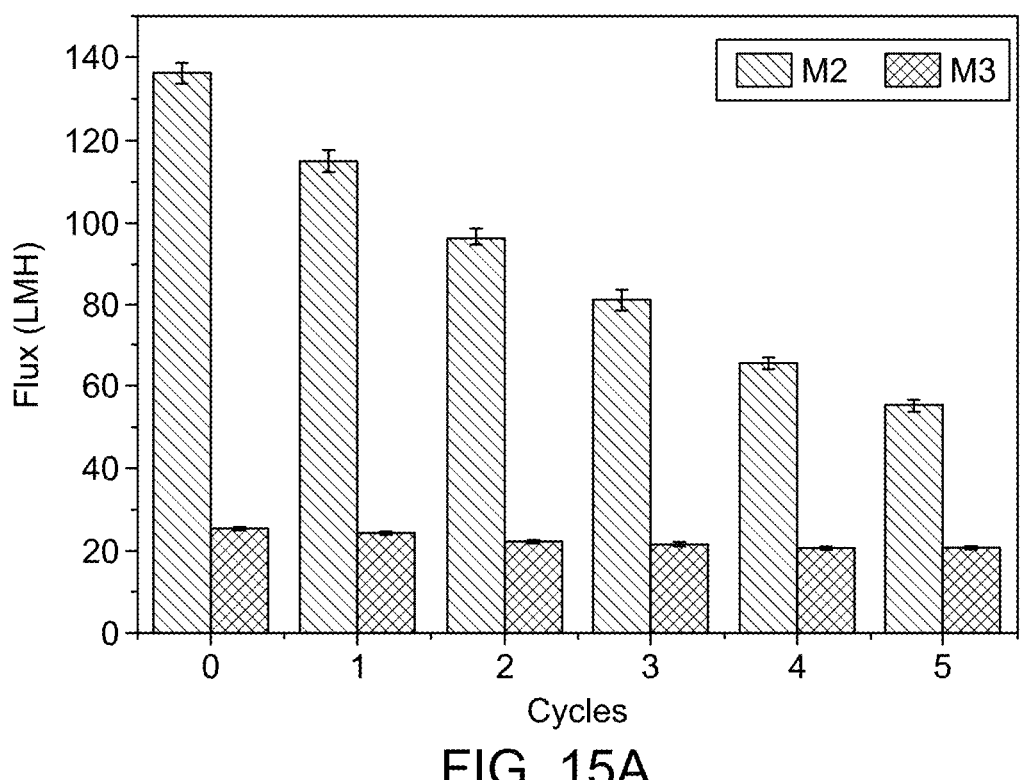

FIG. 15A is a bar graph depicting flux variation of M2 and M3 with exposure to EBT filtration for 5 cycles, according to certain embodiments.

Figure 15B:
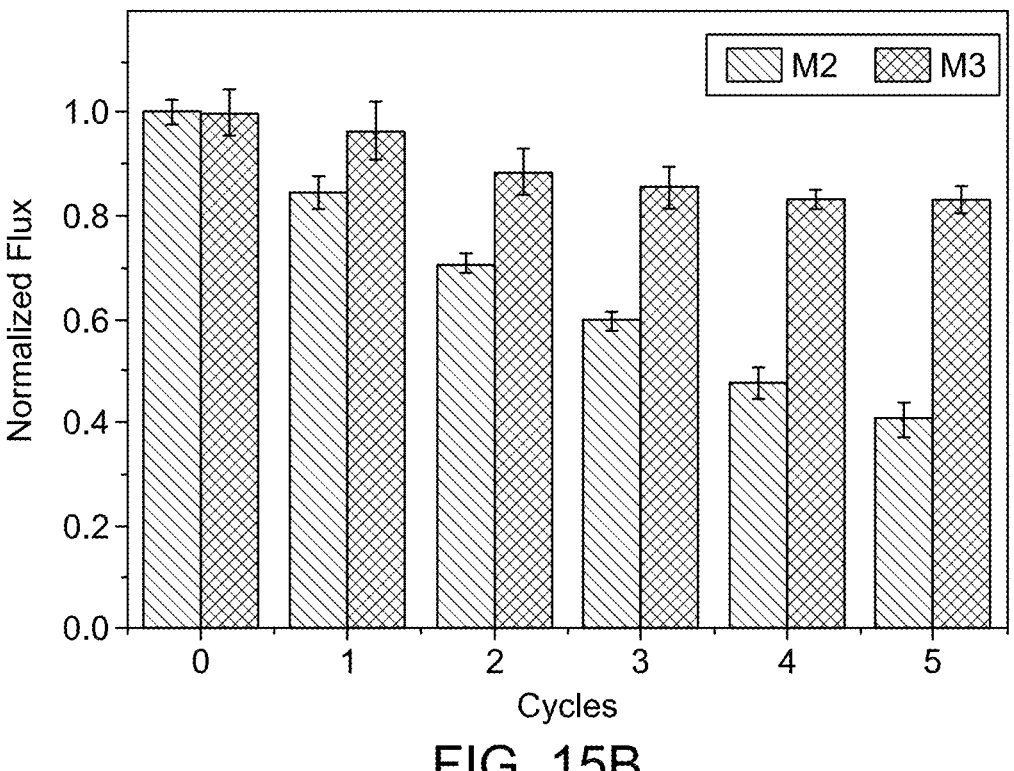

FIG. 15B is a bar graph depicting normalized flux variation of M2 and M3 with exposure to EBT filtration for 5 cycles, according to certain embodiments.

Figure 15C:
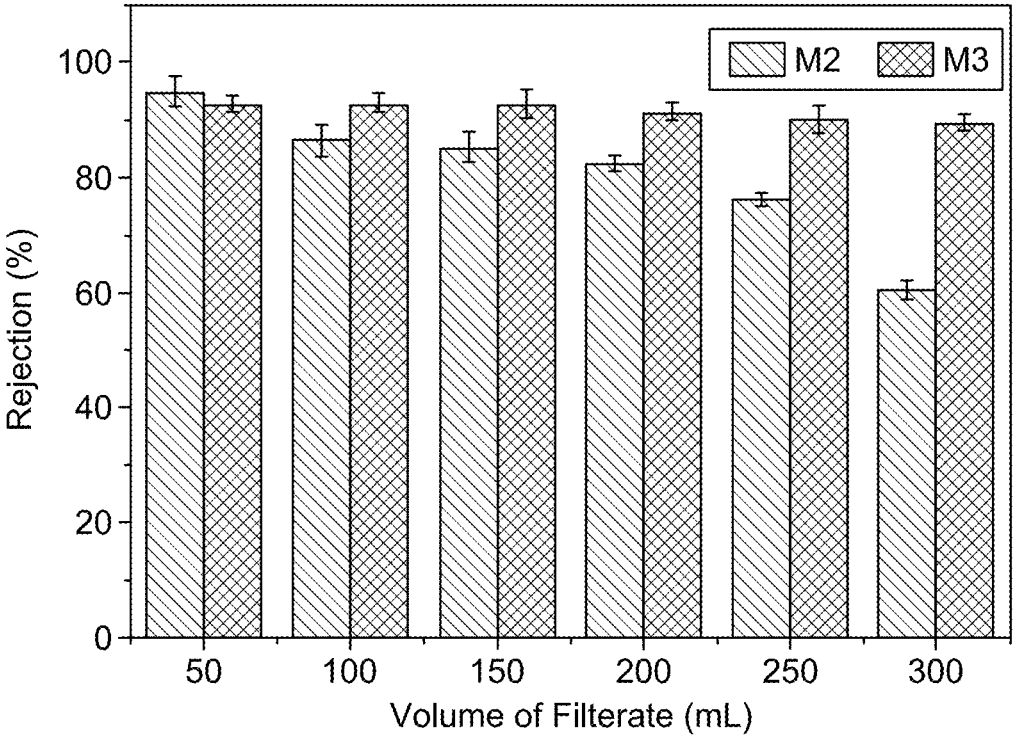

FIG. 15C is a bar graph depicting rejection efficiency of M2 and M3 with exposure to EBT filtration for 5 cycles, according to certain embodiments.

Figure 16:
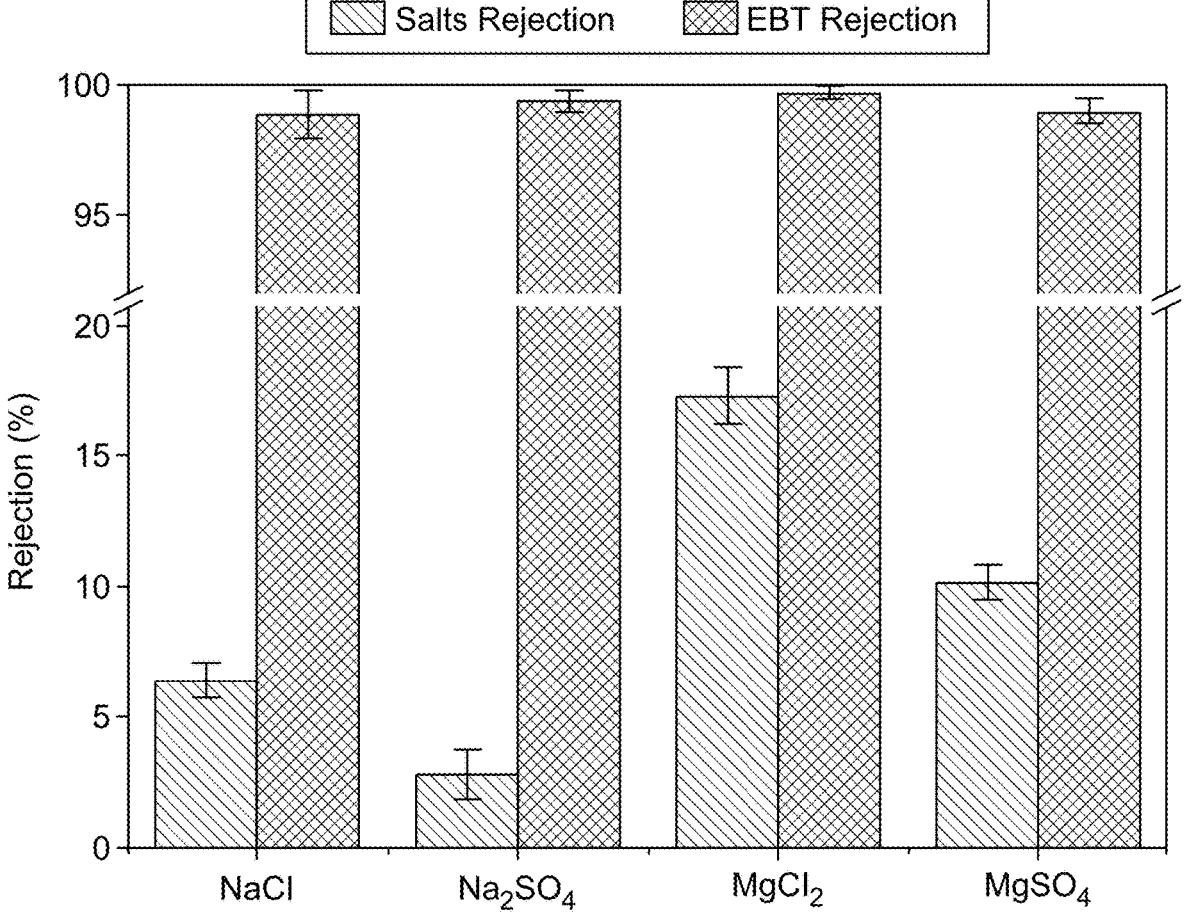

FIG. 16 is a bar graph depicting dye and salt fractionation by filtration through M3, according to certain embodiments.

DETAILED DESCRIPTION

When describing the present disclosure, the terms used are to be construed in accordance with the following definitions, unless context dictates otherwise.

Embodiments of the present disclosure will now be described more fully hereinafter with reference to the accompanying drawings, wherever applicable, in that some, but not all, embodiments of the disclosure are shown.

In the drawings, like numbered reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term "room temperature" refers to a temperature range of 25±3 degrees Celsius (° C.).

As used herein, the term "amount" refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}$C and $^{14}$C. Isotopes of oxygen include $^{16}$O, $^{17}$O, and $^{18}$O. Isotopes of aluminum include $^{26}$Al and $^{27}$Al, and isotopes of nitrogen include $^{14}$N and $^{15}$N. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term "nanofibers" refers to fibers having a diameter typically in the nanometer range, generally less than 1000 nanometers (1 micrometer), and possessing a high surface area-to-volume ratio that may enhance their mechanical, chemical, and physical properties.

As used herein, the term "water contact angle (WCA)" refers to the angle formed at the interface where a liquid droplet meets a solid surface, which indicates the wettability of the surface.

As used herein, the term "hydrophilicity" refers to the tendency of a material or surface to attract and interact favorably with water molecules, often resulting in good wettability and the ability to form hydrogen bonds with water.

As used herein, the term "oleophobicity" refers to a property of a material that resists adhesion or spreading of oils and/or other nonpolar liquids on its surface. An oleophobic surface tends to repel oily substances, maintaining cleanliness and reducing fouling by organic contaminants.

As used herein, the term "electrostatic interaction" refers to the interaction (attractive or repulsive) between charged molecules and/or charged functional groups. Electrostatic interactions that occur between like charges (i.e., positive-positive, negative-negative) are repulsive. Electrostatic interactions which occur between non-like charges (i.e., positive-negative) are attractive.

As used herein, the term "pi-pi (π-π) interactions" refers to non-covalent forces that occur between molecules with aromatic pi systems, such as stacked aromatic rings. π-π interactions include, but are not limited to, parallel stacked (i.e., face-to-face) alignments, parallel displaced (i.e., offset stacked) alignments, edge-to-face (i.e., T-shaped) alignments, a combination thereof, and the like.

As used herein, the term "emulsion flux" refers to a volumetric flow rate of an emulsion passing through a membrane per unit area and per unit time, typically expressed in liters per square meter per hour (LMH). It represents the membrane's permeability toward emulsified mixtures, such as oil-water emulsions, and is a parameter used for evaluating separation performances and antifouling characteristics.

As used herein, the term "salt permeability" refers to the ability of a membrane to allow the passage of dissolved salts and/or ions through it under a concentration or pressure gradient. It is typically expressed as the rate at which salt ions permeate per unit area and time, and it serves as a parameter in evaluating the membrane's selectivity and separation efficiency in desalination and/or ion separation processes.

Aspects of this disclosure are directed to an α-aluminum oxide-supported polypyrrole-modified oxidized graphitic carbon nitride (α-Al$_2$O$_3$@PPy/O-g-C$_3$N$_4$) membrane (also referred to as membrane) for dye-salt fractionation and oil-water separation. Antifouling and self-cleaning performances of the membrane are evaluated using Eriochrome Black T (EBT) dye filtration, which demonstrates an effective flux recovery and separation efficiency.

An aspect of the present disclosure describes a membrane including a first layer including alumina and a second layer including an oxidized graphitic carbon nitride (O-g-C$_3$N$_4$) and a polymerized pyrrole. In a preferred embodiment, the alumina includes α-Al$_2$O$_3$. In some embodiments, the alumina is a support for the second layer. In some embodiments, a support may be a structure in which a material, polymer, membrane, and/or compound may be attached to and/or upheld. Carboxylic groups and hydroxyl groups in the oxidized graphitic carbon nitride interact via electrostatic interactions with polar groups in the polymerized pyrrole. In some embodiments, carboxylic groups and hydroxyl groups in the oxidized graphitic carbon nitride are deprotonated and interact with positively charged and protonated amines in the polymerized pyrrole. In other embodiments, electronegative carboxylic groups and electronegative hydroxyl groups in the oxidized graphitic carbon nitride interact with electropositive, protonated amines in the polymerized pyrrole. In some embodiments, the first layer and the second layer interact through electrostatic interactions. In some embodiments, the alumina in the first layer interacts with the oxidized graphitic carbon nitride and polymerized pyrrole through Van der Waals forces. In some embodiments, electrostatic interactions include, but are not limited to, hydrogen bonding, Van der Waals forces, dipole-dipole interactions, dipole-induced dipole interactions, ion-dipole interactions, ion-induced dipole interactions, ionic bonds, and mechanical interlocking. In some embodiments, electrostatic interactions include ionic junctions including cation-anion interactions, bridging ion interactions, polyampholytes, stimuli-responsive adhesion, and the like, π junctions including cation-π interactions, anion-π interactions, π-π interactions, π-hydrogen bonding, and the like, a combination thereof, and the like. In some embodiments, the first layer and the second layer interact through ion-dipole interactions. In some embodiments, the first layer and the second layer interact through cation-π interactions and anion-π interactions. In some embodiments, the oxidized graphitic carbon nitride and the polymerized pyrrole interact via π-π interactions. In one embodiment, the oxidized graphitic carbon nitride and the polymerized pyrrole interact via parallel stacked alignments. In another embodiment, the oxidized graphitic carbon nitride and the polymerized pyrrole interact via parallel displaced alignments.

The second layer is a nanofibrous mass including entangled nanofibers. In some embodiments, the entangled nanofibers are aligned in a parallel manner, a perpendicular manner, a diagonal manner, a columnar manner (i.e., aligned end to end), a webbed manner, a combination thereof, and the like. In some embodiments, the nanofibers have a length of 50-500 nm, preferably 70-450 nm, preferably 100-400 nm, preferably 100-350 nm, preferably 120-300 nm, preferably 130-250 nm, preferably 140-200 nm, preferably 150-190 nm, preferably 152-180 nm, preferably 153-170 nm, and preferably 154-166 nm, a width of 2-20 nm, preferably 4-18 nm, preferably 5-15 nm, preferably 6-14 nm, preferably 7-13 nm, preferably 8-12 nm, and preferably 9-10 nm.

In some embodiments, the second layer has a thickness of 1-3 μm, preferably 1.1-2.9 μm, preferably 1.2-2.8 μm, preferably 1.3-2.7 μm, preferably 1.4-2.6 μm, preferably 1.5-2.5 μm, preferably 1.6-2.4 μm, preferably 1.7-2.3 μm, preferably 1.8-2.2 μm, and preferably 1.9-2.1 μm. In other embodiments, the second layer has a thickness of 2.1-2.9 μm, preferably 2.12-2.8 μm, preferably 2.13-2.7 μm, preferably 2.14-2.6 μm, more preferably 2.15-2.50 μm, and yet more preferably about 2.16 μm.

In some embodiments, the membrane includes carbon in an amount of 30-50 percent by weight (wt. %), preferably 32-48 wt. %, preferably 34-46 wt. %, preferably 35-45 wt. %, preferably 36-44 wt. %, preferably 37-43 wt. %, preferably 39-42.5 wt. % more preferably 40-42 wt. %, and yet more preferably about 41.07 wt. %, nitrogen in an amount of 10-30 wt. %, preferably 12-28 wt. %, preferably 15-25 wt. %, preferably 16-24 wt. %, preferably 18-22 wt. %, preferably 20-21 wt. %, preferably 20.1-20.9 wt. %, preferably 20.2-20.5 wt. %, more preferably 20.3-20.4 wt. %, and yet more preferably about 20.36 wt. %, oxygen in an amount of 30-40 wt. %, preferably 31-39 wt. %, preferably 32-38 wt. %, preferably 33-37 wt. %, preferably 34-36 wt. %, preferably 34.1-34.9 wt. %, preferably 34.2-34.8 wt. %, preferably 34.4-31.79 wt. %, preferably 34.6-31.75 wt. %, more preferably 34.7-31.72 wt. %, and more preferably about 34.71 wt. %, and aluminum in an amount of 3-5 wt. %, preferably 3.2-4.8 wt. %, preferably 3.5-4.5 wt. %, preferably 3.6-4.2 wt. %, more preferably 3.7-4 wt. %, and yet more preferably about 3.87 wt. % based on a total weight of the membrane. In a preferred embodiment, the membrane includes carbon in an amount of 41.07 wt. %, nitrogen in an amount of 20.36 wt. %, oxygen in an amount of 34.71 wt. %, and aluminum in an amount of 3.87 wt. % based on the total weight of the membrane.

In some embodiments, the membrane has a water contact angle (WCA) of 10° to 15°, preferably 10.5° to 14.9°, preferably 10.6° to 14.5°, preferably 11° to 14.2°, preferably 11.5° to 14°, preferably 12° to 13.8°, preferably 12.5° to 13.5°, more preferably 12.7°-13.2°, and yet more preferably about 13°. In a preferred embodiment, the membrane has a WCA of 13±0.69°.

In some embodiments, the membrane has an underwater oil contact angle (UWOCA) of 145° to 160°, preferably 147° to 158°, preferably 148° to 157°, preferably 149° to 156°, preferably 150° to 155°, preferably 150.5° to 154.5°, preferably 151° to 154°, more preferably 151.5° to 153.5°, and yet more preferably about 153.2°. In a preferred embodiment, the membrane has the UWOCA of 153.2±2.14°.

In some embodiments, the membrane has a pure water flux of 20-30 liters per square meter per hour (LMH), preferably 21-29 LMH, preferably 21.5-28.5 LMH, preferably 22-28 LMH, preferably 22.5-27.5 LMH, preferably 23-27 LMH, more preferably 25-26.5 LMH, and yet more preferably about 26.25 LMH at a pressure of 1 bar. In other embodiments, the pressure for measuring pure water flux ranges from 0.5-2 bar, preferably 0.7-1.9 bar, preferably 0.9-1.5 bar, preferably 1.0-1.4 bar, and preferably 1.0-1.2 bar. In a preferred embodiment, the membrane has pure water flux of 26.25±1.96 LMH at 1 bar.

In some embodiments, a method of oil and water separation using the membrane (i.e., the α-Al$_2$O$_3$@PPy/O-g-C$_3$N$_4$ membrane) is described. In some embodiments, the method includes contacting an emulsion including oil and water with the membrane and collecting a permeate. In some embodiments, the permeate has a lesser amount of oil than the emulsion. In some embodiments, the water forms a hydration layer on the surface of the membrane via hydrogen bonding with oxygen-containing groups and nitrogen-containing groups of the membrane to reject the oil.

In some embodiments, the oil is crude oil, diesel, kerosene, engine oil, mineral oil, lubricating oil, vegetable oil, silicone oil, petroleum ether oil, a combination thereof, and the like. In a preferred embodiment, the oil is selected from the group consisting of vegetable oil, diesel oil, and petroleum ether oil.

In some embodiments, the membrane has an oil rejection efficiency of 80-99.9%, preferably 85-99.8%, preferably 87-99.7%, preferably 90-99.6%, preferably 92-99.5%, preferably 94-99.4%, preferably 96-99.3%, preferably 98-99.2%, and preferably 99-99.1% based on an initial concentration of the oil in the emulsion. In a preferred embodiment, the membrane has an oil rejection efficiency of 99%, preferably 99.1%, preferably 99.2%, preferably 99.3%, preferably 99.4%, preferably 99.5%, preferably 99.6%, preferably 99.7%, preferably 99.8%, preferably 99.9%, and preferably about 100% based on an initial concentration of the oil in the emulsion.

In some embodiments, the membrane has an emulsion flux of 20-30 LMH, preferably 20.5-29 LMH, preferably 21-28 LMH, preferably 21.5-27 LMH, more preferably 22-26 LMH, and yet more preferably 23-25.5 LHM at a pressure of 1 bar. In a preferred embodiment, the membrane has an emulsion flux of about 23.94±1.09 LMH for a vegetable oil emulsion at a pressure of 1 bar. In another preferred embodiment, the membrane has an emulsion flux of about 25.25±2.06 LMH for a diesel oil emulsion at a pressure of 1 bar. In yet another preferred embodiment, the membrane has an emulsion flux of about 24.94±3.01 LMH for a petroleum oil ether emulsion at a pressure of 1 bar.

Figure 1:
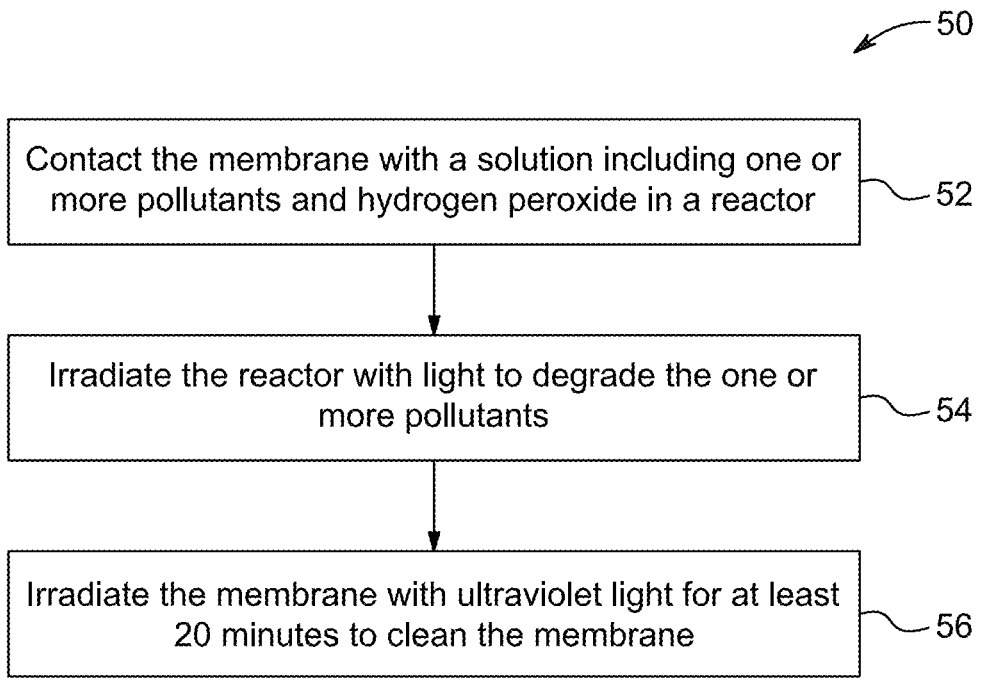
FIG. 1 is an exemplary flowchart illustrating degradation of pollutants using an α-aluminum oxide-supported polypyrrole-modified oxidized graphitic carbon nitride ($\alpha$-$Al_2O_3$@PPy/O-g-$C_3N_4$) membrane, according to certain embodiments.

FIG. 1 describes a method 50 of degradation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes contacting the membrane (i.e., the α-Al$_2$O$_3$@PPy/O-g-C$_3$N$_4$ membrane) with a solution including one or more pollutants and hydrogen peroxide (H$_2$O$_2$) in a reactor.

In some embodiments, the pollutant is a dye. A dye is a colored substance that chemically binds to a material it may be intended to color. Generally, a dye is applied in a solution, typically an aqueous solution. Examples of dyes include, but are not limited to, acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, Eriochrome Black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; rhodamine dyes such as rhodamine, rhodamine 6G, rhodamine 123, rhodamine B, sulforhodamine 101, and sulforhodamine B; a combination thereof, and the like. In a preferred embodiment, the pollutant is Eriochrome Black T (EBT).

In some embodiments, the concentration of an $H_2O_2$ solution is 0.75-1.25 M, preferably 0.8-1.2 M, preferably 0.85-1.15 M, preferably 0.9-1.1 M, more preferably 0.95-1.05 M, and yet more preferably about 1 M. In a preferred embodiment, the concentration of the $H_2O_2$ solution is 1.0 M. In an embodiment, the $H_2O_2$ solution is added to the pollutant solution by various methods including, but not limited to, stirring, dropwise addition, spraying, mixing, ultrasonic dispersion, a combination thereof, and the like. In a preferred embodiment, the $H_2O_2$ solution is added in drop wise manner.

At step 54, the method 50 includes irradiating the reactor with light to degrade the one or more pollutants.

In some embodiments, a light source for the irradiating is visible light, ultraviolet (UV) light, simulated sunlight, natural sunlight, a combination thereof, and the like. In other embodiments, the light source may depend on the photocatalyst and experimental conditions. In a preferred embodiment, solar light is used to degrade the pollutant.

At step 56, the method 50 further includes irradiating the membrane used to degrade the one or more pollutants with ultraviolet (UV) light for at least 20 minutes to clean the membrane.

In some embodiments, the membrane is irradiated with UV light for 20 minutes, preferably at least 21 minutes, preferably at least 22 minutes, preferably at least 23 minutes, preferably at least 24 minutes, preferably at least 25 minutes, preferably at least 26 minutes, preferably at least 27 minutes, preferably at least 28 minutes, and preferably at least 29 minutes. In a preferred embodiment, the membrane is cleaned by irradiating it under UV light for 30 minutes.

In some embodiments, after the irradiating the membrane has a flux rate of at least 85%, preferably at least 86%, preferably at least 87%, preferably at least 88%, preferably at least 89%, preferably at least 90%, preferably at least 91%, preferably at least 92%, preferably at least 93%, more preferably at least 94%, and yet more preferably at least 95% of an initial flux rate of the membrane. In a preferred embodiment, the membrane has a flux recovery rate of 95.36±1.24% based on an initial flux rate of the membrane.

In some embodiments, the membrane has an EBT rejection efficiency of at least 95%, preferably at least 95.2%, preferably at least 95.3%, preferably at least 95.4%, preferably at least 95.5%, preferably at least 95.6%, preferably at least 95.7%, preferably at least 95.8%, preferably at least 95.9%, preferably at least 96%, preferably at least 96.1%, more preferably at least 95.2%, and yet more preferably at least 95.3% based on an initial amount of the EBT. In a preferred embodiment, the membrane has the EBT rejection efficiency of 96.34% based on an initial amount of the EBT.

In some embodiments, the membrane has a magnesium chloride salt permeability rate of at least 80%, preferably at least 81%, preferably at least 82%, preferably at least 83%, preferably at least 84%, preferably at least 85%, preferably at least 86%, preferably at least 87%, preferably at least 88%, preferably at least 89%, preferably at least 89.1%, preferably at least 89.2%, preferably at least 89.4%, preferably at least 89.5%, preferably at least 89.7%, more preferably at least 89.8%, and yet more preferably at least 89.85% based on an initial amount of the magnesium chloride. In a preferred embodiment, the membrane has a magnesium chloride salt permeability rate of 89.89% based on an initial amount of the magnesium chloride.

In some embodiments, the membrane has a magnesium sulfate salt permeability rate of at least 75%, preferably at least 76%, preferably at least 77%, preferably at least 78%, preferably at least 79%, preferably at least 80%, more preferably at least 81%, and yet more preferably at least 82% based on an initial amount of the magnesium sulfate. In a preferred embodiment, the membrane has a magnesium sulfate salt permeability rate of 82.76% based on an initial amount of the magnesium sulfate.

In some embodiments, the membrane has a sodium chloride salt permeability rate of at least 90%, preferably at least 90.5%, preferably at least 91%, preferably at least 91.5%, preferably at least 92%, preferably at least 92.5%, preferably at least 93%, preferably at least 93.1%, preferably at least 93.2%, preferably at least 93.3%, preferably at least 93.4%, preferably at least 93.5%, more preferably at least 93.6%, and yet more preferably at least 93.65% based on an initial amount of the sodium chloride. In a preferred embodiment, the membrane has a sodium chloride salt permeability rate of 93.66% based on an initial amount of the sodium chloride.

In some embodiments, the membrane has a sodium sulfate salt permeability rate of at least 95%, preferably at least 95.5%, preferably at least 96%, preferably at least 96.2%, preferably at least 96.4%, preferably at least 96.6%, preferably at least 96.8%, preferably at least 97%, more preferably at least 97.1%, and yet more preferably at least 97.2% based on an initial amount of the sodium sulfate. In a preferred embodiment, the membrane has a sodium sulfate salt permeability rate of 97.22% based on an initial amount of the sodium sulfate.

The following examples are provided solely for illustration and are not to be construed as limitations of the present disclosure, as many variations thereof are possible without departing from the spirit and scope of the present disclosure.

EXAMPLES

The following examples describe and demonstrate synthesis of an α-aluminum oxide supported pyrrole modified oxidized graphitic carbon nitride (α-Al$_2$O$_3$@PPy/O-g-C$_3$N$_4$) membrane (also referred as membrane) and a method of photodegradation of Eriochrome Black T (EBT) using the membrane. The examples are provided solely for illustration and are not to be construed as limitations of the present disclosure, as many variations thereof are possible without departing from the spirit and scope of the present disclosure.

Example 1: Materials

The chemicals used herein are analytical and were utilized as obtained without additional treatment. Anhydrous ferric chloride (FeCl$_3$), melamine powder (99%), H$_2$O$_2$, H$_2$SO$_4$, HNO$_3$, and pyrrole monomers were obtained from Sigma-Aldrich. Diesel, petroleum ether, and vegetable oil were purchased from a local market. Sodium dodecyl sulfate (SDS) as a surfactant was provided by BDH, Middle East. The alumina ceramic support was acquired from Alibaba, and organic solvents, such as ethanol, were purchased from Fisher Scientific.

Example 2: Synthesis of Graphitic Carbon Nitride (g-C$_3$N$_4$) and Oxidized Graphitic Carbon Nitride (O-g-C$_3$N$_4$)

Figure 2:
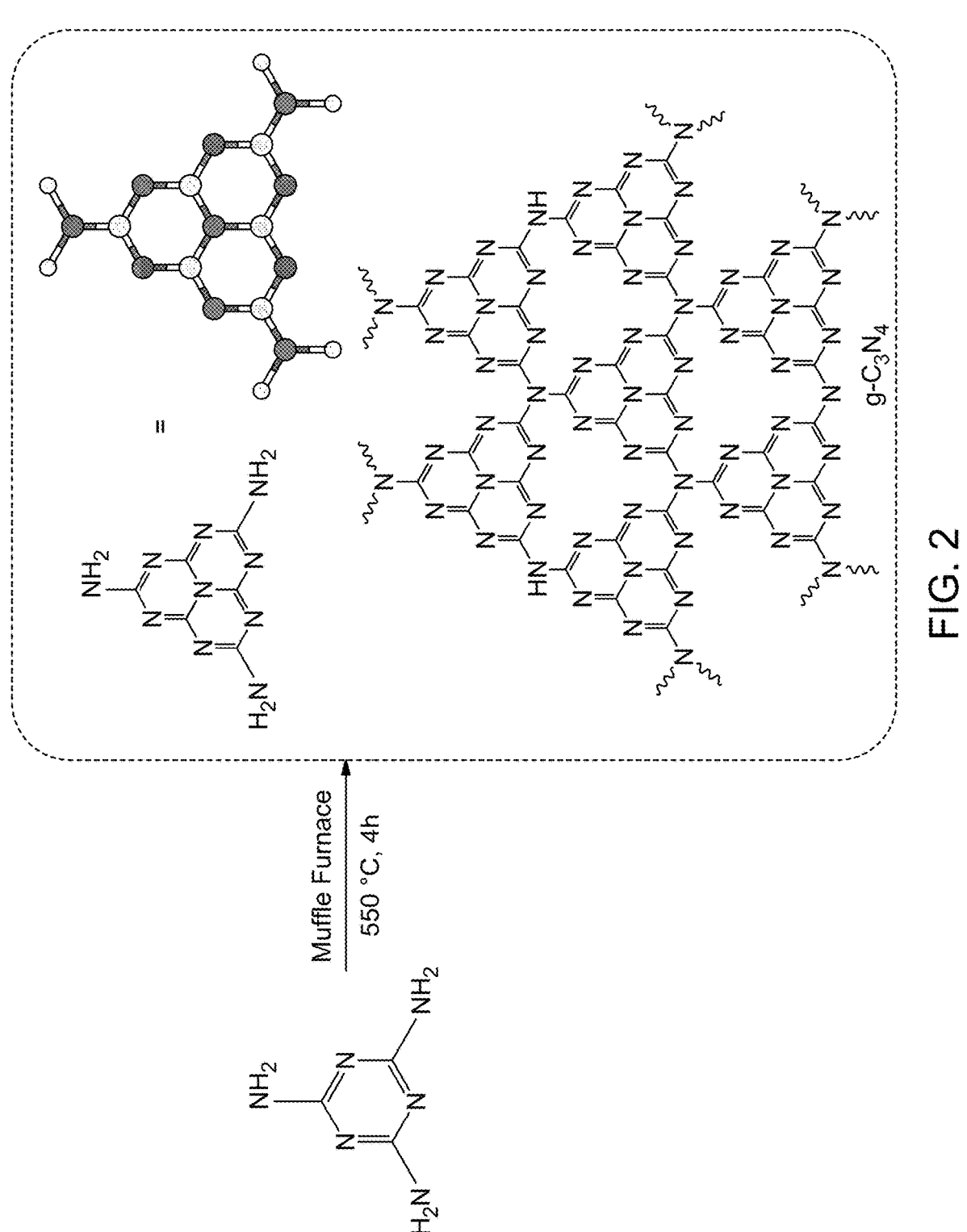
FIG. 2 is a schematic representation of an oxidized graphitic carbon nitride (O-g-$C_3N_4$) synthesis, according to certain embodiments.
Figure 2:
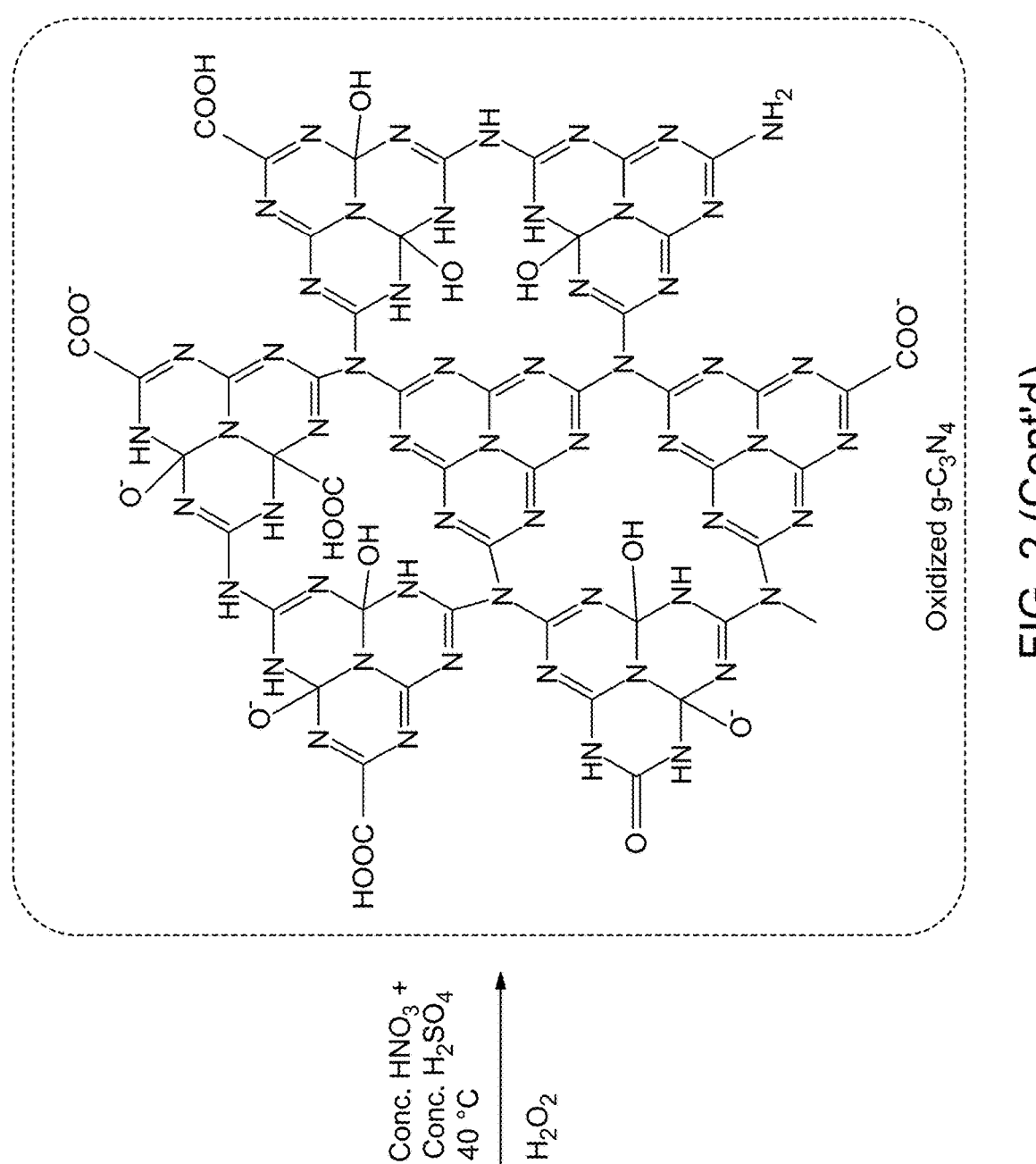

Graphitic carbon nitride (g-C$_3$N$_4$) was produced using a thermal condensation polymerization method. 10 g of melamine was transferred to an alumina crucible which was placed into a muffle furnace at 550° C. for 4 h (maintaining a ramping temperature of 2° C./min) [Bafaqeer, A. et al., Well-designed glucose precursor carbon/g-C$_3$N$_4$ nanocomposite for enhanced visible light photocatalytic CO$_2$ reduction activity, *Journal of Photochemistry and Photobiology A: Chemistry*, 447, 2024, 115272, which is incorporated herein by reference in its entirety]. A yellow powder, referred to as g-C$_3$N$_4$, was produced. To produce oxidized graphitic carbon nitride (O-g-C$_3$N$_4$), 1 gram of g-C$_3$N$_4$ powder was added to a concentrated solution of H$_2$SO$_4$ (98%) and HNO$_3$ (69%) at 1:1 ratio with a total volume of 40 mL. The mixture was then heated at 40° C. and subjected to sonication for 2 h. Following this, H$_2$O$_2$ (33%) was slowly added dropwise (3 mL) to the mixture, and sonication was continued for 3 h to promote exfoliation. The resulting product is shown in FIG. 2. Deionized (DI) water (150 mL) was added to the product to form a diluted suspension. The particles were centrifuged at 10,000 rpm and sequentially washed using DI water and acetone. Finally, the material was oven-dried at 70° C. for 12 h.

Example 3: Membrane Modification with Pyrrole Modified Oxidized Graphitic Carbon Nitride (PPy(@O-g-C$_3$N$_4$)

A 0.2 mg/mL concentration of each powder (O-g-C$_3$N$_4$ and g-C$_3$N$_4$) was prepared in separate containers by adding a predetermined amount of powder to 100 mL of DI water and sonicating for 1 h. A 0.1 M FeCl$_3$ solution was prepared in DI water. FeCl$_3$ acts as a catalyst for the polymerization

Figure 3:
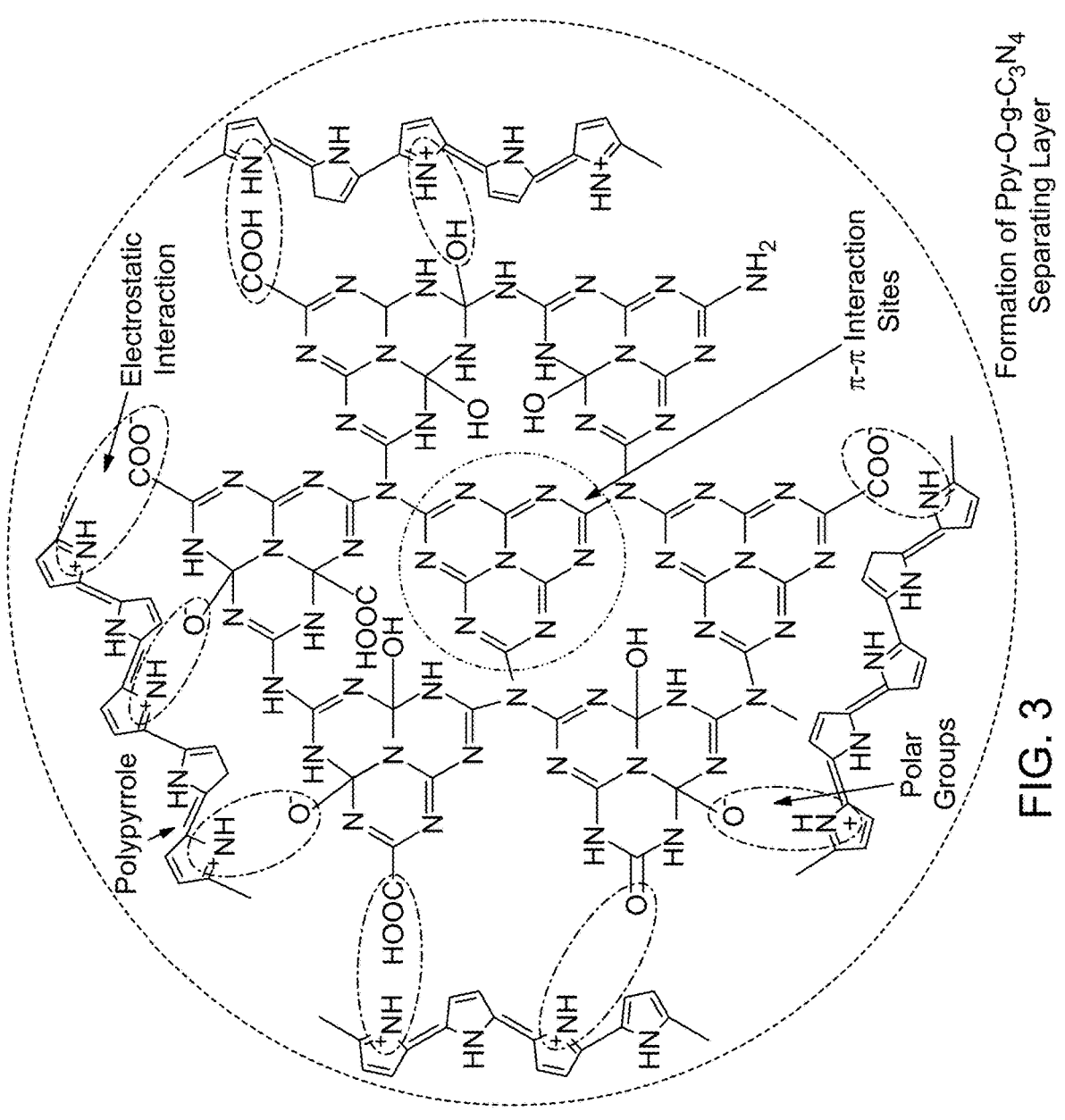
FIG. 3 is a schematic diagram depicting formation of a polypyrrole-modified oxidized graphitic carbon nitride (PPy/O-g-$C_3N_4$) separating layer on a ceramic membrane, according to certain embodiments.
Figure 4:
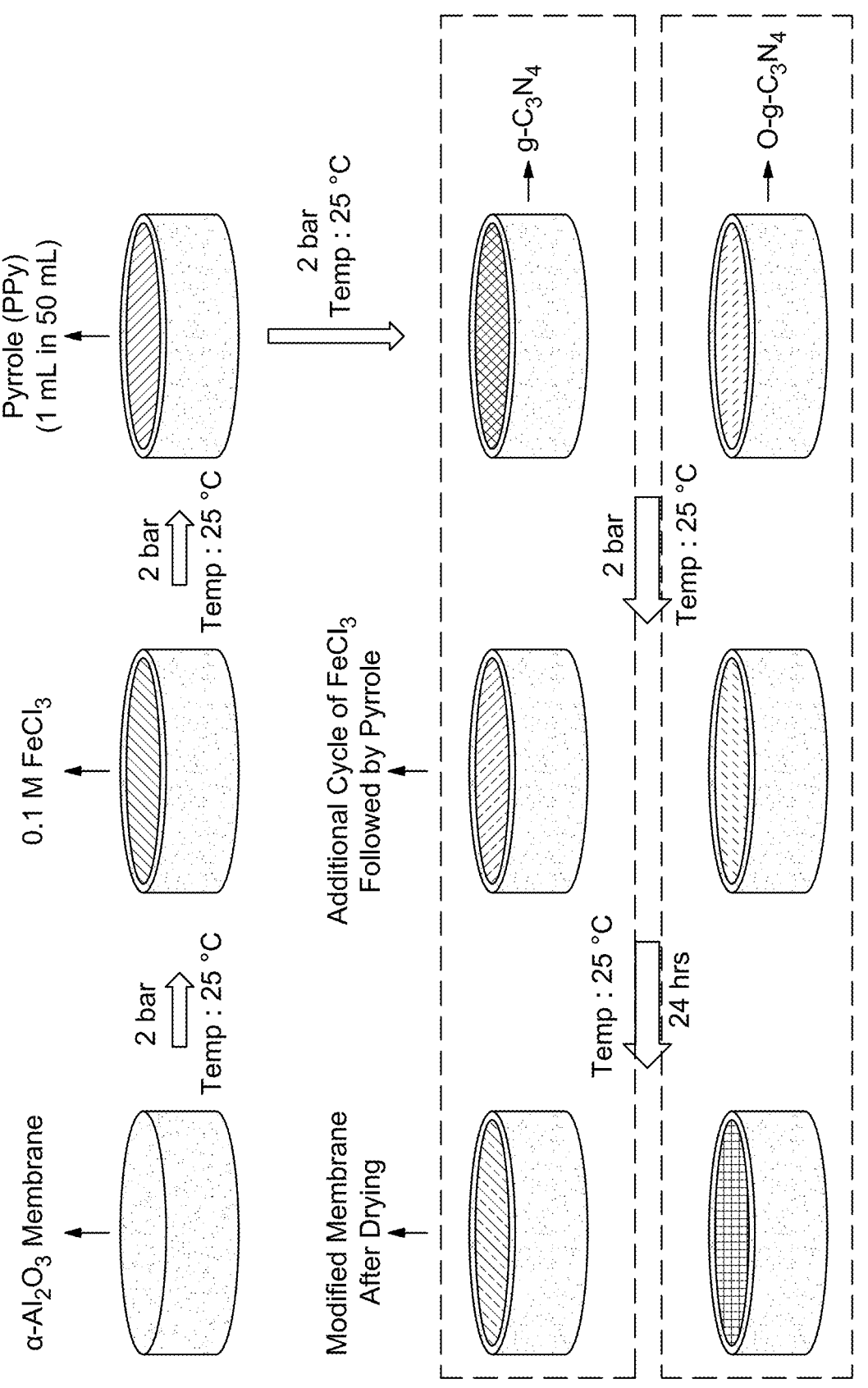
FIG. 4 is a schematic of a photocatalytic membrane using a polypyrrole-(PPy-) assisted g-$C_3N_4$ and O-g-$C_3N_4$ catalyst on an α-aluminum oxide ($\alpha$-$Al_2O_3$) membrane, according to certain embodiments.

14 of pyrrole [Baig, N. et al., Designing of nanotextured inorganic-organic hybrid PVDF membrane for efficient separation of the oil-in-water emulsions, *Chemosphere*, 308, 2022, 136531, which is incorporated herein by reference in its entirety]. The composite 2D separating layer was prepared by a dead-end filtration method, where 0.1 M FeCl$_3$ was first filtered through an alumina membrane at a pressure of 2 bar. Next, the pyrrole (PPy) (1 mL in 50 mL of distilled water) layer was deposited on the membrane at a pressure of 2 bar. Subsequently, the O-g-C$_3$N$_4$ suspension was introduced into the membrane under similar conditions. The separating layer was prepared by interacting FeCl$_3$+PPy with the carboxylic and hydroxyl groups of the O-g-C$_3$N$_4$ catalyst on a ceramic membrane. The interaction was due to the electrostatic interaction of the π-π interaction sites of the prepared O-g-C$_3$N$_4$ catalyst with polar groups of the PPy on the ceramic membranes. An interaction mechanism is highlighted in FIG. 3. FeCl$_3$ and PPy passed through the membrane to enhance binding and stabilization of the O-g-C$_3$N$_4$ catalyst on the ceramic membrane surface by interacting with the polypyrrole. A similar procedure was adopted to prepare the g-C$_3$N$_4$ membrane. Pristine α-Al$_2$O$_3$ membrane, α-Al$_2$O$_3$/PPy@g-C$_3$N$_4$ membrane, and α-Al$_2$O$_3$/PPy@O-g-C$_3$N$_4$ membrane are referred to as M1 (also referred to as M1 membrane), M2 (also referred to as M2 membrane), and M3 (also referred to as M3 membrane), respectively. The overall membrane preparation process is shown in FIG. 4.

Example 4: Oil Water Separation Experiments

Petroleum ether, diesel, and vegetable oil were used to produce a variety of surfactant-stabilized O/W emulsions. Pure water flow was measured before the O/W emulsion experiment at similar operational conditions. A fixed quantity (0.2 g) of oil was mixed with water to prepare a 1000 ppm stock solution with the addition of 0.5 g of SDS, and the mixture was rapidly agitated for 24 h. The 300 mL feed solution of 200 ppm was prepared using the stock solution and filtered through the membranes in a dead-end filtration configuration at different pressures. Variation in volume with time was used to estimate the flux, as shown in equation 1:

$$F = \frac{\Delta V}{A \times \Delta t} \tag{1}$$

where F, V, t, and A represent the membrane flux (LMH), volume change (L), time (h), and effective membrane area (m$^2$), respectively. The membranes were compacted 1.5 times at pressures higher than the operating pressure for 20 minutes. Separation efficiency was determined using an Oakton, Turbidity Meter kit (T100WL) and equation 2.

$$R = \left(1 - \frac{Cp}{Cf}\right) \times 100 \tag{2}$$

The modified membrane's stability was evaluated by assessing its filtration performance over 10 cycles. After every turn, the membrane was cleaned with distilled water for 2 minutes using hydraulic cleaning, and the flux recovery was measured.

The membrane's self-cleaning and anti-fouling properties were determined using EBT (10 ppm) as a feed solution. The reversibility was determined using equations 3-6 [Kim, J. Y. et al., Structural and performance variation of PES/PVDF membranes after exposure to the pretreated feed water of CECs, *Chemosphere*, 335, 2023, 139096, which is incorporated herein by reference in its entirety].

$$FRR = \frac{J_n}{J_{n-1}} \tag{3}$$

$$FD_{Rt} = \frac{J_{n-1} - J_f}{J_{n-1}} \tag{4}$$

$$FD_{Rr} = \frac{J_n - J_f}{J_{n-1}} \tag{5}$$

$$FD_{Rir} = \frac{J_{n-1} - J_n}{J_{n-1}} \tag{6}$$

FRR, $FD_{Rt}$, $FD_{Rr}$, and $FD_{Rir}$ represent self-cleaning permeability recovery, total permeability loss, reversible permeability loss, and irreversible permeability loss, respectively. Jn and $J_f$ refer to water flux and feed flux, respectively. Use of EBT as the feed aims to assess the efficacy of the M3 membrane in removing organic pollutants. For the self-cleaning tests, a Solar Simulator (Abet., Technologies Model., 11,002 SunLite™) was employed to irradiate the fouled membrane for 30 minutes. Each experiment was conducted in duplicate to ensure repeatability, and the results were reported as average values with standard deviations indicating standard error.

Example 5: Analytical Techniques and Characterization

Surface characterization of g-$C_3N_4$, O-g-$C_3N_4$, PPy/g-$C_3N_4$, PPy/O-g-$C_3N_4$ powder and composite ceramic membranes were performed using a scanning electron microscope (SEM) (JEOL, JSM-6610LV). Elemental percentage variations on pristine and composite ceramic membranes were analyzed with energy dispersive spectroscopy (EDS) (Thermo, Scientific). Fourier transform infrared (FTIR) spectroscopy (Nicolet iS50, Thermo Fisher Scientific) in ATR mode was used to analyze the 400-4000 cm$^{-1}$ range spectra. Crystallinity of the membranes was analyzed using an X-ray diffractometer (XRD, Ultima IV). Wettability of both the pristine and modified composite membranes was measured using the sessile drop method with a contact angle goniometer (DSA-25, Kruss Inc.). The membrane's bulk porosity and average pore size were determined using equations 7 and 8.

$$\varepsilon\ (\%) = \frac{(W_{wet} - W_{dry})}{V\rho_w} \tag{7}$$

$$d_p(nm) = \sqrt{\frac{(2.9 - 1.75\epsilon)8\eta LQ}{\epsilon A \Delta P}} \tag{8}$$

Bulk porosity ($\dot{\epsilon}$) was calculated based on the membrane's wet and dry weights ($W_{wet}$ and $W_{dry}$), the volume of the dry membrane (V), and water density ($\rho_w$). The mean pore size was derived from parameters including water viscosity, membrane thickness (L), permeation rate (Q), membrane surface area (A), and transmembrane pressure ($\Delta P$). Initial bulk porosity and pore size of the pristine $\alpha$-$Al_2O_3$ ceramic membrane decreased from 43.6% and 98.1 nm to 26.3% and 56.3 nm for the $\alpha$-$Al_2O_3$@PPy/O-g-$C_3N_4$ membrane.

Figure 5B:
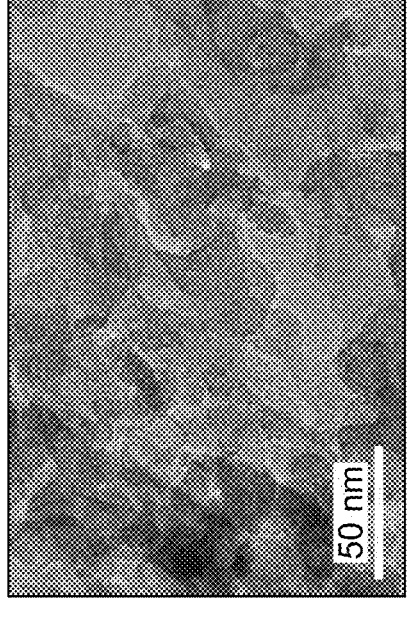
FIG. 5B is an HRTEM image of the g-$C_3N_4$ with a scale bar of 50 nm, according to certain embodiments.
Figure 5D:
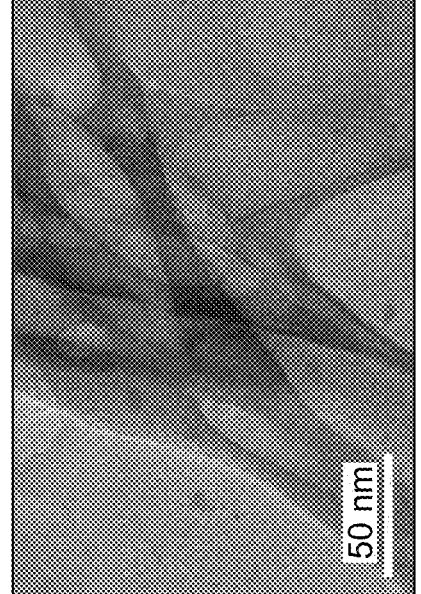
FIG. 5D is an HRTEM image of the O-g-$C_3N_4$ with a scale bar of 50 nm, according to certain embodiments.
Figure 5A:
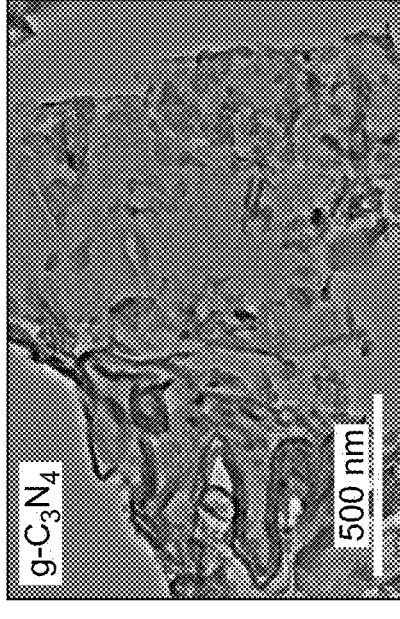
FIG. 5A is a high-resolution transmission electron microscopy (HRTEM) image of graphitic carbon nitride (g-$C_3N_4$) with a scale bar of 500 nm, according to certain embodiments.
Figure 5C:
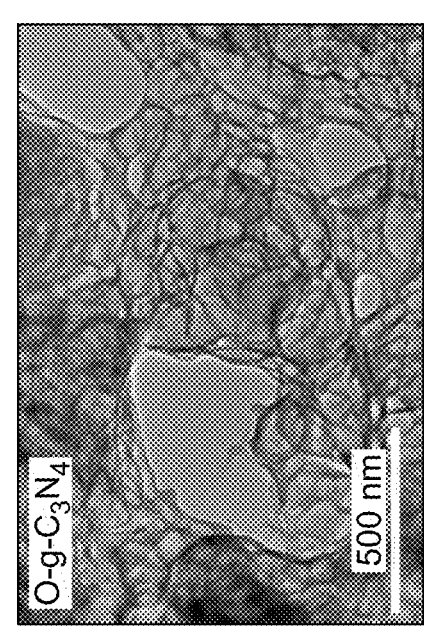
FIG. 5C is an HRTEM image of an oxidized graphitic carbon nitride (O-g-$C_3N_4$) with a scale bar of 500 nm, according to certain embodiments.
Figure 5F:
FIG. 5F is an HRTEM image of the PPy/g-$C_3N_4$ with a scale bar of 50 nm, according to certain embodiments.
Figure 5H:
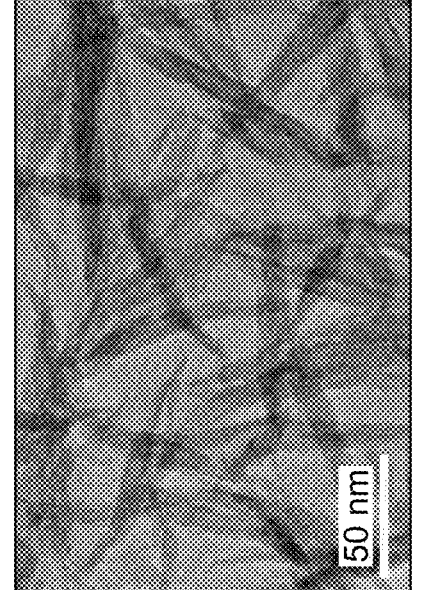
FIG. 5H is an HRTEM image the PPy/O-g-$C_3N_4$ with a scale bar of 50 nm, according to certain embodiments.
Figure 5E:
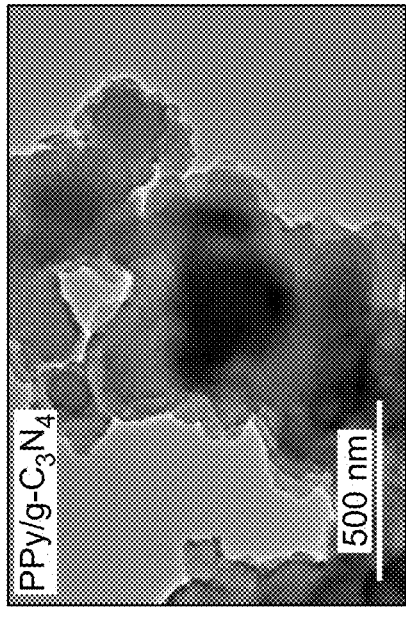
FIG. 5E is an HRTEM image of a polypyrrole-modified graphitic carbon nitride (PPy/g-$C_3N_4$) with a scale bar of 500 nm, according to certain embodiments.
Figure 5G:
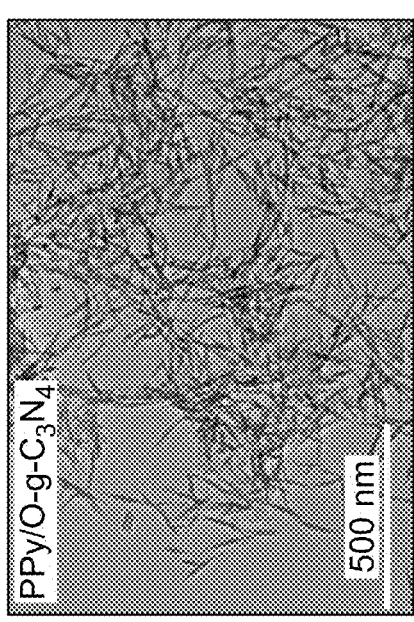
FIG. 5G is an HRTEM image of a polypyrrole modified oxidized graphitic carbon nitride (PPy/O-g-$C_3N_4$) with a scale bar of 500 nm, according to certain embodiments
Figure 5J:
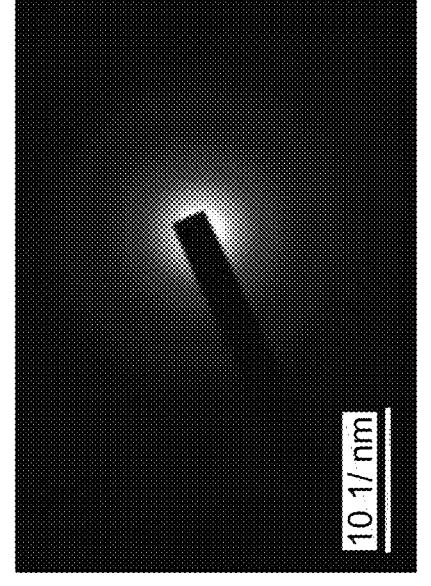
FIG. 5J is an SAED pattern of the O-g-$C_3N_4$, according to certain embodiments.
Figure 5L:
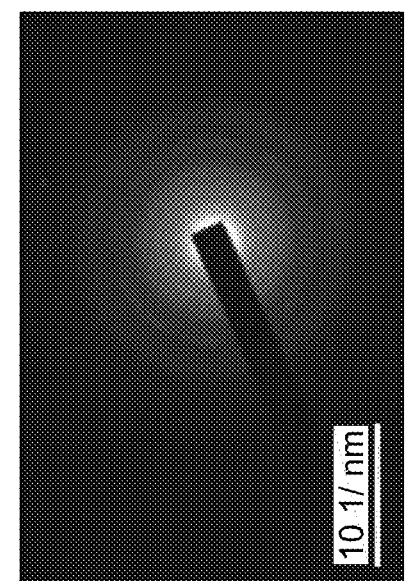
FIG. 5L is an SAED pattern of the PPy/O-g-$C_3N_4$, according to certain embodiments.
Figure 5I:
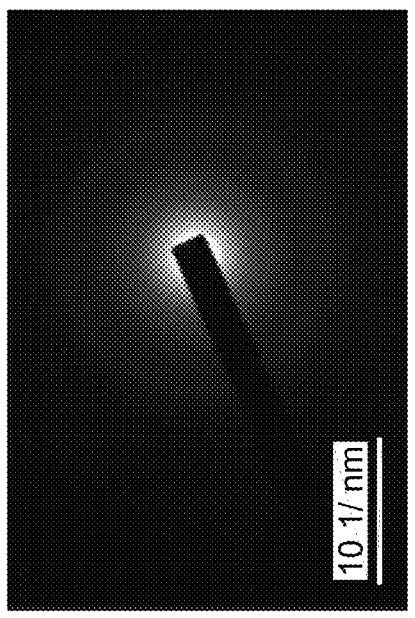
FIG. 5I is a selected area electron diffraction (SAED) image of the g-$C_3N_4$, according to certain embodiments.
Figure 5K:
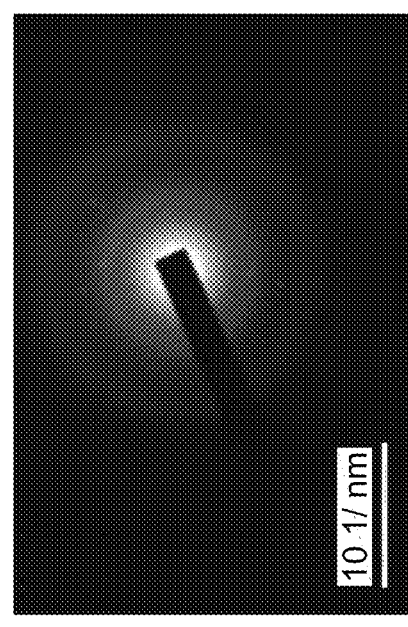
FIG. 5K is an SAED pattern of the PPy/g-$C_3N_4$, according to certain embodiments.

The various synthesized photocatalytic materials g-$C_3N_4$, O-g-$C_3N_4$, PPy/g-$C_3N_4$, and PPy/O-g-$C_3N_4$ were thoroughly analyzed by TEM, XRD, and FTIR analyses, and the results are elucidated in FIGS. 5A-5H, FIG. 6, and FIG. 7, respectively. The TEM results of g-$C_3N_4$ illustrated a nanosheet-like structure, confirming the 2D nature of g-$C_3N_4$ (FIGS. 5A-4B). As highlighted in FIG. 5A, the g-$C_3N_4$ layers are deposited on each other and exhibit a more pronounced pattern near the edges. When g-$C_3N_4$ nanosheets were further magnified (FIG. 5B), they showed high porosity with nanopores dispersed throughout the synthesized g-$C_3N_4$ structure. Selected area electron diffraction (SAED) image verifies the crystallinity of the g-$C_3N_4$ powder (FIG. 5I). The SAED pattern showed that g-$C_3N_4$ formed an amorphous structure with concentric circular fringes. The TEM image of O-g-$C_3N_4$ (FIG. 5C) shows a change in morphology compared to g-$C_3N_4$. Following oxidation, the g-$C_3N_4$ sheets undergo thinning, and numerous nanopores were observed owing to acid etching and oxidation (FIG. 3D). These pores can enhance membrane performance by incorporating O-g-$C_3N_4$ into membranes, artificial nanopores can aid in the diffusion of small molecules, thereby enhancing water transport. Like g-$C_3N_4$, the SAED pattern of O-g-$C_3N_4$ confirmed an amorphous structure, as shown in FIG. 5J. The TEM image for PPy/g-$C_3N_4$ (FIG. 5E) revealed the presence of a PPy polymer adhering to the g-$C_3N_4$ nanosheets, thereby corroborating the formation of a composite structure denoted as PPy/g-$C_3N_4$. The g-$C_3N_4$ layers are visible in the TEM images of PPy/g-$C_3N_4$. FIG. 5F is a magnified view of the PPy and g-$C_3N_4$ constituents in the PPy/g-$C_3N_4$ composite. The SAED pattern of PPy/g-$C_3N_4$ is consistent with that of g-$C_3N_4$ (FIG. 5K), providing additional confirmation of the compositional integrity of the composite material. Transformation of the wrinkled morphology of oxidized g-$C_3N_4$ into nanofibrous structures is attributed to strong electrostatic and $\pi$-$\pi$ interactions. These interactions stabilize PPy/O-g-$C_3N_4$ on the ceramic membrane surface (FIG. 5G). The magnified TEM image, depicted in FIG. 5H, reveals that the nanofibrous structures are uniform in shape and size. Their self-assembly on the ceramic membrane support offers an additional pathway for water transport. With the addition of PPy to O-g-$C_3N_4$, the amorphous structure transformed into a polycrystalline structure with additional structural integrity like PPy/g-$C_3N_4$, as illustrated in the SAED pattern (FIG. 5L).

Figure 6:
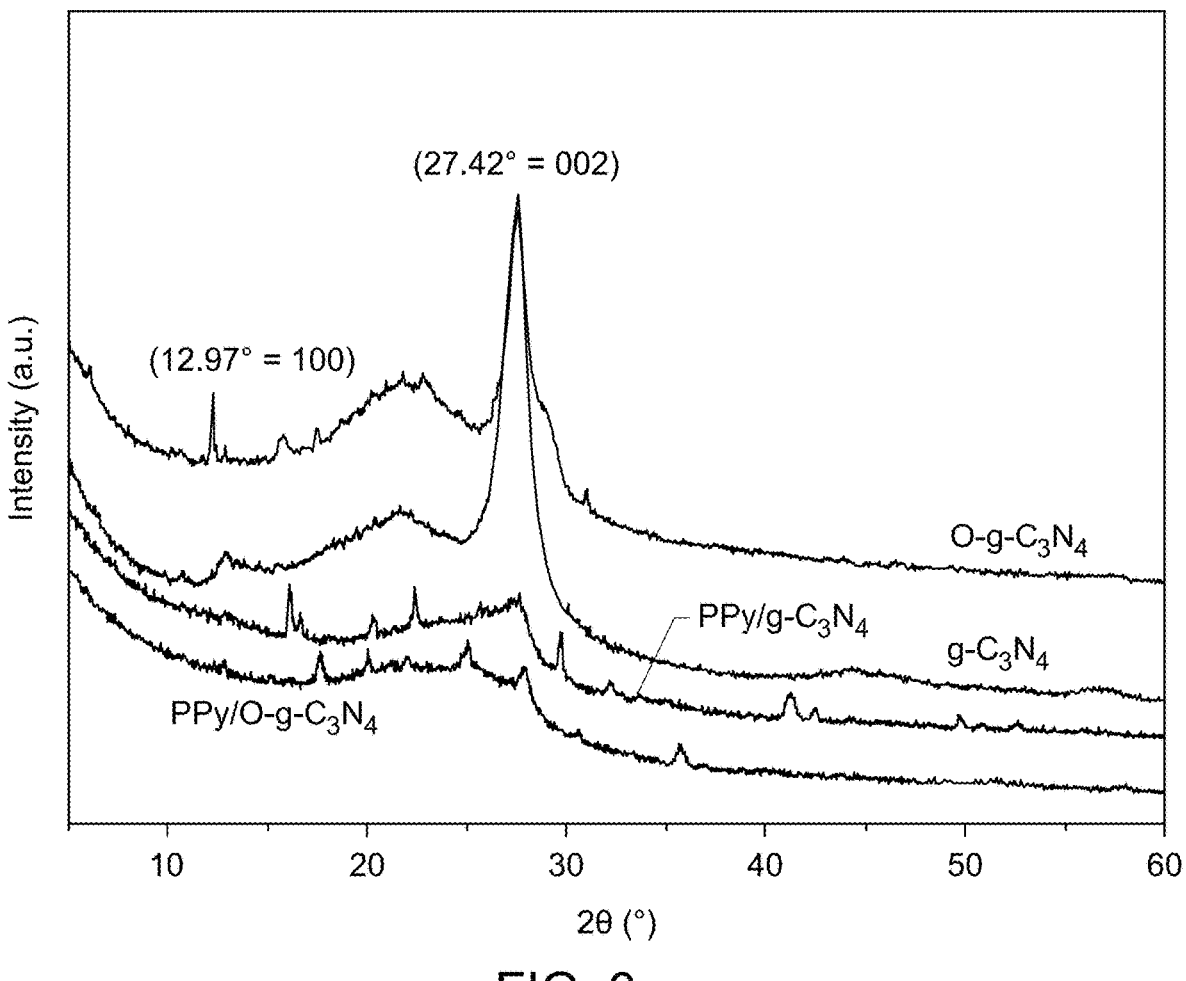
FIG. 6 depicts X-ray diffraction (XRD) spectra of g-$C_3N_4$, O-g-$C_3N_4$, PPy/g-$C_3N_4$, and PPy/O-g-$C_3N_4$, according to certain embodiments.
Figure 7:
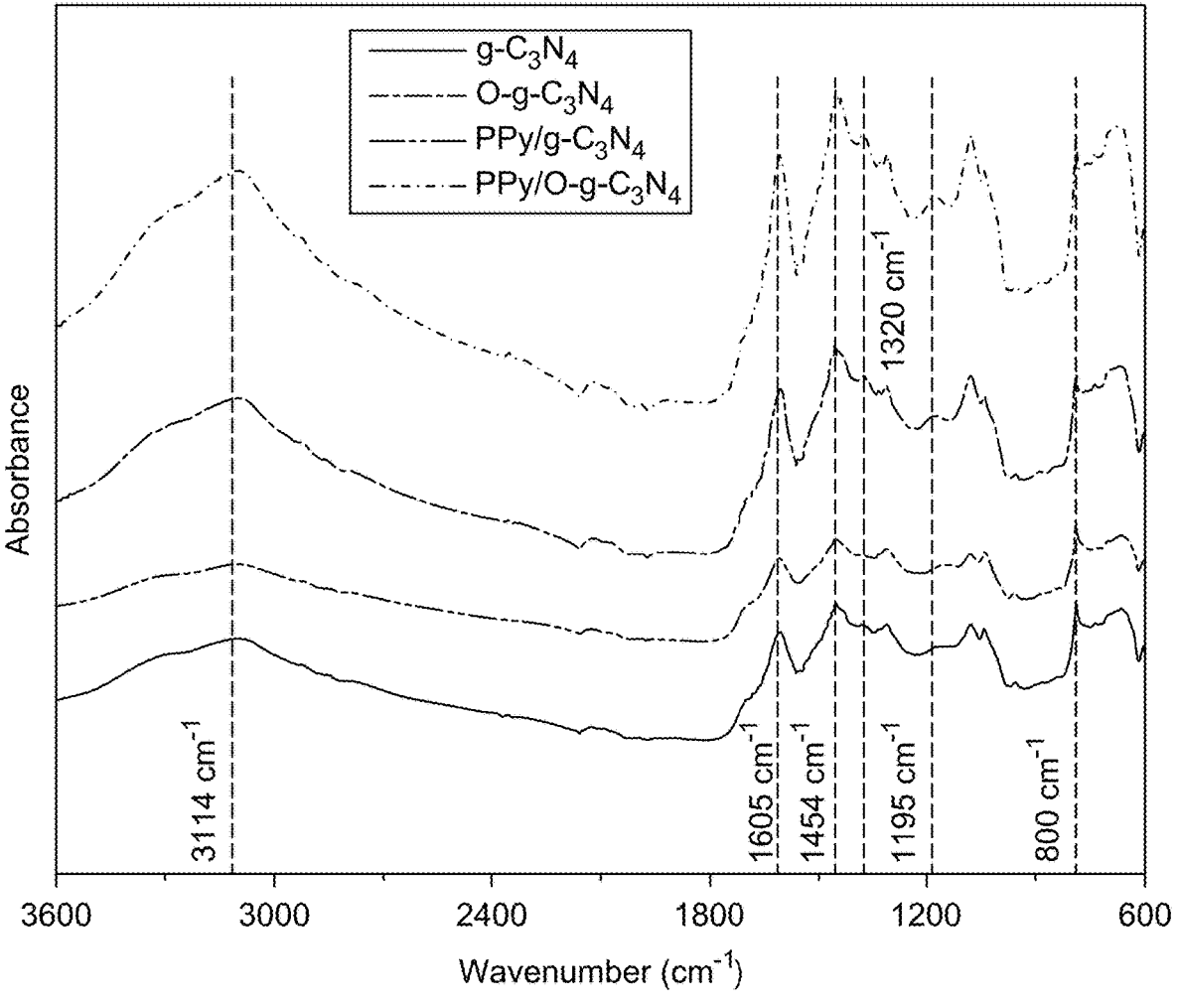
FIG. 7 depicts Fourier transform infrared (FTIR) spectra of g-$C_3N_4$, O-g-$C_3N_4$, PPy/g-$C_3N_4$, and PPy/O-g-$C_3N_4$, according to certain embodiments.

FIG. 6 illustrates XRD results of g-$C_3N_4$, O-g-$C_3N_4$, PPy/g-$C_3N_4$, and PPy/O-g-$C_3N_4$. The XRD patterns reveal distinct peaks at $2\theta$=12.97° and 27.42°, corresponding to (100) and (002) planes [Xu, Q. et al., Enhanced visible-light photocatalytic $H_2$-generation activity of carbon/g-$C_3N_4$ nanocomposites prepared by two-step thermal treatment, *Dalton Transactions*, 46 (32), 2017, 10611-10619; and Dong, F. et al., Enhanced visible light photocatalytic activity and oxidation ability of porous graphene-like g-$C_3N_4$ nanosheets via thermal exfoliation, *Journal of Materials Chemistry A*, 3 (7), 2015, 393-403, which are incorporated herein by references in their entireties]. These peaks are associated with the periodic graphitic conjugated aromatic system of g-$C_3N_4$, where the interlayer stacking (d-spacing: 0.326 nm) is contingent on the (002) lattice plane. The diffraction observed at the lattice plane (100) is attributed to the periodic triazine ring structure characteristic of protonated melamine, representing the in-plane structural packing pattern of the aromatic segments. The 0.680 nm of hole-to-hole distance was observed in the nitride pores. The XRD results of PPy/O-g-$C_3N_4$ demonstrate a decrease in peak value as compared to g-$C_3N_4$ indicating that PPy influences crystallinity and growth. This reduction in peak intensity indicates an impact on the g-$C_3N_4$ sheet like structures due to amorphous particles from the polymer coating [Liu, Q. et al., Synthesis of graphitic carbon nitride and polypyrrole nanocomposite (PPy/g-C$_3$N$_4$) as efficient photocatalysts for dibenzothiophene degradation in oilfield produced wastewater, *International Journal of Electrochemical Science*, 17 (12), 2022, 221264, which is incorporated herein by reference in its entirety]. FTIR analysis confirms the presence of various functional groups in g-C$_3$N$_4$, O-g-C$_3$N$_4$, PPy/g-C$_3$N$_4$, and PPy/O-g-C$_3$N$_4$, as depicted in FIG. 7. The analysis reveals a distinct peak at 800 cm$^{-1}$, representing the g-C$_3$N$_4$ powder, indicating the characteristic peak of tri-s-triazine ring units [Gao, X. et al., Highly permeable and anti-fouling reverse osmosis membranes with acidified graphitic carbon nitride nanosheets as nanofillers, *Journal of Materials Chemistry A*, 5 (37), 2017, 19875-19883; and Dong, F. et al., In situ construction of g-C$_3$N$_4$/g-C$_3$N$_4$ metal-free heterojunction for enhanced visible-light photocatalysis, *ACS Applied Materials & Interfaces*, 5 (21), 2013, 11392-11401, which are incorporated herein by references in their entireties]. Several firm peaks were observed in the 1200-1600 cm$^{-1}$ range, confirming heptazine-derived and connected units' stretching vibrations. These connected units consist of trigonal N—(C)3, representing bridging of C—N/H—C, which denotes partial condensation [Zhang, X. et al., Enhanced photoresponsive ultrathin graphitic-phase C$_3$N$_4$ nanosheets for bioimaging, *Journal of the American Chemical Society*, 135 (1), 2013, 18-21; Gao, D. et al., Defect-related ferromagnetism in ultrathin metal-free g-C$_3$N$_4$ nanosheets, *Nanoscale*, 6 (5), 2014, 2577-2581; and Liu, J., et al., Simple pyrolysis of urea into graphitic carbon nitride with recyclable adsorption and photocatalytic activity, *Journal of Materials Chemistry*, 21 (38), 2011, 14398-14401, which are incorporated herein by references in their entireties]. A secondary bending peak extending from 3000-3500 cm$^{-1}$ was ascribed to the —NH/—OH stretches of both amino groups/hydroxyl species, which concurrently overlapped with N—H bonds of g-C$_3$N$_4$ [Bai, X. et al., Enhanced oxidation ability of g-C$_3$N$_4$ photocatalyst via C$_{60}$ modification, *Applied Catalysis B: Environmental*, 152, 2014, 262-270; Deng, Z. et al., Effect of contact mode of TiO$_2$/g-C$_3$N$_4$ heterojunction on photocatalytic performance for dye degradation, Materials Transactions, 64 (12), 2023, 2782-2791; and Yan, S. C. et al., Photodegradation performance of g-C$_3$N$_4$ fabricated by directly heating melamine, *Langmuir*, 25 (17), 2009, 10397-10401, which are incorporated herein by references in their entireties]. Prominent absorption bands were observed around 1605 and 1454 cm$^{-1}$, attributed to aromatic stretching (C=C and C—N) of g-C$_3$N$_4$ triazine and pyrrole rings within the PPy/g-C$_3$N$_4$ powder. The C—N stretching band of the pyrrole ring was observed at approximately 1350 cm$^{-1}$. In the O-g-C$_3$N$_4$ FTIR spectra, the characteristic absorption peak corresponding to the breathing mode of triazine units was observed at 800 cm$^{-1}$; however, the peaks spanning 1200-1650 cm$^{-1}$ slightly shifted towards lower wavenumbers and had discernible broadening, which is consistent with IR findings on g-C$_3$N$_4$ nanosheets [Zhang, Y. et al., Activation of carbon nitride solids by protonation: Morphology changes, enhanced ionic conductivity, and photoconduction experiments, *Journal of the American Chemical Society*, 131 (1), 2009, 50-51; and Ma, T. Y. et al., Proton-functionalized two-dimensional graphitic carbon nitride nanosheet: An excellent metal-/label-free biosensing platform, *Biosensors and Bioelectronics*, 10 (12), 2014, 2382-2389, which are incorporated herein by references in their entireties] Additionally, a peak emerged at 1195 cm-1, signifying the stretching vibration of C—O, which can be attributed to the hydrolysis of g-C$_3$N$_4$, as seen in the intensified absorption peaks at approximately 1320 cm$^{-1}$ in the case of O-g-C$_3$N$_4$ [Du, X. et al., A scalable chemical route to soluble acidified graphitic carbon nitride: An ideal precursor for isolated ultrathin g-C$_3$N$_4$ nanosheets, *Nanoscale*, 7 (19), 2015, 8701-8706, which is incorporated herein by reference in its entirety]. A similar FTIR spectrum was obtained for the PPy/O-g-C$_3$N$_4$ composite.

Surface characterization of the M1(α-Al$_2$O$_3$), M2 (α-Al$_2$O$_3$@PPy/g-C$_3$N$_4$), and M3 (a Al$_2$O$_3$@PPy/O-g-C$_3$N$_4$) membranes was analyzed using SEM analysis (FIGS. 8A-8C). The SEM images showed that the ceramic membrane consists of α-Al$_2$O$_3$ particles, providing loose channels for the liquid permeation (FIG. 8A). A cross-section image of the M1 membrane is shown in FIG. 8D. Elemental analysis of M1 validated the presence of Al, O, and C (FIG. 8G). Alterations were observed following the formation of PPy/g-C$_3$N$_4$ and PPy/O-g-C$_3$N$_4$ separating layers on the ceramic membrane surface, as illustrated in FIG. 8B. The cross-sectional images of the M2 and M3 membranes display the presence of distinct layers, indicating that the coating materials create a functional interface that enhances the membrane's properties, such as hydrophilicity and oleophobicity (FIGS. 8E-8F). The uppermost layer, supported by alumina, includes an interactive network of PPy/g-C$_3$N$_4$ and PPy/O-g-C$_3$N$_4$. At higher magnifications, the M1 membrane surface consists of irregularly-shaped alumina particles, whereas the PPy/g-C$_3$N$_4$ and PPy/O-g-C$_3$N$_4$ separating layers visible in M2 and M3 membranes, with an approximate thickness of 1.96 and 2.16 μm, indicate successful formation of composite membranes (FIGS. 8E-8F). The narrowing of pores indicates growth of PPy/g-C$_3$N$_4$ and PPy/O-g-C$_3$N$_4$ on the ceramic membrane surface, which may repel the emulsified oily droplets from the oil-in-water emulsions. These layers act as separating layers for oil/water (O/W) separation. EDX analysis of the modified composite membranes reveals the presence of N and a decrease in Al's weight percentage. The presence of N and the decrease in Al confirms that the surface of the α-Al$_2$O$_3$ membranes is covered by the PPy/g-C$_3$N$_4$ and PPy/O-g-C$_3$N$_4$ layers and results in an α-Al$_2$O$_3$@PPy/O-g-C$_3$N$_4$ membrane exhibiting 3.87 wt. % Al (FIG. 8I). Visual inspection of the membranes' surface images supports the findings, with the M3 membrane displaying a uniform black layer of PPy/O-g-C$_3$N$_4$ on the pristine ceramic membrane (FIGS. 8J-8L). From the SEM images, it can be seen that the coating materials do not merely fill the surface pores of the alumina substrate but rather form an integrated separating layer that interacts with the substrate. The interaction between the coating and the alumina substrate is a combination of physical and chemical bonding, contributing to the membrane's overall integrity and performance. This integrated layer achieves separation characteristics, as it influences the membrane's ability to repel oil while allowing water to permeate.

FTIR and XRD patterns of the M1 and modified membranes were used to elucidate changes in functional group and crystallization structure, and the results are illustrated in FIGS. 9A-9B. FIG. 9A presents FTIR spectra illustrating the functional group variation of resultant M1, M2, and M3 membranes. In the M1 membrane, characteristic peaks emerged around 1000 cm$^{-1}$ and 500 cm$^{-1}$, attributable to the stretching vibrations of Al—O bonds [Lee, K. H. et al., Evaluation of structural/performance variation between α-Al$_2$O$_3$ and polyvinylidene fluoride membranes under long-term clean-in-place treatment used for water treatment, Desalination, 538, 2022, 115921, which is incorporated herein by reference in its entirety]. The primary peak observed at 656 cm$^{-1}$ corresponds to the Al—O stretching mode within an octahedral structure of $\alpha$-$Al_2O_3$, while the bands around 715 cm$^{-1}$ are attributed to the Al—O stretching mode in a tetrahedral structure and the symmetric bending of Al—O—H, respectively [Djebaili, K. et al., XPS, FTIR, EDX, and XRD analysis of $Al_2O_3$ scales grown on PM2000 alloy, *Journal of Spectroscopy*, 2015, 2015, 1-10, which is incorporated herein by reference in its entirety]. Subsequent modification of PPy/g-$C_3N_4$ and PPy/O-g-$C_3N_4$ revealed discernible alterations in the FTIR spectra. Peaks at 1605 cm$^{-1}$ and 800 cm$^{-1}$ were ascribed to the stretching vibration modes of C—N [Zhao, Y. C. et al., Turbostratic carbon nitride prepared by pyrolysis of melamine, *Journal of Materials Science*, 40 (5), 2005, 1259-1265, which is incorporated herein by reference in its entirety] and the s-triazine ring system [Li, X. et al., Preparation and characterization of graphitic carbon nitride through pyrolysis of melamine, *Journal of Alloys and Compounds*, 94, 2009, 387-392, which is incorporated herein by reference in its entirety], respectively, while those at 1241 cm$^{-1}$, 1319 cm$^{-1}$, 1409 cm$^{-1}$, and 1569 cm$^{-1}$ originated from C—N aromatic stretching [Liu, L. et al., Synthesis and characterization of microporous carbon nitride, *Microporous and Mesoporous Materials*, 110 (2-3), 2008, 216-222, which is incorporated herein by reference in its entirety]. The peaks of the modified membranes is in the 3000-3500 cm$^{-1}$ range are more pronounced than M1, indicating that the modified membranes' surface has more hydroxyl groups. M2 and M3 membranes show the peaks for both PPy/g-$C_3N_4$ and PPy/O-g-$C_3N_4$, respectively. These characteristic peaks confirm the successful formation of a PPy/O-g-$C_3N_4$ separating layer on the M1 membrane. XRD patterns of the M1, M2, and M3 membranes are shown in FIG. 9B. The presence of $\alpha$-$Al_2O_3$ can be confirmed through characteristic peaks in the XRD pattern. For $\alpha$-$Al_2O_3$, strong diffraction peaks typically appear at 2θ values around 25.6°, 34.1°, 37.3°, 52.6°, and 57.5° corresponding to the (012), (104), (113), (024), and (116) planes, respectively. These peaks indicate the hexagonal crystal structure of $\alpha$-$Al_2O_3$ [Cava, S. et al., Structural and spectroscopic analysis of $\gamma$-$Al_2O_3$ to $\alpha$-$Al_2O_3$—$CoAl_2O_4$ phase transition, Materials Chemistry and Physics, 97 (1), 2006, 102-108, which is incorporated herein by reference in its entirety]. XRD results displaying these peaks confirm the crystalline phase and verify the presence of $\alpha$-$Al_2O_3$ in the membranes. The modified membranes include a distinct peak at 2θ=27.42° which is due to the periodic graphitic conjugated aromatic system of g-$C_3N_4$ and is linked to the triazine ring structure attached with protonated melamine. XRD analysis of the M2 and M3 membranes revealed all the peaks attributed to the M1 in addition to the polymeric peak of g-$C_3N_4$.

The superhydrophilicity & superoleophobicity mechanisms of the M3 membrane are illustrated in FIGS. 10A-10D. The modified membrane is referred to as a "water-reclamation" membrane, as illustrated in FIG. 10A. FIG. 10B shows that a stable membrane-water/oil ternary composite interface with a UWOCA above 140° forms when the M3 membrane is immersed. The infiltration pressure ($\Delta P$) was used to better understand the separation membrane's wettability. Laplace law to determine the wettability of water and oil, as shown in equation 9 [Ma, W. et al., Nature-inspired creation of a robust free-standing electrospun nanofibrous membrane for efficient oil-water separation, *Environmental Science: Nano*, 5 (12), 2018, 2909-2920; Tian, D. et al., Phototunable underwater oil adhesion of micro/nanoscale hierarchical-structured ZnO mesh films with switchable contact mode, *Advanced Functional Materials*, 24 (4), 2014, 536-542; and Li, C. et al., $TiO_2$ coated polypropylene membrane by atomic layer deposition for oil-water mixture separation, *Membranes*, 3 (1), 2021, 138-146, which are incorporated herein by references in their entireties].

$$\Delta P = -\frac{l\gamma\cos\theta}{A} \tag{9}$$

where A, $\gamma$, θ, and l represent the pore area, the liquid's surface tension, the underwater oil contact angle (UWOCA) on the membrane, and the membrane pore perimeter, respectively. According to equation 9, the M3 membrane demonstrated spontaneous water permeation due to its hydrophilic nature, as evidenced by θ<90°, indicating $\Delta P$<0 and a downward pressure ($\Delta P$), as seen in FIG. 10C. When θ>90°, as in the underwater oil contact angle, $\Delta P$ must be >1. FIGS. 10C-10D depict a schematic representation of the PPy/O-g-$C_3N_4$ membrane wetting behavior when the wetting liquid is changed from water to oil. A water-moistened M3 membrane exhibits underwater oleophobic (θ>90°) properties with $\Delta P$>0. The oil cannot rise above the membranes due to the upward direction of $\Delta P$; therefore, water and oil were successfully isolated. Confirmation of super hydrophilicity and superoleophobicity underwater is shown in FIG. 10E. In the case of a water contact angle (WCA), the modified membranes (M2 and M3) are super hydrophilic, showing a WCA of 22±1.3° and 13±0.69° for M2 and M3 membranes, respectively. The lower WCA on the membrane surface of M2 membranes can be explained by the hydrophilic groups on PPy/g-$C_3N_4$; however, after the oxidation of the g-$C_3N_4$, more oxygen containing groups are introduced, which are responsible for enhanced hydrophilicity of the M3 membrane [Zhou, J.-E. et al., Separation of stable oil-water emulsion by the hydrophilic nano-sized $ZrO_2$ modified $Al_2O_3$ microfiltration membrane, *Separation and Purification Technology*, 75 (3), 2010, 243-248, which is incorporated herein by reference in its entirety]. The effectiveness of membranes for separating O/W emulsions is determined by the superoleophobicity of the $Al_2O_3$@PPy/g-$C_3N_4$ membrane underwater by UWOCA. The contact angle increases from 124±3.2° to 147±1.5° to 153.2±2.14° for M1, M2, and M3, respectively. The underwater super-oleophobic nature of the M2 and M3 membranes can be explained by the formation of a strong hydration layer on the membrane surface. This feature is more pronounced in the M3 membrane. This results in a strong repulsion of the oil, which prevents oil permeation through the membrane pores, and the hydrophilicity of the developed membranes facilitates the faster passage of water from the membrane [Ren, C. et al., Gravity-driven separation of oil/water mixture by porous ceramic membranes with desired surface wettability, *Membranes*, 14 (2), 2021, 457, which is incorporated herein by reference in its entirety].

Pure water flux of M1, M2, and M3, was measured at various pressures, i.e., between 0.5 to 2 bar, and results are shown in FIGS. 11A-11D. Before measuring the pure water flux, each membrane was compacted with DI water at 4 bar for 20 min. The results in FIG. 11A show pure water fluxes of 893.13±105.46, 1704.03±117.05, 2597.34±156.46, and 3899.25±176.59 LMH were observed for the M1 membrane at 0.5, 1, 1.5, and 2 bars of applied pressure, respectively. A linear correlation was found between the applied pressure and flux for the various membranes under the same conditions. Similar trends were also observed for the modified membranes; however, the flux values are lower than M1 membrane, as illustrated from the subset of FIG. 11A, as flux values of 77.46±2.09, 136.41±2.16, 168.53±3.30, and 253.58±14.91 LMH were observed for the M2 membrane at 0.5, 1, 1.5, and 2 bars of applied pressure, respectively. Flux values of 17.54±1.14, 26.25±1.96, 36.34±1.23, and 46.21±1.03 LMH were observed for the M3 membrane at 0.5, 1, 1.5, and 2 bars of applied pressure, respectively. The modified membranes (M2 and M3) show lower flux owing to the formation of a separating layer consisting of PPy/g-$C_3N_4$ and PPy/O-g-$C_3N_4$, which partially reduces and/or blocks the large pores of the membrane surface and offers a narrow, refined passage for water. The lower flux of M3 compared to M2 indicates a stronger interaction of the polypyrrole and O-g-$C_3N_4$ over g-$C_3N_4$ due to the presence of the more negatively charged or polar groups on the surface of the O-g $C_3N_4$, which result in a compact layer. The repeatability and stability of the measured flux and cyclic pure water flux was measured at 1 bar for 10 cycles for each membrane, and the results are shown in FIGS. 11B-11D. Pure flux value varied between 1690 and 1720 LMH with an average of 1704 LMH for the M1 membrane (FIG. 11B). Pure flux varied between 133 and 140 LMH with an average of 136 LMH for M2 (FIG. 11C). Pure flux varied between 24-29 LMH with an average of 26 LMH for M3 (FIG. 11D). From the pure water flux results, M1 and its modified membranes (M2 and M3) verified stability, as it shows low flux variation and can be used for anti-fouling applications with oil water.

O/W separation potentials of the M1, M2 and M3 membranes were determined for different O/W emulsions at various operating pressures. Comparative performances are illustrated in FIGS. 12A-12C. The M3 membrane shows higher hydrophilic and underwater oleophobic characteristics, verifying its utilization for efficient O/W separation. FIG. 12A shows that the initially milky O/W emulsion of vegetable oil feed transformed into transparent liquid after passing through the M2 and M3 membranes, highlighting efficient separation of the O/W emulsion through the modified composite membrane. The M1 membrane shows a poor removal efficiency of the vegetable oil. A rejection efficiency of 86.99±0.64%, 85.95±0.95%, 83.36±1.33%, and 82.92±1.98% is achieved for the M1 membrane at operating pressure variations of 0.5, 1, 1.5 and 2 bars, respectively. A rejection efficiency of 91.44±0.14%, 90.05±0.67%, 88.46±0.67%, and 87.71±1.51% was achieved for the M2 membrane at 0.5, 1, 1.5 and 2 bars, respectively. A rejection efficiency of 99.99±0.002%, 99.91±0.16%, 99.77=0.0024%, and 99.53±0.01% for M3 was observed for operating pressures of 0.5, 1, 1.5, and 2 bars, respectively. With an increase in pressure, rejection of M1 and M2 decreases compared to the M3 membrane due to the tight and compact separating layer formed by the interaction of PPy and O-g-$C_3N_4$. The water wettability results confirm that the M3 membrane has high surface hydrophilicity and underwater super oleophobic properties. This resulted in the formation of a hydration-layer around the membrane top surface, which rejected oil particles and enabled water to pass through the membrane. The mechanism of O/W separation is illustrated in FIG. 10A. The strong hydration layer is a result of hydrogen-bonding between water molecules and the oxygen and nitrogen groups containing the functionalities of O-g-$C_3N_4$ and polypyrrole. Oil cannot pass through the membrane surface due to the hydration layer's resistance to oil molecules, which reduces the likelihood of the M3 membrane fouling and causes the O/W emulsion to separate. The lower efficacy for M1 and M2 membranes was attributed to the deposition of oil particles, which resulted in squeezing of particles through pores under pressure due to lower hydrophilic and oleophobic characteristics compared to the M3 membrane. As a result, M1 and M2 membranes produce a permeate with oil, which increases with pressure. The variation in flux values under exposure to the vegetable oil/water emulsion at different operating pressures elucidated a decrease in flux from the initial values was observed for the M1 and M2 membranes. The flux values decrease from 893.13±105.46 LMH, 1704.03±117.05%, 2597.34±156.46 LMH, and 3899.25±176.59 LMH for the pure water to 405.96±32.40 LMH, 547.45±10.46 LMH, 652.24±29.64 LMH, and 768.11±27.43 LMH for vegetable oil water emulsion filtration at operating pressures of 0.5, 1, 1.5, and 2 bars, respectively, for the M1 membrane. Flux values decrease from 77.46±2.09 LMH, 136.41±2.16 LMH, 168.53±3.30 LMH, and 253.58±14.91 LMH for the pure water flux to 30.06±0.44 LMH, 47.94±0.21 LMH, 78.47±1.07 LMH, and 101.20±3.57 LMH for vegetable oil water emulsion filtration at operating pressure of 0.5, 1, 1.5, and 2 bars, respectively, for the M3 membrane. This decrease in the flux of the membranes is attributed to the deposition of oil particles on the membrane surface and the formation of a foulant layer; however, with increasing pressure, the oil particles (on the membrane surface) squeeze and pass through the membrane pores [Kirschner, A. Y. et al., Fouling mechanisms in constant flux crossflow ultrafiltration, *Journal of Membrane Science,* 574, 2019, 65-75, which is incorporated herein by reference in its entirety]. A lower flux decline in the M3 membrane was observed, where flux values decreased from 15.26±0.50 LMH, 25.25±0.77 LMH, 34.01±1.08 LMH, and 45.85±2.19 LMH for the pure water flux to 14.26±0.26 LMH, 23.94±1.09 LMH, 31.60±1.43 LMH, and 46.65±0.65 LMH for vegetable oil water emulsion filtration at operating pressure of 0.5, 1, 1.5, and bars, respectively. The lower flux decline is attributed to the superhydrophilicity/superoleophobicity of the M3 membrane. The diesel oil and petroleum ether O/W emulsions show similar results, where >99.9% rejection of the oil was observed for M3, as illustrated in FIGS. 12B and 12C. A flux decline of 15.26±2.64 LMH, 25.25±2.06 LMH, 34.04±2.43 LMH, and 45.85±1.15 LMH for diesel oil emulsion and 15.10±1.26 LMH, 24.94±3.01 LMH, 34.60±1.52 LMH, and 45.05±1.43 LMH for petroleum ether oil emulsion was observed for the $Al_2O_3$@PPy/O-g-$C_3N_4$ membrane at pressure variations of 0.5, 1, 1.5, and 2 bars, respectively.

Photocatalytic efficacy of the prepared membranes was assessed and compared using the degradation rate of EBT in a batch operation conducted under visible light to evaluate their self-cleaning performances (FIGS. 13A-13C). When light absorption reaches the bandgap energy of the semiconductor photocatalyst or above, photocatalytic destruction of contaminants begins. Upon excitation of the photocatalyst, the electrons transfer (from the valence band (VB) to the conduction band (CB)) and interact with oxygen and water molecules to generate reactive oxygen species (FIG. 13A). These species target organic pollutants and transform them into less hazardous compounds, such as $CO_2$ and $H_2O$, via intricate chain reactions. The principal component influencing photocatalytic activity is the energy band structure. g-$C_3N_4$ has a bandgap of 2.7 eV, as its CB and VB are positioned at 1.4 and −1.3 eV, respectively. g-$C_3N_4$ has a maximum absorption wavelength of 460 nm, allowing it to utilize visible light [Ghosh, U. et al., Graphitic carbon nitride-based Z scheme photocatalysts: Design considerations, synthesis, characterization, and applications, *Journal of Industrial and Engineering Chemistry,* 79, 2019, 383-408, which is incorporated herein by reference in its entirety].

Data from the photodegradation of EBT using a UV-vis spectrophotometer indicated that, for both photocatalytic membranes, the concentration of EBT decreased with time. The M3 membrane was immersed into an EBT solution (10 ppm) and exposed to the solar simulator. A few drops of 0.1 mM of $H_2O_2$ were added to the EBT solution to initiate degradation, as shown in FIG. 13B. $H_2O_2$ was added to the system to improve the photocatalytic activity of $g$-$C_3N_4$. This was performed to stimulate the reaction with the collected electrons in CB of the $g$-$C_3N_4$ to produce $OH^-$ ($E^\circ$ $H_2O_2/OH^-$=+0.81 eV) [Truong, H. B. et al., $H_2O_2$-assisted photocatalysis for removal of natural organic matter using nanosheet $C_3N_4$—$WO_3$ composite under visible light and the hybrid system with ultrafiltration, *Chemical Engineering Journal*, 399, 2020, 125733; and Koppenol, W. H., et al., Electrode potentials of partially reduced oxygen species, from dioxygen to water, *Free Radical Biology and Medicine*, 49 (3), 2010, 317-322, which are incorporated herein by references in their entireties]. As a result, EBT started to degrade due to the excitation of the deposited PPy/O-$g$-$C_3N_4$. After 30 minutes of exposure, almost clear water was observed, as illustrated in FIG. 13B (right top), and EBT degraded into its transformation products and was converted into $CO_2$ and $H_2O$. The comparative degradation and self-cleaning potentials of the prepared membranes were determined through filtration experiments. A 300 mL solution of EBT was passed through the M2 and M3 membranes separately and, after that, the membranes were exposed to a solar simulator. The pure water flux was measured at regular intervals to determine the recovery efficiency of the membrane, and the results are highlighted in FIG. 13C. Flux recovery of the M2 membrane varied from 10.94±2.34% to 85.36±1.69%, and the M3 membrane varied from 45.69±1.45% to 95.36±1.24%. Recovery efficiency of M3 is higher compared to M2 due to higher binding sites on the modified ring structure and positive charge on the membrane, as illustrated through the structural structure.

Anti-fouling properties of the membranes were compared by passing 300 mL of a 10 ppm EBT solution through the membranes. The results are shown in FIG. 14A, which show that the M3 membrane has a faster decline in flux than the M2 membrane. The normalized flux declines to 34% and 40% for the M3 and M2 membranes after the filtration of the EBT solution, respectively. The faster decline was due to the higher adsorption of the dye on the M3 membranes through $\pi$-$\pi$ interactions and the presence of the polar groups, which are responsible for accumulation of the EBT on the membrane surface. The cleaning efficiency of M3 was higher, and a recovery of 95.5% was recorded compared to 85% for the M2 membrane. The separation efficiency of EBT by the membranes is documented in FIG. 14B and varied from 94.92±2.69% to 60.12±1.34% and 92.69±1.45% to 89.36±1.34% for the M2 and M3 membranes, respectively.

The results recorded a stable rejection efficiency for the M3 membranes because of their higher adsorption potential. The UV-vis spectra of the EBT rejections are elucidated in FIGS. 14C-14D. The results elucidated (feed and permeate at 535.5 nm of UV-vis) that the M2 and M3 membranes filtrate had decreased peak intensity after filtration through the membranes. A decrease in the peak was observed for the M3 membrane, as illustrated in FIG. 14D, compared to the M2 membrane (FIG. 14C). Fouling of the membranes is shown in FIG. 14E, which shows the FRR, $FD_{Rt}$, $FD_{Rr}$, and $FD_{Rir}$ values for the M2 and M3 membranes. FRR values of 0.80 and 0.96 and $FD_{Rt}$ values of 0.60 and 0.63 were observed for M2 and M3, respectively. $FD_{Rr}$ shows membrane flux recovery by cleaning (exposed to solar light). $FD_{Rir}$ demonstrates irreversible flux recovery due to deposition/adsorption on the membrane surface, which resulted in exacerbating the blocking/clogging of the membrane pores. $FD_{Rr}$ values of 0.41 and 0.59 and $FD_{Rir}$ values of 0.19 and 0.04 were observed for the $Al_2O_3@PPy/g$-$C_3N_4$ and $Al_2O_3@PPy/O$-$g$-$C_3N_4$ membranes, respectively.

Long-term stability of the modified membranes was tested over five cycles of EBT filtration (FIGS. 15A-15C). Where flux of the membranes and rejection efficiency were tested, the results illustrated in FIG. 15A show that the flux recovery of the M2 and M3 membranes declined from 136.41 LMH to 115.34 LMH, 96.32 LMH, 81.32 LMH, 65.35 LMH, and 55.34 LMH (M2) and 25.25 LMH to 24.32 LMH, 22.36 LMH, 21.65 LMH, 21.03 LMH, and 20.95 LMH (M3) for 1-5 cycles of EBT filtration, respectively. In terms of the normalized flux reduction, as illustrated in FIG. 15B, reductions in flux recovery of 0.84, 0.70, 0.59, 0.47, and 0.40 and 0.96, 0.88, 0.85, 0.83, and 0.82 from an initial value of 1, were observed for the M2 and M3 membranes during the filtration of five cycles of EBT. The results indicate that the initial flux of the M2 membrane was higher than that of the M3 membrane; however, the recovery of the M3 membrane was higher because of better anti-fouling properties and cleaning efficiency. The increased flux recovery was due to enhanced self-cleaning potential of the fouled membrane when exposed to visible light, as illustrated in FIG. 13B (bottom right). The M3 membrane showed a higher rejection efficiency because of strong adsorption of EBT to the membranes, and rejection efficacy varied from 96.35 5% to 89.34% at the end of the five cycles. For M2, rejection efficiency ranged from 94.36% to 62.32% at the end of 5 cycles. Based on the organic dye's anti fouling properties and rejection efficiency, it is seen that the M3 membrane has potential for application in a wide range of wastewater treatments. Table 1 contrasts this work with other studies and emphasizes the potential for its future application in oil/water separation. Modification of the $Al_2O_3$ membranes with 10 PPy/O-$g$-$C_3N_4$ enhanced the anti-fouling properties and separation efficiency compared to the bare PPy/$g$-$C_3N_4$ membranes.

TABLE 1

| | | | | Wettability analysis | | | |
|---|---|---|---|---|---|---|---|
| Membranes | Filtration mechanism | Oil emulsion | Flux (LMH) | WCA (°) | OWCA (°) | Separation rate (%) | Ref. |
| RGO-Ag-TiO₂-CA | Vacuum filtration | 1/100 ($V_{oil}/V_{water}$) | 191 | 42.78 | 143.57 | ~100 | [1] |

TABLE 1-continued

Comparison of wettability, flux, and separation performances

| Membranes | Filtration mechanism | Oil emulsion | Flux (LMH) | Wettability analysis | | Separation rate (%) | Ref. |
|---|---|---|---|---|---|---|---|
| | | | | WCA (°) | OWCA (°) | | |
| GO/g-C$_3$N$_4$@TiO$_2$ | Dead end filtration | 1000 mg/L | 275 | 57 | 165.1 | 100 | [2] |
| PTCPS | Dead end filtration | 1000 mg/L | 1113 | 0 | 153.6 | 98.6 | [3] |
| PVDF-F-SiO$_2$ | Dead end filtration | 1000 mg/L | 3700 | 129.2 | 122.3 | 87.7 | [4] |
| ZrO$_2$—Al$_2$O$_3$ | Cross flow system | 1000 mg/L | 441 | 20 | — | 97.8 | [5] |
| GO-PA Fe$^{3+}$/PVDF | Vacuum filtration | 1/99 (V$_{oil}$/V$_{water}$) | 190 | 1.4 | 163.4 | 99 | [6] |
| RGO/PDA/g C$_3$N$_4$ composite membrane | Vacuum filtration | 1/100 (V$_{oil}$/V$_{water}$) | 22.5 | 53.6 | 141.6 | 99.5 | [7] |
| GO/MCU C$_3$N$_4$/PVDF membranes | Dead end filtration | 1/100 (V$_{oil}$/V$_{water}$) | 862 | 68.7 | — | 98 | [8] |
| PPy-G-C$_3$N$_4$/PA @Alumina ceramic membrane | Dead end filtration | 100 mg/L | 160 LHM (8 bar) | 0 | 159.9 | >99 | [9] |
| α-Al$_2$O$_3$@ PPY/O g-C$_3$N$_4$ | Dead end filtration | 200 mg/L | 46.65 | 13 | 153.2 | 99.53 | Present disclosure |

[1] describes Chen, Q. et al., A novel photocatalytic membrane decorated with RGO—Ag—TiO$_2$ for dye degradation and oil-water emulsion separation, *Applied Surface Science,* 93 (3), 2018, 761-775; [2] describes Liu, Y. et al., 2D heterostructure membranes with sunlight-driven self-cleaning ability for highly efficient oil-water separation, *Advanced Functional Materials,* 28 (13), 2018, 1803165; [3] describes Yang, Y. et al., Superhydrophilic and underwater superoleophobic PVDF-PES nanofibrous membranes for highly efficient surfactant-stabilized oil-in-water emulsions separation, *Journal of Membrane Science,* 687, 2023, 122044; [4] describes Yang, Y. et al., Electrospun rough PVDF nanofibrous membranes by introducing fluorinated SiO$_2$ for efficient oil-water emulsions coalescence separation, *Journal of Membrane Science,* 650, 2022, 129646; [5] describes Zhou, J.-E. et al., Separation of stable oil-water emulsion by the hydrophilic nano-sized ZrO$_2$ modified Al$_2$O$_3$ microfiltration membrane, *Separation and Purification Technology,* 75 (3), 2010, 243-248; [6] describes Tan, S. L. et al., Superhydrophilic and underwater superoleophobic graphene oxide-phytic acid membranes for efficient separation of oil-in-water emulsions, *Separation and Purification Technology,* 314, 2023, 123544; [7] describes Li, F. et al., A mussel-inspired method to fabricate reduced graphene oxide/g-C$_3$N$_4$ composite membranes for catalytic decomposition and oil-in-water emulsion separation, *Chemical Engineering Journal,* 322, 2017, 33-45; [8] describes Shi, Y. et al., Evaluation of self-cleaning performance of the modified g-C$_3$N$_4$ and GO based PVDF membrane toward oil-in-water separation under visible light, *Chemosphere,* 230, 2019, 40-50; and [9] describes Baig U., et al., A polymeric-ceramic hybrid membrane with a self-cleaning and super-wettable surface decorated with polypyrrole-g-C$_3$N$_4$ photocatalyst for oily wastewater treatment, *Separation and Purification Technology,* 339, 2024, 126487, which are incorporated herein by references in their entireties.

For the successful application of the M3 membrane for dye removal, the membrane was used for the salt fractionation from the dyes, which has a wide range of applicability in textile wastewater treatment. 1000 ppm of each salt, including NaCl, Na$_2$SO$_4$, MgSO$_4$, and MgCl$_2$, was prepared along with 10 ppm EBT. The prepared solution was filtered through M3, and the concentration of the salts was determined using a conductivity meter. The results showed the rejection efficiencies of 6.34%, 2.78%, 17.24%, and 10.11% for NaCl, Na$_2$SO$_4$, MgSO$_4$, and MgCl$_2$, respectively, at the end of the filtration (with a standard deviation less than 3%) (FIG. 16). The rejection efficiency of EBT of more than 97% was observed for each case. The M3 membrane has potential for application in dye salt separation. The M3 membrane shows high potential for O/W separation, anti-fouling properties, and self-cleaning ability as compared to M1 and M2.

The present disclosure describes a photocatalytic self-cleaning membrane developed by depositing PPy/g-C$_3$N$_4$ and PPy/O-g-C$_3$N$_4$ onto α-Al$_2$O$_3$ ceramic membranes. A compact separation layer was developed through interactions between PPy and O-g-C$_3$N$_4$. The g-C$_3$N$_4$ was synthesized from melamine via a thermal process (550° C. for 4 h) and then oxidized to enhance the sheet hydrophilicity. The resulting membranes exhibited high structural stability and wettability. The M3 membrane showed hydrophilic (13°±0.69°) and underwater superoleophobic (153.2°±) 2.14° characteristics. Development of PPy/g-C$_3$N$_4$ and PPy/O-g-C$_3$N$_4$ on the membrane was further verified through pure water flux analysis (flux analysis revealed decreases from 1704.03±117.05 LMH for the M1 membrane to 136.41±2.16 and 26.25±1.96 LMH for M2 and M3 membranes, respectively, at 1 bar operating pressure). The synthesized membranes were tested for vegetable, diesel, and petroleum ether oil emulsions for O/W separation analysis under different pressures. The M3 membrane maintained a stable permeate flux of 25.25±0.77 LMH with a high rejection efficiency of 99.91% for vegetable oil at 1 bar. Similar results were obtained for diesel and petroleum ether oil emulsions. The M3 membrane's anti-fouling and self cleaning properties were assessed using EBT filtration, where it achieved a flux recovery of 96% and a separation efficiency of 96.35%. Comparable outcomes were observed in dye/salt fractionation, with over 97% dye rejection and high salt permeabilities. These results indicate that incorporating an appropriate photocatalytic material can effectively enhance the membrane's anti fouling properties, thereby reducing fouling and improving separation efficiency.

Numerous modifications and variations of the present disclosure are possible in light of the above teachings. It is therefore to be understood that within the scope of the appended claims, the present disclosure may be practiced otherwise than as specifically described herein.

The invention claimed is:

1. A membrane, comprising:
a first layer comprising alumina; and
a second layer comprising an oxidized graphitic carbon nitride and a polymerized pyrrole,
wherein carboxylic groups and hydroxyl groups in the oxidized carbon nitride interact via electrostatic interactions with polar groups in the polymerized pyrrole,
wherein the second layer is a nanofibrous mass comprising entangled nanofibers,
wherein the second layer has a thickness of 1 to 3 μm.

2. The membrane of claim 1, wherein the nanofibers have a length of 50 to 500 nm and a width of 2 to 20 nm.

3. The membrane of claim 1, wherein the membrane comprises carbon in an amount of 30 to 50 percent by weight (wt. %), nitrogen in an amount of 10 to 30 wt. %, oxygen in an amount of 30 to 40 wt. %, and aluminum in an amount of 3 to 5 wt. % based on a total weight of the membrane.

4. The membrane of claim 1, wherein the oxidized graphitic carbon nitride and the polymerized pyrrole interact via π-π interactions.

5. The membrane of claim 1, wherein the first layer and the second layer interact through electrostatic interactions.

6. The membrane of claim 1, wherein the membrane has a water contact angle of 10° to 15°.

7. The membrane of claim 1, wherein the membrane has an underwater oil contact angle of 145° to 160°.

8. The membrane of claim 1, wherein the membrane has a pure water flux of 20 to 30 LMH at a pressure of 1 bar.

9. The membrane of claim 1, wherein the membrane has a Eriochrome Black T rejection efficiency of at least 95% based on an initial amount of the Eriochrome Black T.

10. The membrane of claim 1, wherein the membrane has a magnesium chloride salt permeability rate of at least 80% based on an initial amount of the magnesium chloride.

11. The membrane of claim 1, wherein the membrane has a magnesium sulfate salt permeability rate of at least 75% based on an initial amount of the magnesium sulfate.

12. The membrane of claim 1, wherein the membrane has a sodium chloride salt permeability rate of at least 90% based on an initial amount of the sodium chloride.

13. The membrane of claim 1, wherein the membrane has a sodium sulfate salt permeability rate of at least 95% based on an initial amount of the sodium sulfate.

14. A method of oil and water separation, comprising:
contacting an emulsion comprising oil and water with the membrane of claim 1; and
collecting a permeate,
wherein the permeate has a lesser amount of oil than the emulsion.

15. The method of claim 14, wherein the membrane has an oil rejection efficiency of 99% based on an initial concentration of the oil in the emulsion.

16. The method of claim 14, wherein the water forms a hydration layer on a surface of the membrane via hydrogen bonding with oxygen-containing groups and nitrogen-containing groups of the membrane to reject the oil.

17. The method of claim 14, wherein membrane has an emulsion flux of 20 to 30 LMH at a pressure of 1 bar.

18. The method of claim 14, wherein the oil is selected from the group consisting of vegetable oil, diesel oil, and petroleum ether oil.

19. A method of degradation, comprising:
contacting the membrane of claim 1 with a solution comprising one or more pollutants and hydrogen peroxide in a reactor; and
irradiating the reactor with light to degrade the one or more pollutants.

20. The method of claim 19, further comprising:
irradiating the membrane with ultraviolet light for at least 20 minutes to clean the membrane,
wherein after the irradiating the membrane has a flux rate of at least 85% of an initial flux rate of the membrane.

* * * * *